(12) United States Patent
Otsuka et al.

(10) Patent No.: US 10,768,376 B2
(45) Date of Patent: Sep. 8, 2020

(54) OPTICAL CONNECTOR

(71) Applicants: SUMITOMO ELECTRIC INDUSTRIES, LTD., Osaka-shi, Osaka (JP); Japan Communication Accessories Manufacturing Co., Ltd., Komaki-shi, Aichi (JP); Steve Cheng, Emerald Hills, CA (US)

(72) Inventors: Kenichiro Otsuka, Osaka (JP); Motoyoshi Kimura, Komaki (JP); Masaki Omura, Osaka (JP); Steve Cheng, Emerald Hills, CA (US)

(73) Assignees: SUMITOMO ELECTRIC INDUSTRIES, LTD., Osaka-shi, Osaka (JP); JAPAN COMMUNICATION ACCESSORIES MANUFACTURING CO., LTD., Komaki-shi, Aichi (JP); Steve Cheng, Emerald Hills, CA (US)

( * ) Notice: Subject to any disclaimer, the term of this patent is extended or adjusted under 35 U.S.C. 154(b) by 0 days.

(21) Appl. No.: 16/580,330

(22) Filed: Sep. 24, 2019

(65) Prior Publication Data
US 2020/0132941 A1  Apr. 30, 2020

Related U.S. Application Data

(63) Continuation-in-part of application No. 16/174,672, filed on Oct. 30, 2018, now Pat. No. 10,527,803.

(51) Int. Cl.
G02B 6/38 (2006.01)
G02B 6/36 (2006.01)

(52) U.S. Cl.
CPC ......... *G02B 6/3825* (2013.01); *G02B 6/3604* (2013.01); *G02B 6/3866* (2013.01); *G02B 6/3869* (2013.01); *G02B 6/3874* (2013.01)

(58) Field of Classification Search
None
See application file for complete search history.

(56) References Cited

U.S. PATENT DOCUMENTS

| | | |
|---|---|---|
| 10,527,803 B1 * | 1/2020 | Otsuka ............... G02B 6/3866 |
| 2012/0219254 A1 | 8/2012 | Bradley et al. |
| 2013/0022317 A1 | 1/2013 | Norris et al. |
| 2013/0209041 A1 | 8/2013 | Szilagyi et al. |
| 2016/0004016 A1 | 1/2016 | Zimmel et al. |
| 2019/0235182 A1 | 8/2019 | Cheng |

* cited by examiner

*Primary Examiner* — Michael Stahl
(74) *Attorney, Agent, or Firm* — Faegre Drinker Biddle & Reath LLP

(57) ABSTRACT

An optical connector is disclosed. The optical connector includes a rear housing, an inner housing, an arm and an outer housing. The inner housing includes at least one retaining hole to house a ferrule. The rear housing moves linearly and rotates with respect to the inner housing. The arm moves linearly together with the rear housing with respect to the inner housing. The outer housing disposed on an outer periphery of the inner housing covers a front portion of the inner housing. The outer housing rotates with respect to the inner housing by a rotation guiding mechanism cooperating with the arm. The outer housing includes a forward wall covering the distal end of the inner housing. An opening area of the forward wall can be aligned with the retaining hole of the ferrule when the outer housing is rotated from an initial position to a connected position.

19 Claims, 43 Drawing Sheets

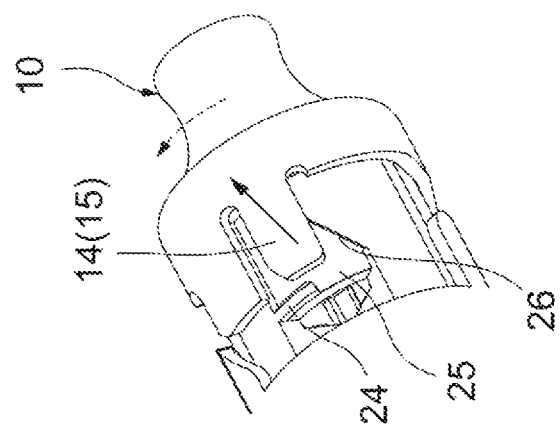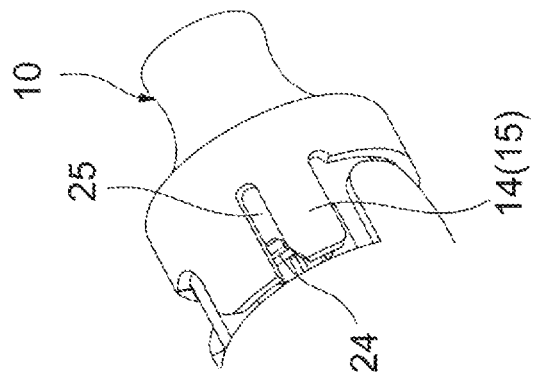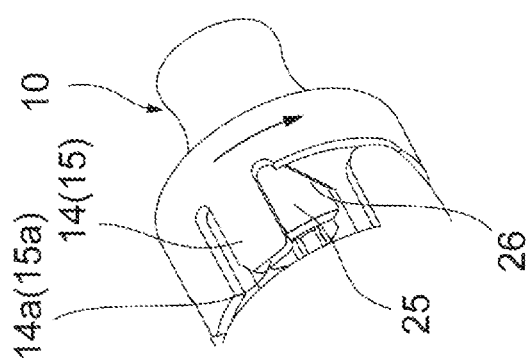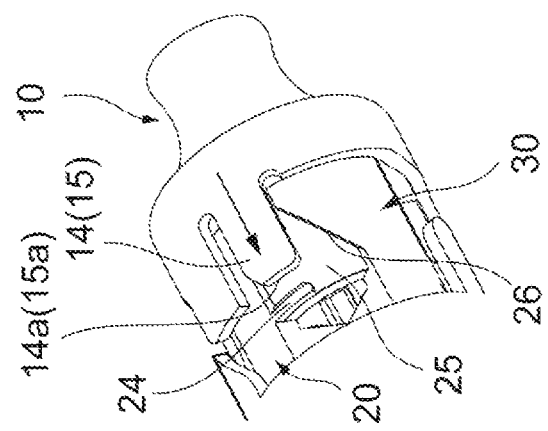

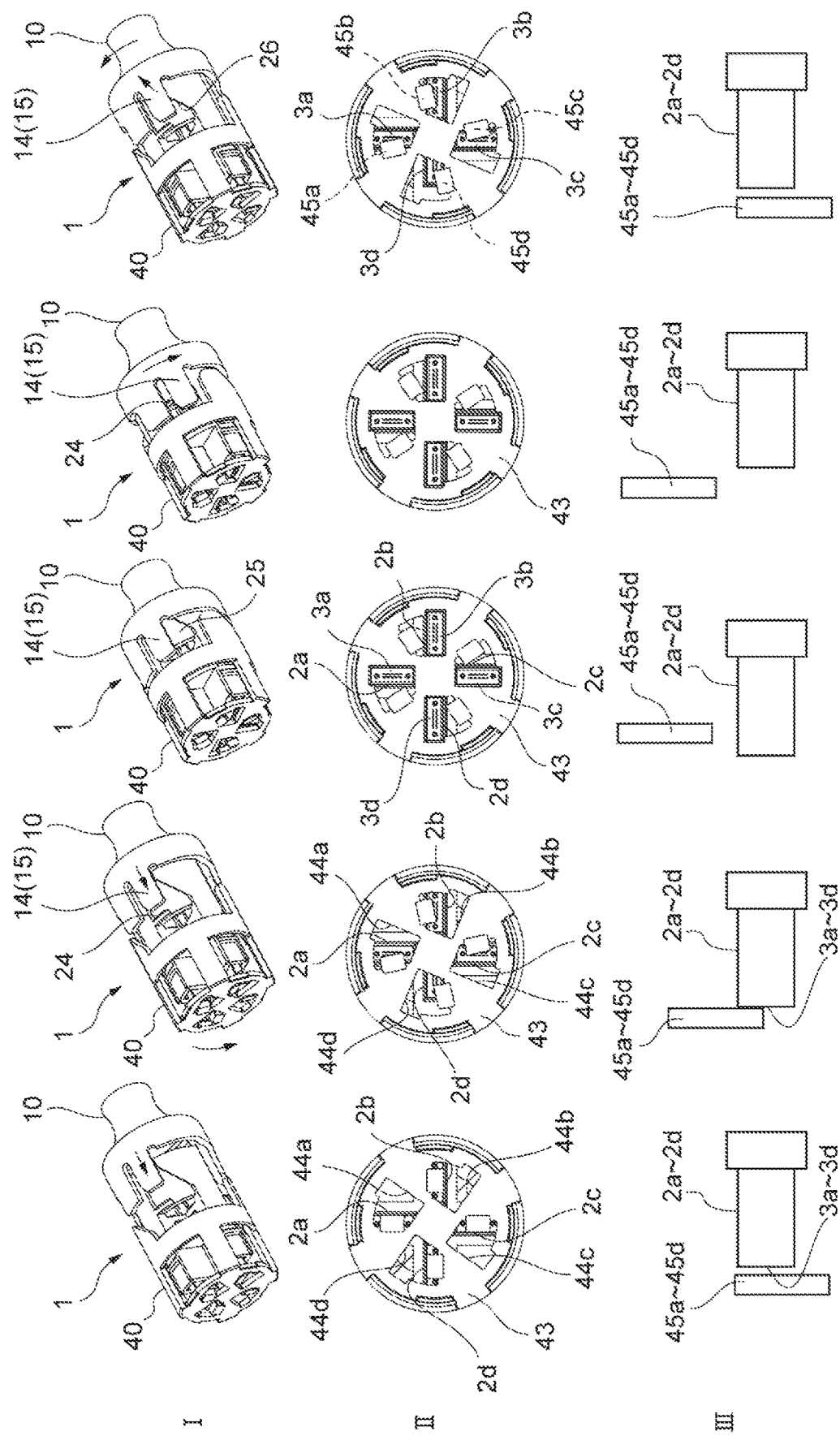

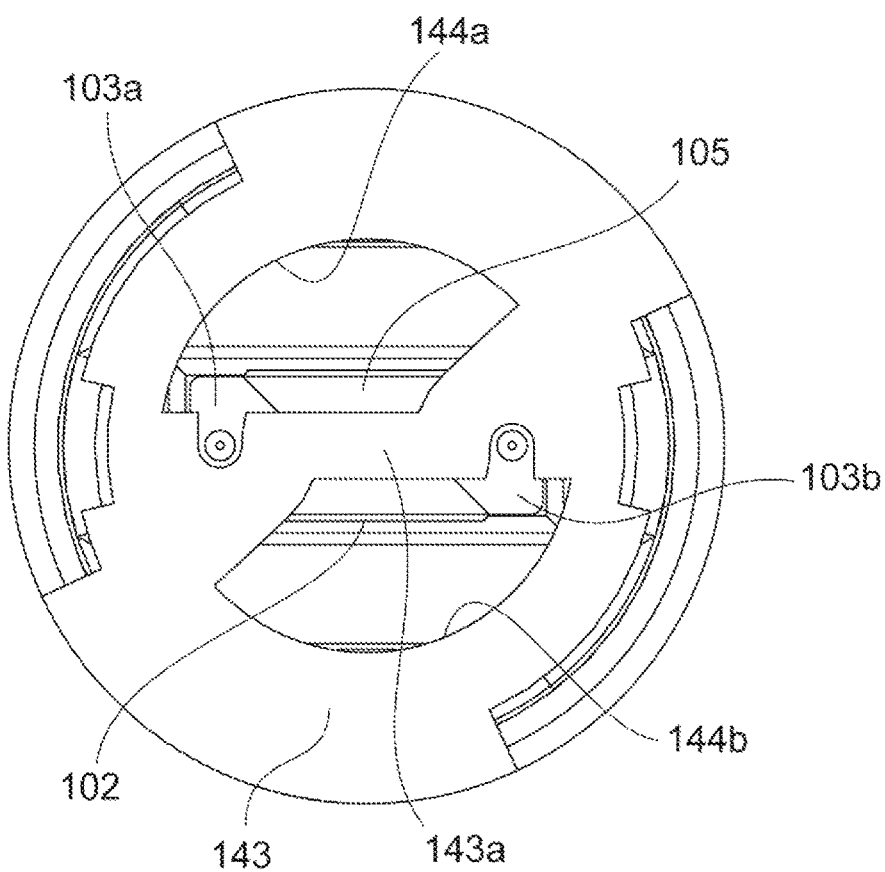
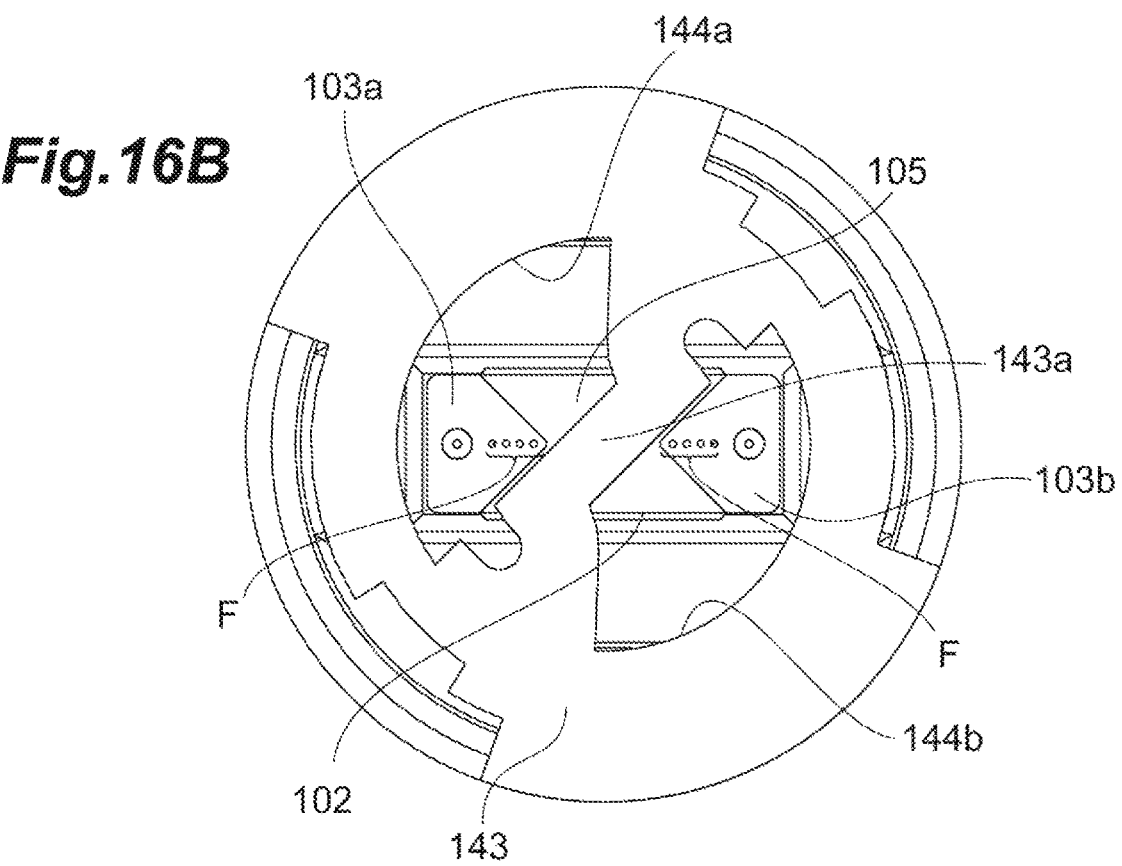

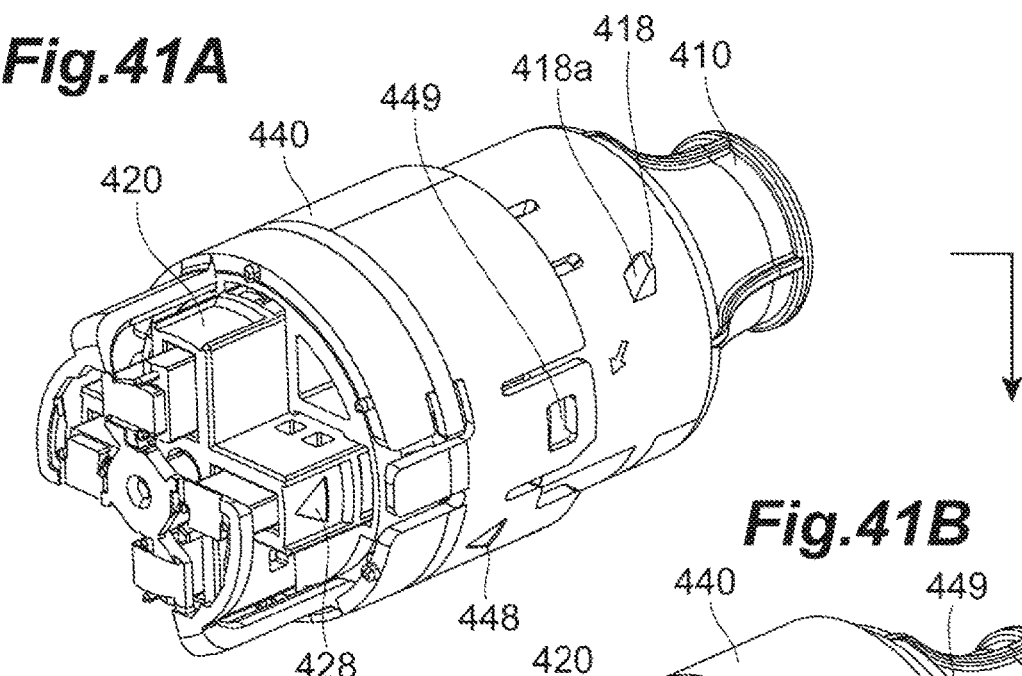
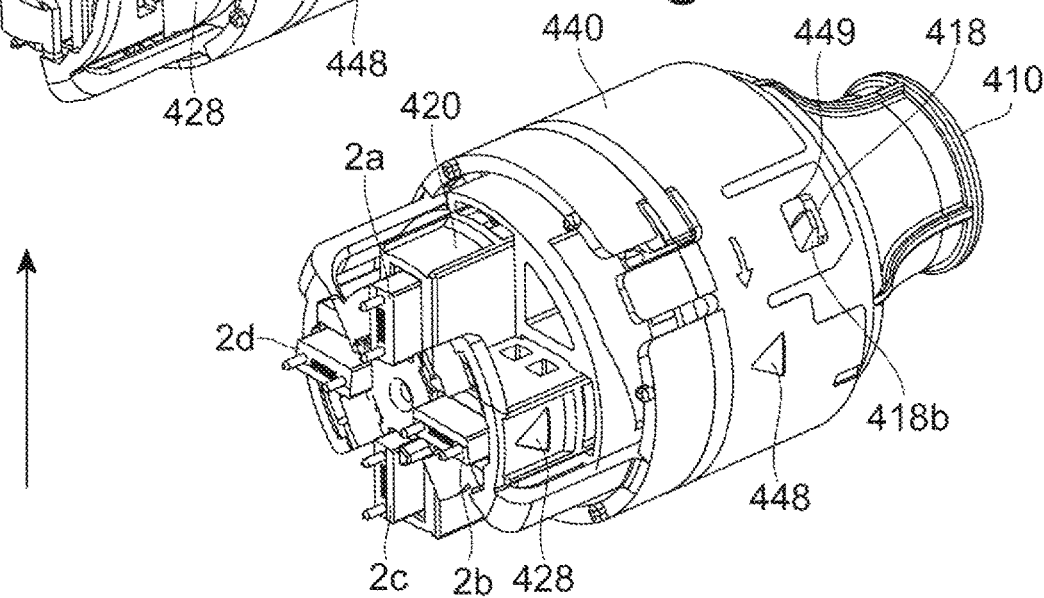
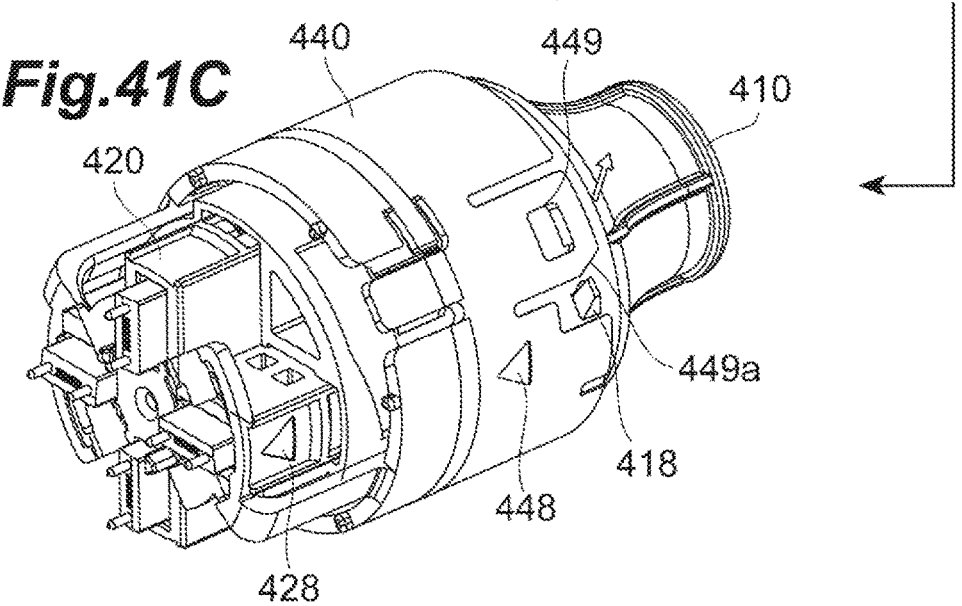

US 10,768,376 B2

OPTICAL CONNECTOR

TECHNICAL FIELD

The present disclosure relates generally to an optical connector.

SUMMARY

This disclosure provides an optical connector which has a center axis extending from a front end to a rear end. The optical connector includes a rear housing, an inner housing, an arm, and an outer housing. The rear housing is located at the rear end of the optical connector. The rear housing allows an optical fiber cable to be inserted therethrough. The inner housing comprises at a distal end thereof at least one retaining hole configured to house a ferrule. The inner housing is housed at a rear portion thereof in the rear housing. The inner housing is configured to allow the rear housing to move linearly with respect to the inner housing along the center axis and to allow the rear housing to rotate with respect to the inner housing about the center axis. The arm is configured to move linearly together with the rear housing with respect to the inner housing along the center axis. The outer housing is disposed on an outer periphery of the inner housing so as to cover a front portion of the inner housing. The outer housing is configured to rotate with respect to the inner housing about the center axis by a rotation guiding mechanism cooperating with the arm. The outer housing comprises a forward wall covering the distal end of the inner housing. The forward wall comprises at least one opening area. The opening area is configured to be aligned with the retaining hole or a fiber exposure face of the ferrule when the outer housing is rotated with respect to the inner housing from an initial position to a connected position by the rotation guiding mechanism.

BRIEF DESCRIPTION OF THE DRAWINGS

The foregoing and other purposes, aspects and advantages will be better understood from the following detailed description of embodiments of the disclosure with reference to the drawings, in which:

FIG. 9A to FIG. 9D are perspective views illustrating a locking action and an unlocking action in sequence by moving the rear housing linearly with respect to the inner housing in the optical connector illustrated in FIG. 1;

FIG. 10A to FIG. 10E are drawings schematically illustrating a series of actions of the outer housing of the optical connector at an initial position to rotate with respect to the inner housing and cause ferrules to project out from opening areas of the outer housing and to move back to the initial position in sequence;

FIG. 16A is a front view of the FIG. 15A, and FIG. 16B is a front view of the FIG. 15B;

FIGS. 41A, 41B and 41C are perspective views of the optical connector moving from the initial position to the connected position, and then moving from the connected position to the initial position;

DETAILED DESCRIPTION

Figure 1:
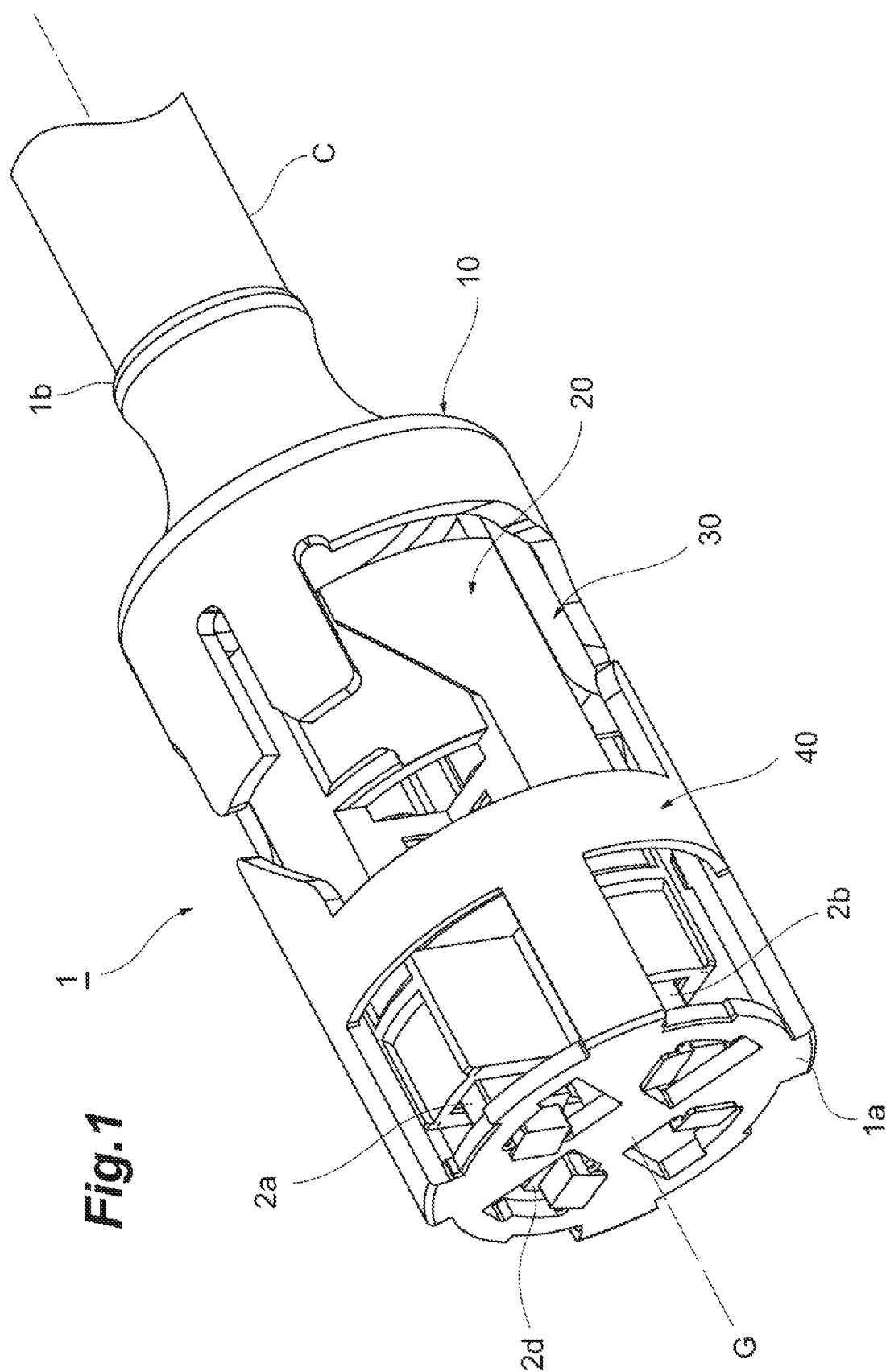
FIG. 1 is a perspective view of an optical connector according to a first embodiment.

Embodiments of the present disclosure will now be listed below in sequence. An optical connector according to one aspect of the disclosure has a center axis extending from a front end to a rear end. The optical connector comprises a rear housing, an inner housing, an arm, and an outer housing. The rear housing is located at the rear end of the optical connector. The rear housing allows an optical fiber cable to be inserted therethrough. The inner housing comprises at a distal end thereof at least one retaining hole configured to house a ferrule. The inner housing is housed at a rear portion thereof in the rear housing. The inner housing is configured to allow the rear housing to move linearly with respect to the inner housing along the center axis and to allow the rear housing to rotate with respect to the inner housing about the center axis. The arm is configured to move linearly together with the rear housing with respect to the inner housing along the center axis. The outer housing is disposed on an outer periphery of the inner housing so as to cover a front portion of the inner housing. The outer housing is configured to rotate with respect to the inner housing about the center axis by a rotation guiding mechanism cooperating with the arm. The outer housing comprises a forward wall covering the distal end of the inner housing. The forward wall comprises at least one opening area. The opening area is configured to be aligned with the retaining hole or a fiber exposure face of the ferrule when the outer housing is rotated with respect to the inner housing from an initial position to a connected position by the rotation guiding mechanism.

In the optical connector, the opening areas of the forward wall of the outer housing is moved to position aligned with the retaining hole for housing the ferrule or a fiber exposure surface of the ferrule when the outer housing is rotated by the rotation guiding mechanism with respect to the inner housing from the initial position to the connected position (rotated position). Therefore, the distal end of the ferrule, that is, the distal end of the optical fiber retained by the ferrule is exposed to the outside (protected so far) when rotated from the initial position to the connected position for inserting the optical connector to, for example, another connector, and thus contamination of the end surface of the optical fiber with dust and debris may be restricted. As the outer housing is rotated by using the rotation guiding mechanism, operation is easy.

In one embodiment, the rotation guiding mechanism may comprise a guide groove and a guide projection. The guide groove may be provided on one of an inner peripheral surface of the outer housing or an outer peripheral surface of a side wall of the arm. The guide groove may comprise an inclined portion inclining with respect to the center axis. The guide projection may be provided on the other of the inner peripheral surface of the outer housing or the outer peripheral surface of the side wall of the arm. The guide projection may projects toward the guide groove. The outer housing may rotate with respect to the inner housing between the initial position and the connected position in accordance with a movement of the guide projection in the guide groove. This embodiment provides the rotation guiding mechanism with a simple structure.

In one embodiment, the rotation guiding mechanism may comprise a pair of guide grooves and a pair of guide projections. The pair of guide grooves may be provided on one of an inner peripheral surface of the outer housing or outer peripheral surfaces of side walls of the arm. The pair of guide grooves may each comprise an inclined portion inclining with respect to the center axis. The pair of guide projections may be provided on the other of the inner peripheral surface of the outer housing or the outer peripheral surfaces of the side walls of the arm. The pair of guide projections may project respectively toward the guide grooves. The outer housing may rotate with respect to the inner housing between the initial position and the connected position in accordance with movements of the guide projections in the corresponding guide grooves. This embodiment provides the rotation guiding mechanism with a simple structure.

The pair of guide grooves may be configured such that directions of inclination of the respective inclined portions with respect to the center axis intersect with each other. The pair of guide grooves may each include a first straight portion and a second straight portion extending respectively from both ends of the inclined portion along the center axis. The pair of guide grooves may be provided on the inner peripheral surface of the outer housing, and the pair of guide projections may be provided respectively on the outer peripheral surfaces of the side walls of the arm. The outer housing may comprise a pair of engagement projections on the inner periphery thereof and the inner housing may comprise a pair of engagement shoulders on the outer periphery thereof. The pair of engagement projections may engage the pair of engagement shoulders to lock the outer housing to the inner housing.

In one embodiment, the optical connector may further comprise a resilient member pressing the outer housing toward the front end and pressing the arm or the rear housing toward the rear end. According to this embodiment, the resilient member may cause the outer housing and the arm (or the rear housing) to be restored easily to the initial position when the engagement of the outer housing and rear housing with respect to the inner housing is released. In addition, the optical connector may further comprise a first resilient member pressing the outer housing toward the front end with respect to the inner housing; and a second resilient member pressing the arm or the rear housing toward the rear end with respect to the inner housing. In this case as well, the outer housing and other members may be restored easily to the initial positions.

In one embodiment, the inner housing may have a substantially cylindrical shape, and comprise a pair of notches formed partly therein along the center axis, and the arm may comprise at least a pair of side walls each having an arcuate shape in cross section. The pair of side walls of the arm may be housed respectively in the pair of notches and may be linearly movable with respect to the inner housing in the notches. According to this embodiment, the inner housing and the arm may be arranged efficiently, and thus downsizing of the optical connector is achieved. In this embodiment, the outer peripheral surface of the inner housing and the outer peripheral surfaces of the pair of side walls of the arm may be aligned.

In one embodiment, the arm may comprise at least a pair of side walls each having an arcuate shape in cross section, and the side walls may include protrusions projecting outward respectively in rear portions thereof. The rear housing may comprise a circumferential groove extending circumferentially in an inner peripheral surface thereof; and the protrusions of the arm may be housed in the circumferential groove to allow the arm to rotate with respect to the rear housing.

In one embodiment, the inner housing may comprise a shoulder in a peripheral surface thereof and a depressed surface or a void on a side of the shoulder in the circumferential direction and in an area extending from the side toward the rear end along the direction of the center axis. The rear housing may comprise a latch and a sliding projection. When the rear housing moves linearly toward the front end along the center axis, the latch of the rear housing climbs over the shoulder of the inner housing to make the rear housing be locked to the inner housing.

In the embodiment described above, when the rear housing rotates in a circumferential direction after the rear housing is locked to the inner housing, the latch of the rear housing may be disengaged from the shoulder to allow the sliding projection of the rear housing to move toward the rear end on the depressed surface or the void of the inner housing to unlock the rear housing. The depressed surface or the void of the inner housing may comprise an inclined surface for guiding the sliding projection of the rear housing to an unlocking position. The shoulder and the latch may be configured to generate a click when the latch climbs over the shoulder and is engaged.

In one embodiment, the optical connector may further comprise an adapter lock reinforcement member that surrounds the inner housing. The inner housing may comprise a recess configured to engage a latch provided with an adapter, and the adapter lock reinforcement member may comprise a reinforcement plate that covers the recess of the inner housing and a releasing protrusion placed adjacent to the depressed surface or in the void of the inner housing. When the rear housing is locked to the inner housing and the latch of the adapter is engaged with the recess of the inner housing, and then the rear housing is rotated in the circumferential direction, the latch of the rear housing may be released from the engagement of the shoulder of the inner housing, and the sliding projection of the rear housing may move toward the releasing protrusion of the adapter lock reinforcement member and then may push the releasing protrusion along the circumferential direction, thereby the adapter lock reinforcement member may move toward the rear end along the center axis and the reinforcement plate may be released from the recess of the inner housing.

In the above embodiment, the rear housing may comprise a slope provided with the inner surface of the rear housing, the slope extending along the circumferential direction, and a shoulder provided at a termination of the slope. The inner housing may comprise a protrusion that faces the slope and the shoulder. When the rear housing is locked to the inner housing and the latch of the adapter is engaged with the recess of the inner housing, and then the rear housing is rotated in the circumferential direction, the protrusion of the inner housing may ascend the slope toward the shoulder and may generate a click by dropping down from the shoulder when the reinforcement panel is released from the recess.

In one embodiment, the outer housing may comprise a cleaner inside the forward wall. The cleaner may clean a distal end of an optical fiber. The cleaner may be bonded to the forward wall so as to extend in parallel to a plane orthogonal to the center axis, or the cleaner may be bonded to the forward wall so as to incline with respect to a plane orthogonal to the center axis. According to this embodiment, when the optical connector is rotated from the initial position to the connected position for inserting this optical connector into, for example, another connector, the distal end of the ferrule may further be cleansed by the cleaner.

In one embodiment, the optical connector may further comprise a ferrule housing a distal end portion of at least one optical fiber housed in the optical fiber cable. According to this embodiment, the ferrule may achieve the optical fiber positioned with high degree of accuracy. The optical connector may further comprise an optical fiber cable which includes a plurality of optical fibers housed therein and is inserted into the rear housing.

In one embodiment, the optical connector may further comprise a ferrule housing a distal end portion of at least one optical fibers housed in the optical fiber cable. The ferrule may be provided with a recess at a center of a front end thereof. For example, when the optical connector having the configuration described above is downsized, the rotation of the outer housing may be inhibited with the ferrule of the related art. However, by employing the configuration of the ferrule with the central region removed, which may otherwise inhibit the rotation, downsizing of the optical connector is easily achieved.

In one embodiment, one of the rear housing or the outer housing may comprise at least one locking protrusion, and the other of the rear housing or the outer housing may comprise at least one locking opening configured to receive the locking protrusion. The locking protrusion may engage with the locking opening to make the outer housing be locked to the rear housing when the rear housing moves linearly toward the front end along the center axis. This embodiment can make a user of the optical connector realize that the outer housing is firmly locked to the rear housing, that is, the optical connector certainly transits the initial position to the connected position. In this embodiment, the locking protrusion may be disengaged from the locking opening to unlock the outer housing from the rear housing when the rear housing rotates in a circumferential direction after the outer housing is locked to the rear housing. The locking protrusion may be provided with an outer periphery surface of the rear housing, and the locking opening may be provided with the outer housing.

In the above embodiment, the outer housing may comprise an inclined surface configured to guide the locking protrusion toward the initial position. The inclined surface may be located adjacent to the locking opening and be inclined with respect to the center axis. This embodiment can provide smooth movement of the optical connector returning from the connected position to the initial position.

In one embodiment, the locking protrusion may include a first sloped surface extending along the center axis. This embodiment facilitates locking movement of the locking protrusion to the locking opening. The locking protrusion may include a second sloped surface extending along a circumferential direction of the outer housing. This embodiment facilitates unlocking movement of the locking protrusion from the locking opening.

In one embodiment, the rear housing may comprise a pair of locking protrusions, and the outer housing comprises a pair of locking openings. The pair of the locking protrusions may respectively engage with the pair of the locking openings to make the outer housing be locked to the rear housing when the rear housing moves linearly toward the front end along the center axis. This embodiment can balance the locking movement of the locking protrusions to the locking openings.

In one embodiment, the outer housing may comprise a cleaner located at least inside the forward wall. The cleaner cleans a distal end of an optical fiber. The cleaner may be wound around the forward wall through the opening area. This embodiment can remove use of an adhesive for bonding the clear to the forward wall so as to avoid contaminating the distal end of the optical fiber with the adhesive. The forward wall may include an acute portion that is not parallel to a front surface of the ferrule. The cleaner may be placed on a surface of the acute portion. This embodiment can enhance the cleaning of the distal end of the optical fiber by the cleaner.

The present disclosure also provides a method of connecting the optical connector according to any one of the embodiments describe above to another optical connector. This connecting method comprises: (a) linearly moving the rear housing with respect to the inner housing along the center axis; (b) linearly moving the arm toward the front end along the center axis in association with the step (a); and (c) converting the linear movement of the arm into a rotational movement of the outer housing by the rotation guiding mechanism partly provided on the arm, and rotating the outer housing from the initial position to the connected position in association with the step (b). In the step (c), the ferrule housed in the retaining hole is located in the opening area provided in the forward wall of the outer housing, and a distal end portion of the ferrule is pushed out from the forward wall.

Referring now to the drawings, specific examples of an optical connector according to the embodiments of the invention will be described. The invention is not limited to the illustrations but is defined by claims, and is intended to include any modification within the meaning and scope equivalent to the claims. In the following description, the same components are designated by the same reference numerals and overlapped description will be omitted as needed.

First Embodiment

Figure 2:
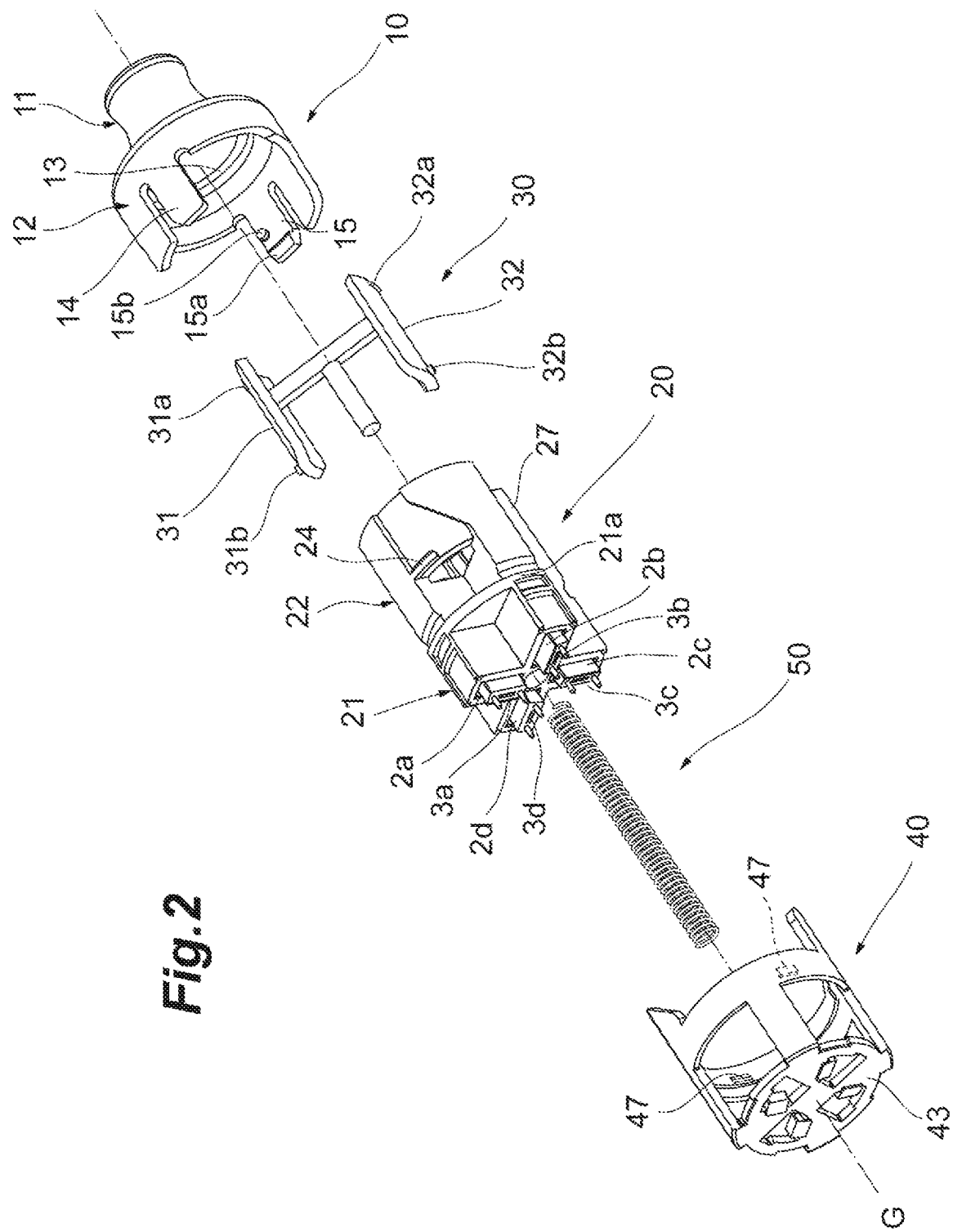
FIG. 2 is an exploded perspective view of the optical connector illustrated in FIG. 1.

FIG. 1 is a perspective view illustrating an optical connector according to a first embodiment. FIG. 2 is an exploded perspective view of the optical connector illustrated in FIG. 1. The optical connector 1 is a substantially column shaped connecting member extending along a center axis G extending from a front end 1a to a rear end 1b as illustrated in FIG. 1. An optical fiber cable C is used by being inserted into an interior of the optical connector 1 from the rear end 1b of the optical connector 1. The optical fiber cable C houses a number of (ninety-six in an example) optical fibers in the interior thereof. The optical connector 1 includes a plurality of (four in an example) ferrules 2a to 2d disposed on the front end 1a. The ferrules 2a to 2d are, for example, MT ferrules. The ferrules 2a to 2d each house distal end portions of a plurality of (twelve or twenty-four in an example) optical fibers F of the optical fiber cable C, and expose distal ends of the optical fibers F from front end surfaces 3a to 3d. An outline of the optical connector 1 is not limited to the substantially cylindrical shape, but may be a substantially square prism shape. The number and the type of the optical fibers F and the ferrules 2a to 2d used in the optical connector 1 are not specifically limited. In the following description, a side where the ferrules 2a to 2d are disposed may be referred to as "front (end)" or "forward", and a side to insert the optical fiber cable C may be referred to as "rear (end)" or "rearward".

The optical connector 1 includes, as illustrated in FIG. 1 and FIG. 2, a rear housing 10, an inner housing 20, an arm 30, an outer housing 40, and a resilient member 50. The optical connector 1 houses the inner housing 20, the arm 30, and the resilient member 50 inside the rear housing 10 and the outer housing 40.

Figure 3:
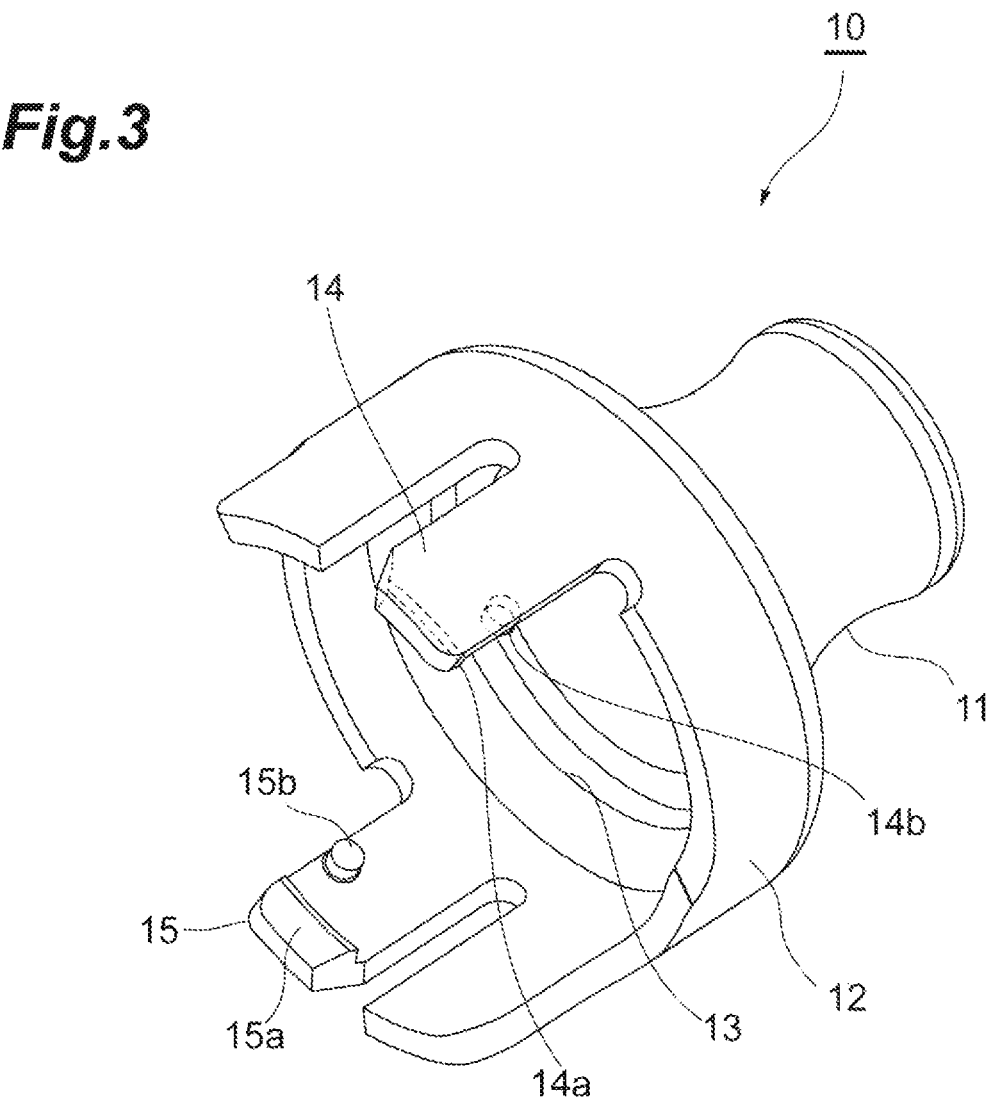
FIG. 3 is a perspective view of a rear housing of the optical connector illustrated in FIG. 1.

The rear housing 10 is a member located around the rear end 1b of the optical connector 1 as illustrated in FIG. 1 to FIG. 3, and allows the optical fiber cable C to be inserted therein. FIG. 3 is a perspective view of the rear housing 10. The rear housing 10 includes a boot portion 11 having an inner hole for allowing insertion of the optical fiber cable C or the optical fibers F therethrough, and a housing portion 12 formed to communicate with the boot portion 11 and having a larger outer diameter than the boot portion 11. The housing portion 12 has a substantially cylindrical shape and is provided with a circumferential groove 13 extending circumferentially in an area of an inner peripheral surface adjacent to the boot portion 11. The circumferential groove 13 houses protrusions 31a and 32a provided on a pair of side walls 31 and 32 (see FIG. 2 and FIG. 5) of the arm 30, which allows the aim 30 to rotate with respect to the rear housing 10 about the center axis G. The optical fiber cable C may not be fixed to the rear housing 10.

The rear housing 10 includes a pair of projecting strips 14 and 15 extending along the center axis G on the housing portion 12, and the pair of projecting strips 14 and 15 are provided at positions of point symmetry with respect to the center axis G or rotational symmetry about the center axis G. The projecting strips 14 and 15 are portions for locking the rear housing 10 to the inner housing 20 in the direction along the center axis G. The projecting strips 14 and 15 are provided with latches 14a and 15a and sliding projections 14b and 15b on the inner peripheral surfaces in such a way as to project respectively inward. When the rear housing 10 moves linearly forward with respect to the inner housing 20 along the center axis G, the latches 14a and 15a climb over shoulders 24 (see FIG. 2 and FIG. 4) of the inner housing 20 and engages the shoulders 24, respectively. The latches 14a and 15a and the shoulders 24 can be configured to generate a click in this operation to provide perception of engagement between the rear housing 10 and the inner housing 20 when the latches 14a and 15a climb the shoulders 24 and achieve the engagement. The sliding projections 14b and 15b have a cylindrical shape. The rear housing 10 may be made of a resin material such as polycarbonate (PC), polyetherimide (PEI), polyamide (PA), polyacetal (POM), polyphenylene ether (PPE), polybutylene terephthalate (PBT), or polyethersulfone (PES), and has a predetermined toughness and low friction sliding characteristics. The inner housing 20, the arm 30, and the outer housing 40 may be made of the same material.

Figure 4:
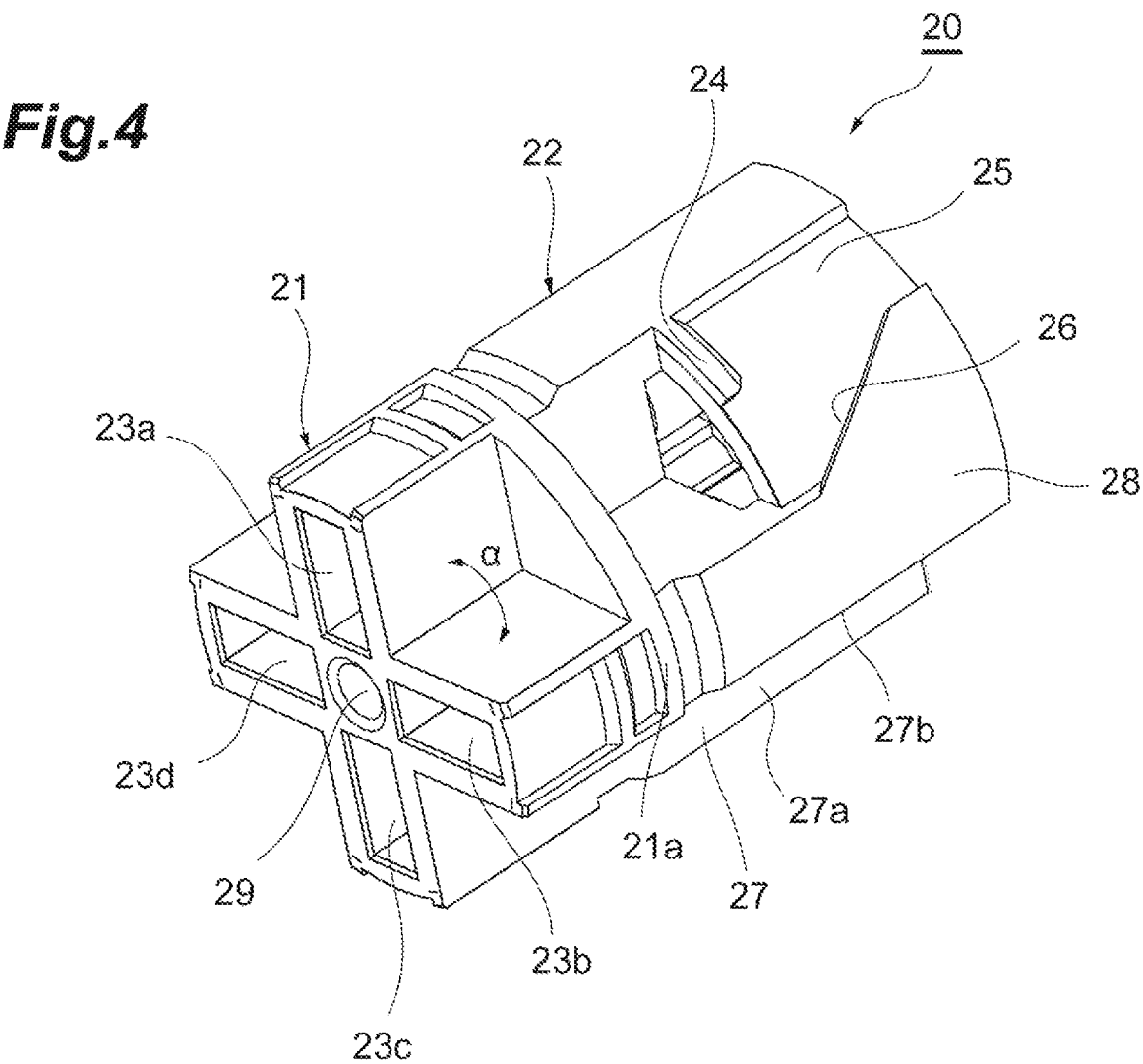
FIG. 4 is a perspective view of an inner housing of the optical connector illustrated in FIG. 1.

The inner housing 20 includes a front portion 21 and a rear portion 22 as illustrated in FIG. 2 and FIG. 4. FIG. 4 is a perspective view of the inner housing 20. As illustrated in FIG. 4, the front portion 21 includes four retaining holes 23a to 23d for housing, for example, the ferrules 2a to 2d. The retaining holes 23a to 23d each have a rectangular shape and opening forward, and are configured to cause the front end surfaces 3a to 3d of the ferrules 2a to 2d face forward when the ferrules 2a to 2d are housed in the retaining holes 23a to 23d. The openings of the retaining holes 23a to 23d are holes penetrating to the rear to allow the optical fibers retained by the ferrules 2a to 2d to extend over the rear housing 10 into the optical fiber cable C. The retaining holes 23a to 23d house at regions corresponding to the rear portion 22 four spring members which bias the ferrules 2a to 2d forward respectively, and the ferrule 2a to 2d are biased forward. The retaining holes 23a to 23d are arranged in such a way that an angle α between adjacent retaining holes is, for example, 90 degrees. The inner housing 20 is not limited to a configuration having four retaining holes for housing the ferrules, and may have any configuration as long as one or more retaining holes for housing the ferrules are provided. A pair of engagement shoulders 21a configured to engage a pair of engagement projections provided on an inner periphery of the outer housing 40 are provided between the front portion 21 and the rear portion 22 of the inner housing 20.

The rear portion 22 of the inner housing 20 has an outline of a substantially cylindrical shape partly notched, and includes a pair of shoulders 24, a pair of depressed surfaces 25, and a pair of inclined surfaces 26. FIG. 4 discloses only one of the shoulders 24, depressed surfaces 25, and inclined surfaces 26. The other shoulder 24, depressed surface 25, and inclined surface 26, which are disposed in point symmetry about the center axis G or in rotational symmetry with respect to the center axis G, have the same configurations. The shoulders 24 are projecting portion extending in the circumferential direction and engage the latches 14a and 15a of the rear housing 10. The depressed surfaces 25 are outer peripheral surfaces depressed inward with respect to the shoulders 24, and each include an area on a side of the shoulder 24 in the circumferential direction and a substantially trapezoidal area extending from the side toward the rear end along the center axis G. The depressed surfaces 25 are partly provided with the inclined surfaces 26. The inclined surfaces 26 are inclined from the front rearward to reduce the circumferential width of the depressed surfaces 25. When rotating the rear housing 10 with respect to the inner housing 20 after the latches 14a and 15a engage the shoulders 24, the latches 14a and 15a are disengaged from the shoulders 24, then the sliding projections 14b and 15b of the rear housing 10 slide on the inclined surfaces 26 and move rearward, and then the rear housing 10 is restored to the initial position.

The front portion 21 and the rear portion 22 of the inner housing 20 include a pair of notches 27 extending from the front end toward the rear end between areas in the circumferential direction where the pair of shoulders 24 are provided. The notches 27 are provided between the retaining holes 23b and 23c and between the retaining holes 23a and 23d on the front portion 21. The notches 27 have a fan shape having an angle of 90 degrees in cross section, and house respectively the pair of side walls 31 and 32 of the arm 30. The outer peripheries of the side walls 31 and 32 of the arm 30 housed in the notches 27 align with an outer peripheral surface 28 surrounding the depressed surfaces 25 of the inner housing 20. Surfaces 27a and 27b defining the notches 27 are not provided with any obstacle such as a projection which inhibits a linear movement of the side walls 31 and 32 of the arm 30 to be housed along the center axis G, so that the arm 30 may move with respect to the inner housing 20 linearly along the center axis G. The inner housing 20 is also provided with a through hole 29 extending from the front end to the rear end through central portions of the front portion 21 and the rear portion 22. A resilient member 50 such as a spring is housed in the through hole 29.

Figure 5:
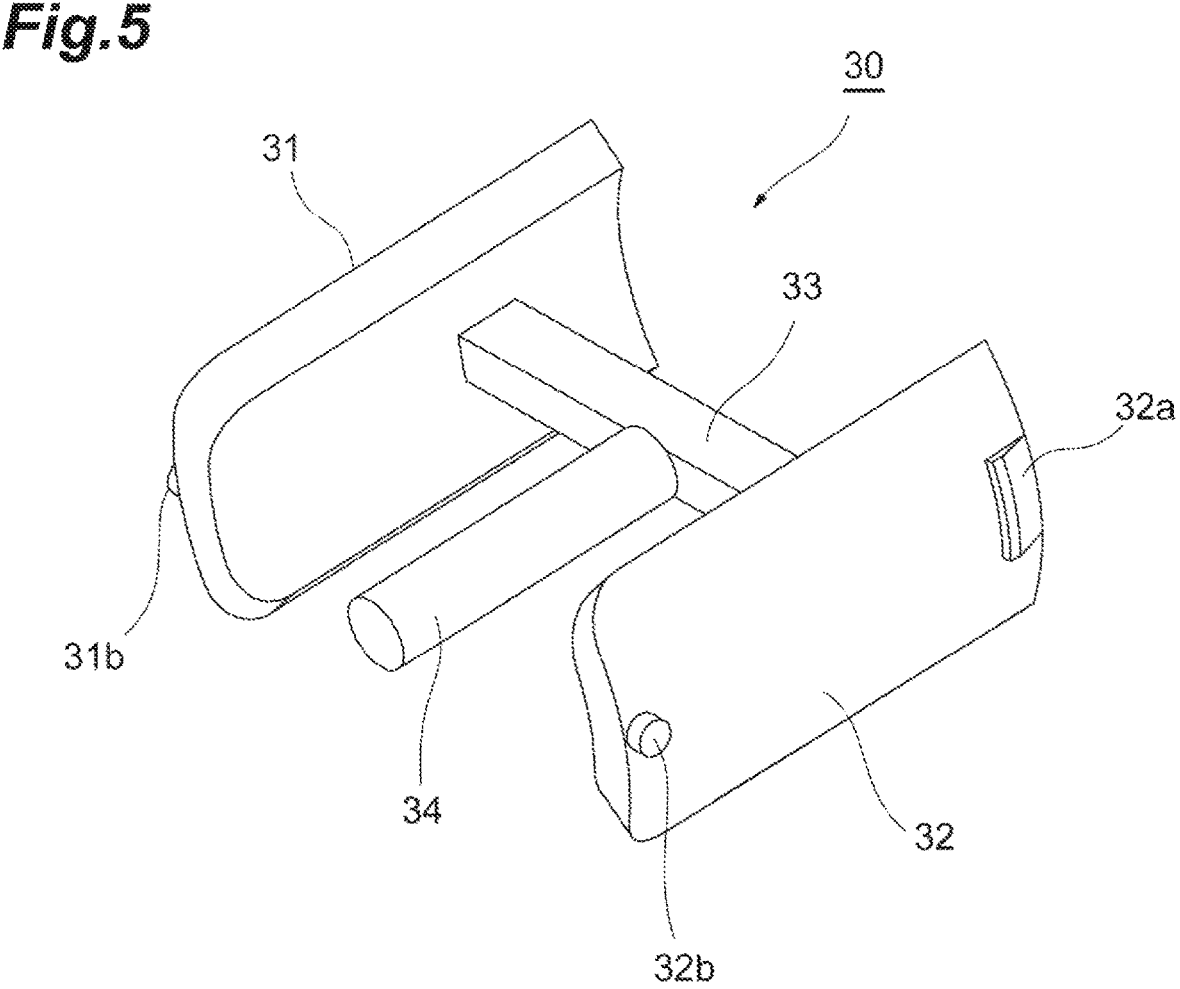
FIG. 5 is a perspective view of an arm of the optical connector illustrated in FIG. 1.

The arm 30 includes the pair of side walls 31 and 32, a coupling member 33 coupling the side walls 31 and 32, and a receiving member 34 extending from a center of the coupling member 33 toward the front end as illustrated in FIG. 2 and FIG. 5. FIG. 5 is a perspective view of the arm 30. The side walls 31 and 32 have an arcuate shape in cross section, and include protrusions 31a and 32a at rear portions and guide projections 31b and 32b at front portions in a direction along the center axis G. The guide projections 31b and 32b have a cylindrical shape. The protrusions 31a and 32a are housed in the circumferential groove 13 of the rear housing 10 and engage the arm 30 in a state of rotatable with respect to the rear housing 10. The guide projections 31b and 32b constitute part of a rotation guiding mechanism S (see FIG. 8A and FIG. 8B) for converting the linear movement of the arm 30 along the center axis G into a rotational movement of the outer housing 40, and are housed in the guide grooves 41 and 42 of the outer housing 40. The receiving member 34 receives a rear end of the resilient member 50 such as the spring. Accordingly, the arm 30 is presses rearward, that is, toward the rear housing 10.

Figure 6A:
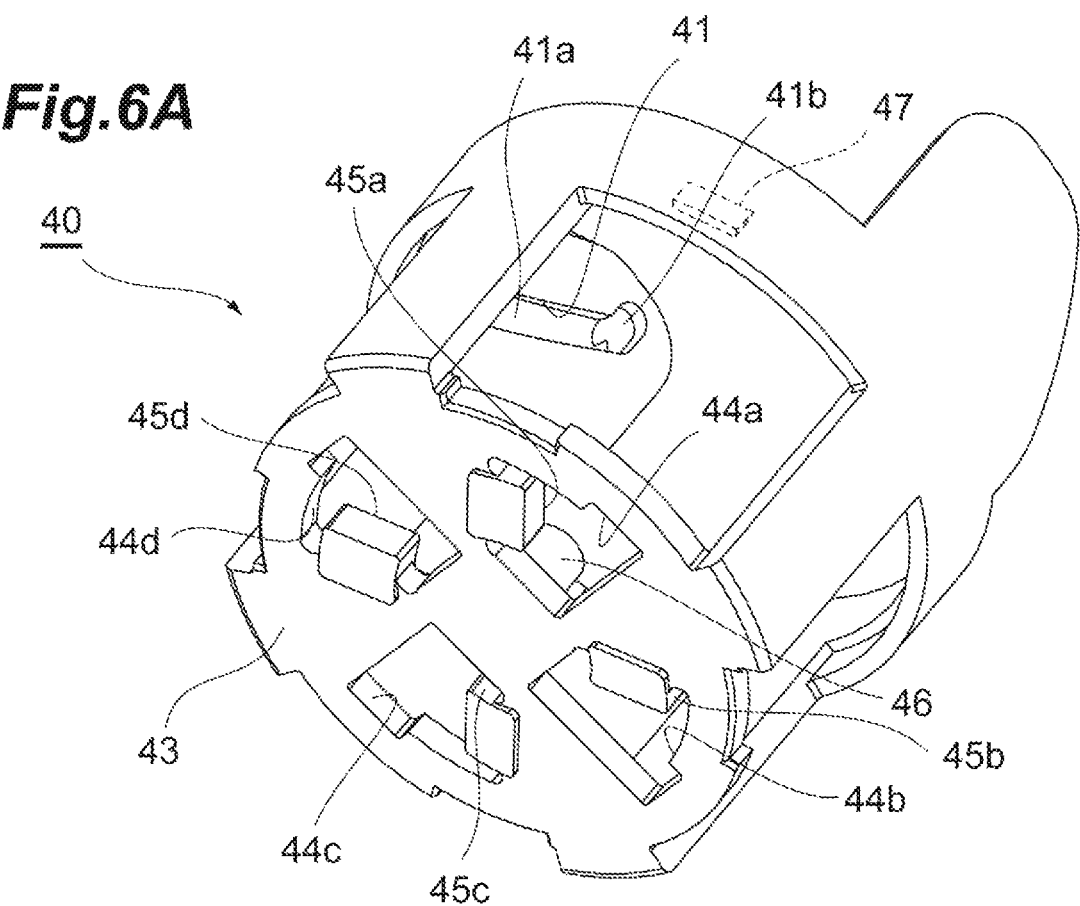
FIG. 6A is a perspective view of an outer housing of the optical connector illustrated in FIG. 1.
Figure 6B:
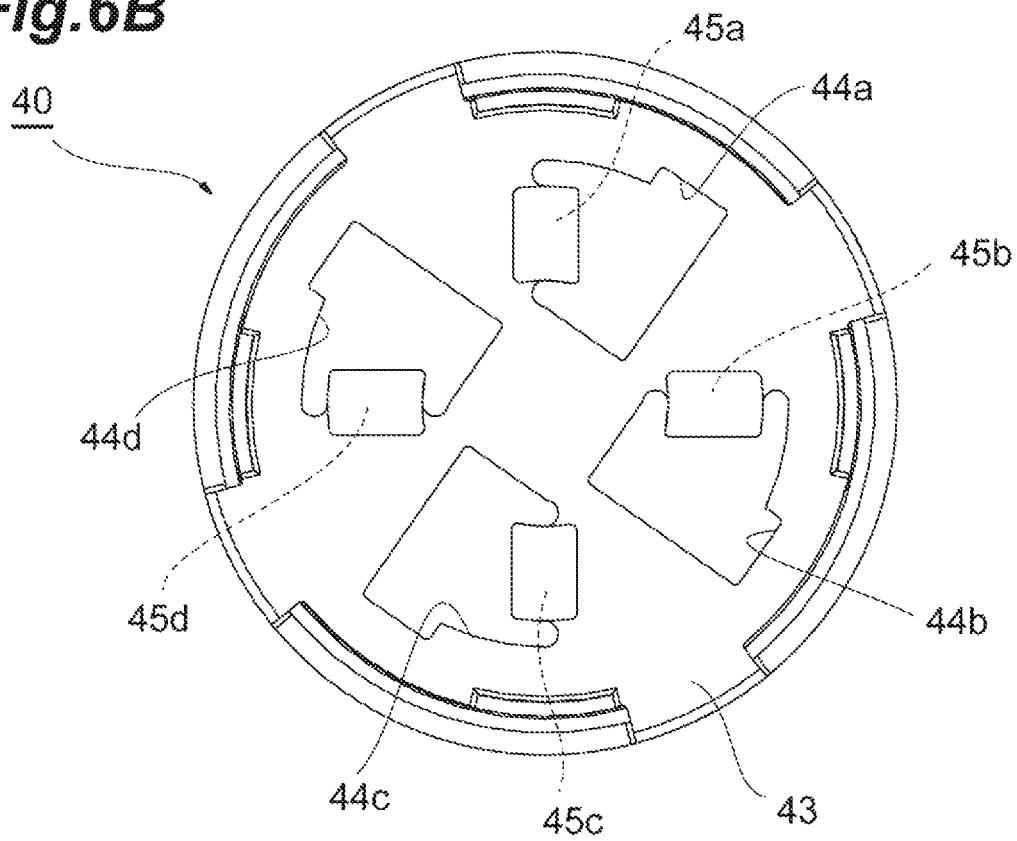
FIG. 6B is a front view of the outer housing viewed from the front.

The outer housing 40 includes guide grooves 41 and 42, a forward wall 43, opening areas 44a to 44d, cleaners 45a to 45d, a receiving member 46, and a pair of engagement projections 47 as illustrated in FIG. 2, FIG. 6A, and FIG. 6B. FIG. 6A is a perspective view of the outer housing 40, and FIG. 6B is a front view viewed from the front of the outer housing 40. The receiving member 46 receives a front end of the resilient member 50 such as the spring. Accordingly, the outer housing 40 is pressed forward. However, the outer housing 40 is prevented from coming apart from the inner housing 20 because the pair of engagement projections 47 provided on an inner periphery of the outer housing 40 are configured to engage the engagement shoulders 21a of the inner housing 20.

Figure 8A:
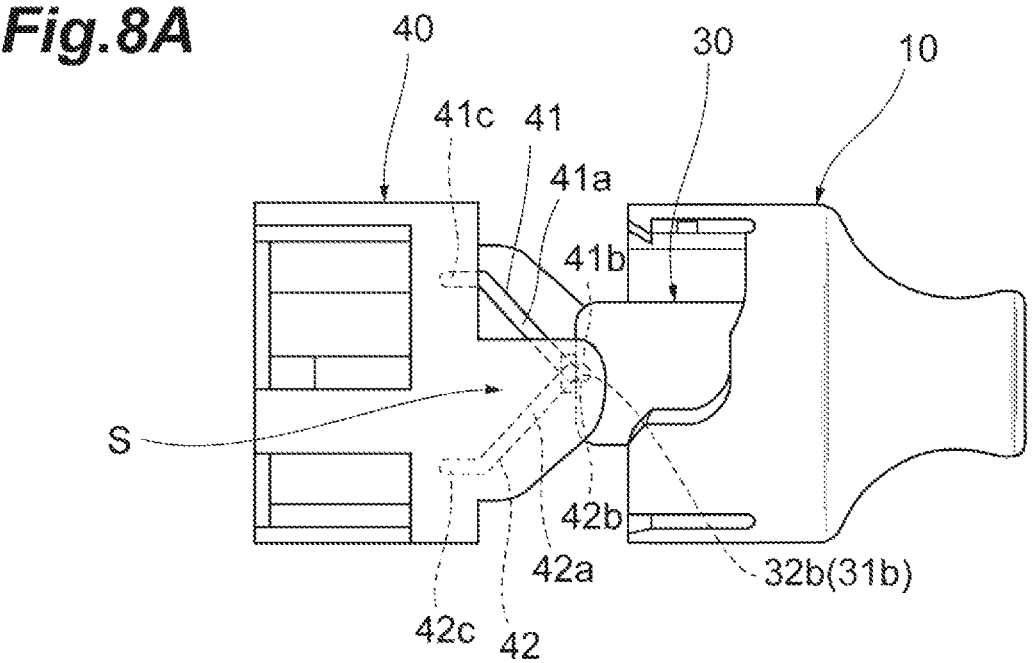
FIG. 8A is a drawing for explaining an action of moving the rear housing linearly with respect to the outer housing.
Figure 8B:
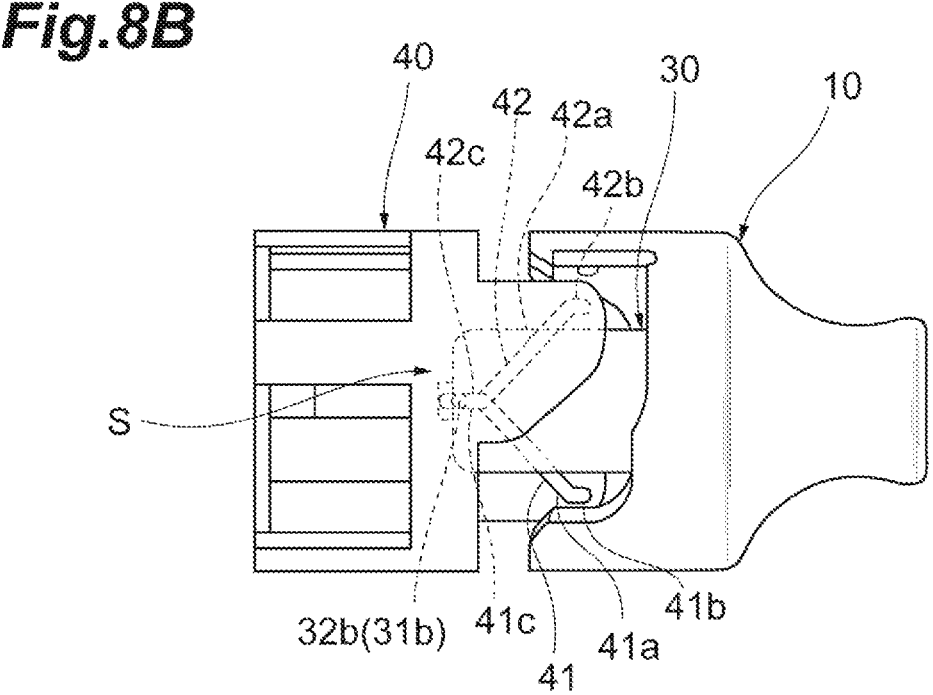
FIG. 8B is a drawing for explaining an action of further moving the rear housing linearly with respect to the outer housing from a state illustrated in FIG. 8A.

The guide grooves 41 and 42 include inclined portions 41a and 42a inclined with respect to the center axis G, first straight portions 41b and 42b and second straight portions 41c and 42c extending respectively from both ends of the inclined portions 41a and 42a along the center axis G (See FIG. 8A and FIG. 8B). When the rear housing 10 is linearly moved forward with respect to the inner housing 20, the arm 30 also move linearly together with the rear housing 10 forward with respect to the inner housing 20. With this movement, by the movement of the guide projections 31b and 32b of the arm 30 from the first straight portion 41b to the inclined portion 41a and then forward in the inclined portion 41a of the guide grooves 41 and 42, the outer housing 40 rotates by a predetermined angle (30 degrees to 60 degrees, 35 degrees in this embodiment as one example)

with respect to and approaches the inner housing 20. The rotation guiding mechanism S configured to provide the outer housing 40 with such rotation includes the guide projections 31b and 32b of the arm 30 and the guide grooves 41 and 42 of the outer housing 40. The ferrules 2a to 2d (fiber exposure surfaces) housed in the inner housing 20 or the retaining holes 23a to 23d are aligned with the opening areas 44a to 44d of the forward wall 43 of the outer housing 40 by the rotational movement of the rotation guiding mechanism S. When the rear housing 10 is further pushed forward, the guide projections 31b and 32b move further forward in the second straight portions 41c and 42c located at the other ends of the inclined portions 41a and 42a and the front end surfaces 3a to 3d of the ferrules 2a to 2d project further forward of the forward wall 43 of the outer housing 40.

The cleaners 45a to 45d of the outer housing 40 are adhered to one of edges of the respective opening areas 44a to 44d inside the forward wall 43. The cleaners 45a to 45d are cloth-made cleaner for removing contamination of the distal ends of the optical fibers F retained at the distal end portions thereof by the ferrules 2a to 2d with dust and debris. The cleaners 45a to 45d are bonded to the inside of the forward wall 43, for example, with an adhesive agent and are configured to be replaced when needed. When replacing the cleaners 45a to 45d, replacing only the cleaners 45a to 45d, or replacing the outer housing 40 having the cleaners 45a to 45d adhered thereto with another outer housing 40 having new cleaners 45a to 45d are both possible. Positions to adhere the cleaners 45a to 45d are preset such that the cleaners 45a to 45d are aligned with the ferrules 2a to 2d, that is, face the front end surfaces 3a to 3d when the outer housing 40 has completely rotated with respect to the inner housing 20 and returned to the initial position.

The cleaners 45a to 45d at the initial positions are slightly apart from the front end surfaces 3a to 3d of the ferrules 2a to 2d. When the outer housing 40 rotates, the inner housing 20 moves slightly forward with respect to the outer housing 40, and the forward movement presses the front end surfaces 3a to 3d of the ferrules 2a to 2d against the cleaners 45a to 45d. When the outer housing 40 further rotates, the ferrules 2a to 2d with the front end surfaces 3a to 3d pressed against the cleaners 45a to 45d move toward the opening areas 44a to 44d, and the rotational movement of the cleaners 45a to 45d at this time cleans the front end surfaces 3a to 3d of the ferrules 2a to 2d. When the optical connector 1 is used for optical connection, the cleaning in this manner inhibits reduction of probability of connection loss due to contamination with dust and debris. The cleaners 45a to 45d in the initial position are adhered to the forward wall 43 in parallel to the front end surfaces 3a to 3d of the ferrules 2a to 2d with a small clearance, but may be adhered to the forward wall 43 at an inclination with respect to the plane orthogonal to the center axis G when the front end surfaces 3a to 3d of the ferrules 2a to 2d are inclined surfaces. The cleaners 45a to 45d may be disposed in contact with the front end surfaces 3a to 3d of the ferrules 2a to 2d at the initial position if the rotation of the outer housing 40 is not inhibited. Note that the outer housing 40 may be made of the same material as the rear housing 10 as described above, while the outer housing may be made of a transparent material (for example, resin material such as polycarbonate or polyetherimide) to make, for example, the positions of the ferrules 2a to 2d visible from the outside.

The resilient member 50 is a member configured to press the outer housing 40 toward the front end 1a and press the arm 30 toward the rear end 1b or the rear housing 10. When the optical connector 1 rotates to the connected position to allow connection with another connector and then the connection is cancelled, the resilient member 50 restores the members of the optical connector 1 respectively to the initial positions by the resilient force. The resilient member 50 is, for example, a single spring extending from the receiving member 46 provided on the inner peripheral surface of the forward wall 43 of the outer housing 40 to the receiving member 34 of the arm 30. The resilient member 50 is housed in the through hole 29 (see FIG. 4) provided in an interior of the inner housing 20 in a compressed state to some extent. The resilient member 50 is not limited to the single spring, and may include a plurality of springs including a first spring provided between the receiving member 46 of the outer housing 40 and the central region of the inner housing 20 to press the outer housing 40 forward, and a second spring provided between the receiving member 34 of the arm 30 and the central region of the inner housing 20 to press the arm 30 rearward. In this case, a bottom portion for receiving the first spring and the second spring may be provided at a central region of the through hole 29 of the inner housing 20. While the arm 30 and the outer housing 40 are pressed outward by the resilient member 50, the arm 30 and the outer housing 40 are coupled to each other by the guide projections 31b and 32b and the guide grooves 41 and 42, which constitute the rotation guiding mechanism S, and thus are prevented from being decoupled.

Figure 7:
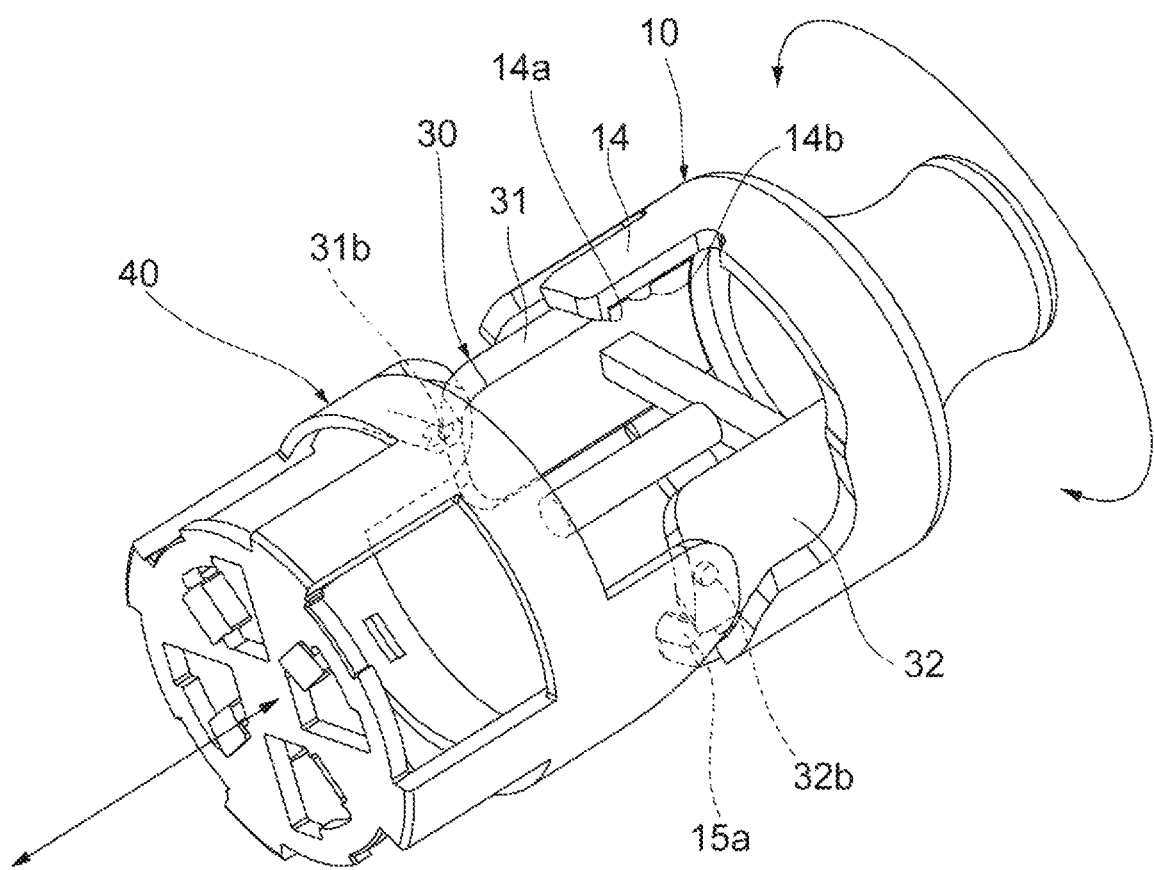
FIG. 7 is a perspective view for explaining a coupling relationship between the rear housing, the arm, and the outer housing in the optical connector illustrated in FIG. 1.

Referring now to FIG. 7, FIG. 8A, and FIG. 8B, a coupling relationship between the rear housing 10, the arm 30 and the outer housing 40 will be described. FIG. 7 is a perspective view for explaining a coupling relationship between the rear housing, the arm, and the outer housing in the optical connector. FIG. 8A is a drawing for explaining an action of moving the rear housing linearly with respect to the outer housing. FIG. 8B is a drawing for explaining an action of moving the rear housing linearly with respect to the outer housing further from a state illustrated in FIG. 8A.

A coupling relationship between the rear housing 10 and the arm 30 will now be described. As illustrated in FIG. 7, the arm 30 is mounted on the rear housing 10 in a state of being relatively rotatable with respect to the rear housing 10 about the center axis G by the protrusions 31a and 32a provided at the rear ends of the side walls 31 and 32 and housed in the circumferential groove 13 of the rear housing 10. As the rear housing 10 is provided with the latches 14a and 15a and the sliding projections 14b and 15b on the inner periphery of the rear housing 10, the rotation of the arm 30 with respect to the inner housing 20 is limited to a certain angle.

A coupling relationship and an operational relationship of the rear housing 10 and the arm 30 with respect to the outer housing 40 will now be described. As illustrated in FIG. 7, FIG. 8A and FIG. 8B, the arm 30 is coupled to the outer housing 40 by the guide projections 31b and 32b provided at the front ends of the side walls 31 and 32 housed from the inner peripheral surface side to the guide grooves 41 and 42 of the outer housing 40. The arm 30 is disposed in the notch of the inner housing 20, not illustrated in FIG. 7, to avoid bending circumferentially inward, and thus the guide projections 31b and 32b of the arm 30 are prevented from coming off the guide grooves 41 and 42 of the outer housing 40. When the outer housing 40 is at the initial position (the position before rotation), the guide projections 31b and 32b are positioned in the first straight portions 41b and 42b of the guide grooves 41 and 42.

As illustrated in FIG. 8A, when the rear housing 10 is pushed from the rear end toward the front end, the arm 30 with the protrusions 31a and 32a housed in the circumferential groove 13 of the rear housing 10 also moves toward the front end. On this occasion, since the rear housing 10 pushes the inner housing 20, not illustrated in FIG. 8A, forward, the front end surfaces 3a to 3d of the ferrules 2a to 2d housed in the inner housing 20 are pressed to the cleaner 45a to 45d of the outer housing 40. With this operation, the guide projections 31b and 32b of the arm 30 moves from the first straight portions 41b and 42b of the guide grooves 41 and 42 to the inclined portions 41a and 42a. As illustrated in FIG. 8B, when the rear housing 10 is further pushed toward the front end, the guide projections 31b and 32b of the arm 30 moves the inclined portions 41a and 42a of the guide grooves 41 and 42 to positions near the second straight portions 41c and 42c. This movement causes the outer housing 40 to rotate with respect to the rear housing 10 and the arm 30 by a predetermined angle about the center axis G and to approach the rear housing 10. Note that the outer housing 40 rotates with respect to the inner housing 20, not illustrated by a predetermined angle about the center axis G. When the rear housing 10 is pushed further forward, the guide projections 31b and 32b of the arm 30 enters the second straight portions 41c and 42c from the inclined portions 41a and 42a. Simultaneously, the rear housing 10 pushes the inner housing 20, not illustrated, forward, and thus the front end surfaces 3a to 3d of the ferrules 2a to 2d housed in the inner housing 20 project from the opening areas 44a to 44d of the immobile outer housing 40 to be ready to connect to another optical connector.

Referring now to FIG. 9A to FIG. 9D, an operational relationship between the rear housing 10 and the inner housing 20 will be described. As illustrated in FIG. 9A, when the optical connector 1 is at the initial position, the rear housing 10 is linearly movable with respect to the inner housing 20 along the center axis G, and is rotatable about the center axis G. When the rear housing 10 moves forward with respect to the inner housing 20 along the center axis G, the latches 14a and 15a provided on the inner peripheral surfaces of the projecting strips 14 and 15 of the rear housing 10 move toward the shoulders 24 of the inner housing 20. When the latches 14a and 15a climb over the shoulders 24 into engagement therewith as illustrated in FIG. 9B, a linear movement of the rear housing 10 with respect to the inner housing 20 is locked. When the rear housing 10 moves forward from a state illustrated in FIG. 9A to a state illustrated in FIG. 9B, the outer housing 40 is rotated by a predetermined angle by the arm 30 as described above (see FIG. 8B). FIG. 9B illustrates the position after the rotation.

Subsequently, when the rear housing 10 rotates with respect to the inner housing 20 from the position after the rotation illustrated in FIG. 9B, as illustrated in FIG. 9C, the engagement of the latches 14a and 15a with respect to the shoulders 24 is released and unlocked. This allows the sliding projections 14b and 15b provided on the inner peripheral surface of the rear housing 10 to slide in the depressed surfaces 25 of the inner housing 20 along the inclined surfaces 26. Subsequently, the initial position is restored as illustrated in FIG. 9D. By this restoration, the outer housing 40 returns to the initial position to cover the ferrules 2a to 2d housed in the inner housing 20 with the forward wall 43.

Referring now to FIG. 10A to FIG. 10E, a relative positional relationship between the ferrules 2a to 2d housed in the inner housing 20 and the outer housing 40 when the optical connector 1 moves from the initial position to the connected position (rotated position) and when the optical connector 1 restores from the connected position to the initial position will be described. FIG. 10A to FIG. 10E are explanatory drawings illustrating an action of the outer housing of the optical connector at an initial position rotating with respect to the inner housing to cause ferrules to project out from opening areas of the outer housing and an action to move back to the initial position in sequence. In FIG. 10A to FIG. 10E, states of the optical connector 1 viewed obliquely are illustrated in the row I, states of the optical connector 1 viewed from the front are illustrated in the row II, relationships between the cleaners 45a to 45d and ferrule 2a to 2d are illustrated in the low III, and drawings in these rows in each of Figures correspond to each other.

As illustrated in FIG. 10A, the optical connector 1 is configured such that the front end surfaces 3a to 3d of the ferrules 2a to 2d having at least the distal ends of the optical fibers F exposed therefrom are aligned with the non-opening areas of the forward wall 43 of the outer housing 40 in the initial positions. In other words, substantially entire parts of the front end surfaces 3a to 3d of the ferrules 2a to 2d except for positioning pin face the forward wall 43, specifically the cleaners 45a to 45d with a predetermined clearance.

Figure 11:
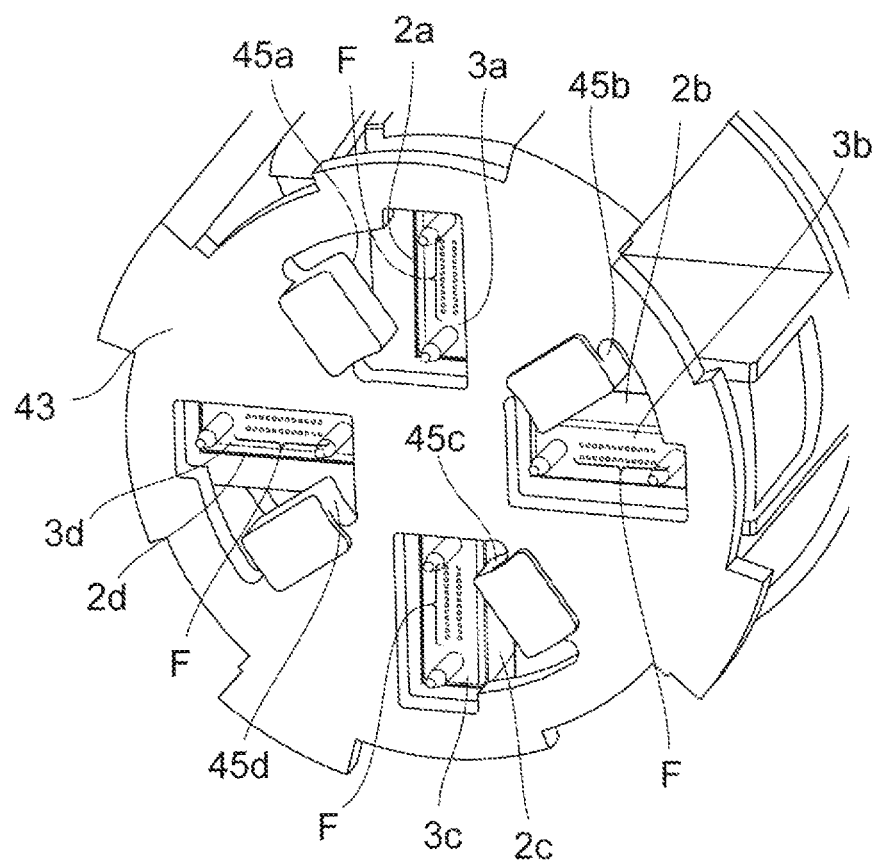
FIG. 11 is a perspective view of the optical connector illustrated in FIG. 1, illustrating a state in which the ferrules (retaining holes) are located at opening areas of the outer housing.

Subsequently, as illustrated in FIG. 10B, as the rear housing 10 is pushed forward, the inner housing 20 moves toward the outer housing 40, and thus the front end surfaces 3a to 3d of the ferrules 2a to 2d are pushed against the cleaners 45a to 45d. When the outer housing 40 rotates, the front end surfaces 3a to 3d of the ferrules 2a to 2d cleaned by the cleaners 45a to 45d in association with the rotational movement are gradually exposed from the opening areas 44a to 44d. When the rotational movement of the outer housing 40 by a predetermined angle is completed as illustrated in FIG. 10C, the front end surfaces 3a to 3d of the ferrules 2a to 2d are exposed substantially completely from the opening areas 44a to 44d (see FIG. 11). When the rear housing 10 is further pushed forward, the inner housing 20 projects forward with respect to the outer housing 40 and the front end surfaces 3a to 3d of the ferrules 2a to 2d project forward with respect to the forward wall 43. The optical connector 1 in this state may be optically connected to other optical connector.

Subsequently, as illustrated in FIG. 10D, when the rear housing 10 rotates with respect to the inner housing 20 about the center axis G, the engagement of the latches 14a and 15a of the rear housing 10 with the shoulders 24 is released. Consequently, the rear housing 10 is retracted with respect to the inner housing 20 and the respective members are restored to the initial positions by a resilient force of the resilient member 50 as illustrated in FIG. 10E. During this retraction, the front end surfaces 3a to 3d of the ferrules 2a to 2d is cleaned by the cleaners 45a to 45d provided on the inner surface of the forward wall 43 of the outer housing 40 in areas adjacent to the opening areas 44a to 44d to remove contamination with dust and debris if any. In other words, the front end surfaces 3a to 3d of the ferrules 2a to 2d may be cleaned by the cleaners 45a to 45d by effectively using the rotation of the outer housing when the optical fibers F are restored to the initial positions.

A method of connecting the optical connector 1 with another optical connector having the same structure as the optical connector 1 will be described now. The rear housing 10 moves linearly with respect to the inner housing 20 along the center axis G. This linear movement causes the arm 30 to move linearly toward the front end 1a along the center axis G. In association with the linear movement of the arm 30, the rotation guiding mechanism S provided partly on the arm 30 converts the linear movement of the arm 30 into the rotational movement of the outer housing 40. With the operation described above, the outer housing 40 rotates from the initial position before rotation to the rotated position, and consequently approaches the inner housing 20. When the rotation is completed, the ferrules 2a to 2d are aligned with the opening areas 44a to 44d provided in the forward wall 43 of the outer housing 40 and the distal end portions of the ferrules 2a to 2d are pushed out from the forward wall 43 forward. This enables connection to another optical connector.

According to the optical connector 1 of the present embodiment described thus far, when the outer housing 40 is rotated by the rotation guiding mechanism S with respect to the inner housing 20 from the initial position to the connected position, the opening areas 44a to 44d of the forward wall 43 of the outer housing 40 move to positions aligned with the ferrules 2a to 2d or the retaining holes 23a to 23d. Therefore, the front end surfaces 3a to 3d of the ferrules 2a to 2d, that is, the distal ends of the optical fibers F retained by the ferrules 2a to 2d are exposed to the outside when rotated from the initial position to the connected position for inserting the optical connector 1 to another connector, for example, and thus contamination of the distal end surfaces of the optical fibers F with dust and debris may be restricted. In addition, the outer housing 40 includes the cleaners 45a to 45d for cleaning the front end surfaces 3a to 3d of the ferrules 2a to 2d during the rotation from the initial position toward the connected position. Therefore, contamination of the distal end surfaces of the optical fibers F with dust and debris is removed and the distal end surfaces of the optical fibers F can be put in a cleaned state. Consequently, when connecting the optical fibers with the optical connector 1, reduction of connection loss due to contamination with dust and debris is achieved.

In addition, as the optical connector 1 is configured to, but not limited to, connect a number of the optical fibers (for example, ninety-six optical fibers) at once to other optical fibers, time consumed for connection may be reduced compared with the related art. In addition, as the restoration from the connected position to the initial position is enabled by the resilient member 50, disconnecting operation is also easy.

Second Embodiment

Figure 12:
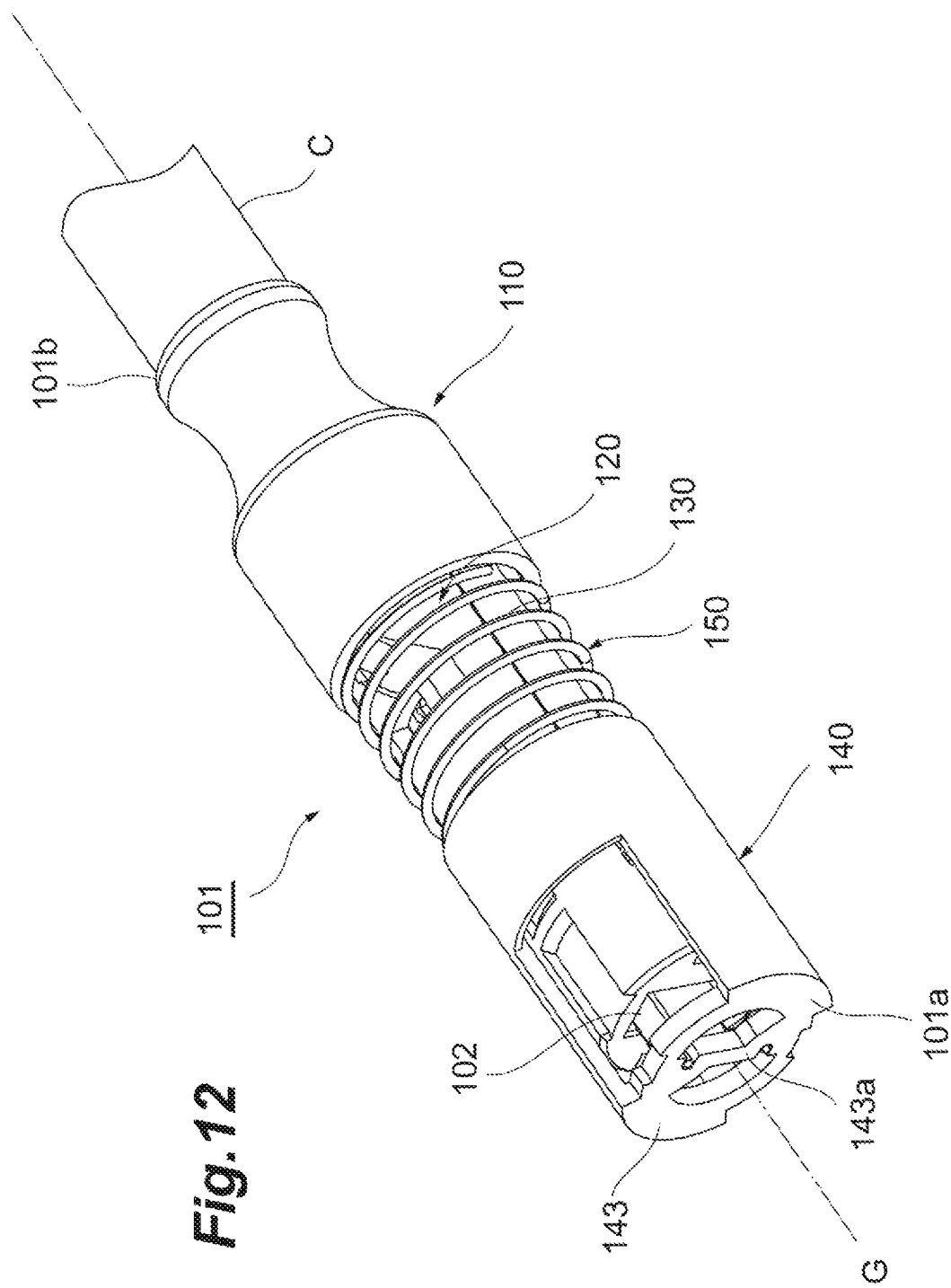
FIG. 12 is a perspective view of an optical connector according to a second embodiment.
Figure 13:
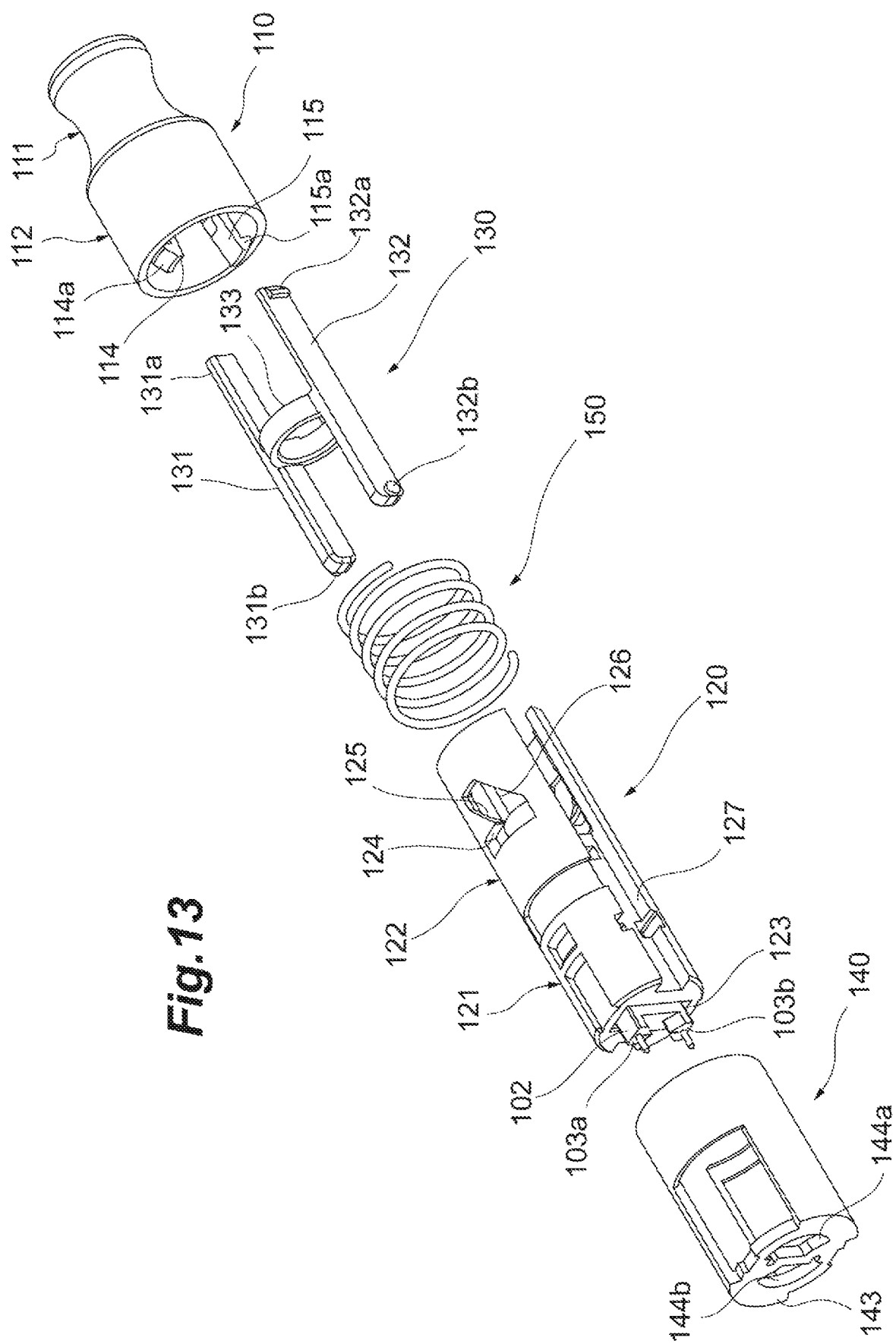
FIG. 13 is an exploded perspective view of the optical connector illustrated in FIG. 12.

Referring now to FIG. 12 and FIG. 13, an optical connector 101 according to a second embodiment will be described. FIG. 12 is a perspective view of the optical connector 101. FIG. 13 is an exploded perspective view of the optical connector 101. As illustrated in FIG. 12 and FIG. 13, the optical connector 101 includes a rear housing 110, an inner housing 120, an arm 130, an outer housing 140, and a resilient member 150 in the same manner as the optical connector 1 according to the first embodiment. The optical connector 101 is a connector configured to house a small number (for example, eight) of the optical fibers F for connection. The basic configurations and functions of the rear housing 110, the inner housing 120, the arm 130, the outer housing 140, and the resilient member 150 are the same as the configurations and the functions of the rear housing 10, the inner housing 20, the arm 30, the outer housing 40, and the resilient member 50 of the optical connector 1 according to the first embodiment. In the following description, different points from the optical connector 1 will be mainly described and description of the similar portions may be omitted.

The rear housing 110 is a member located around the rear end 101b of the optical connector 101 and allows the optical fiber cable C to be inserted therethrough. The rear housing 110 includes a boot portion 111 and a housing portion 112. In the rear housing 110, unlike the configuration of the optical connector 1, projecting strips 114 and 115 are provided independently in an interior of a housing portion 110. The projecting strips 114 and 115 respectively include latches 114a and 115a projecting outward at distal ends thereof. In the optical connector 101, the latches 114a and 115a have also the same functions as the sliding projections 14b and 15b as well in addition to the functions of the latches 14a and 15a provided on the rear housing 10 of the optical connector 1. The front end of the housing portion 112 of the rear housing 110 receives the rear end of the resilient member 150 disposed on an outer periphery of the inner housing 120 and the arm 130.

The inner housing 120 includes a front portion 121 and a rear portion 122. The front portion 121 is provided with a single retaining hole 123 for housing a single ferrule 102. The retaining hole 123 is provided at a substantially center of the front end surface of the inner housing 120. The rear portion 122 includes a pair of shoulders 124, a pair of voids 125, and a pair of inclined surfaces 126. In FIG. 13, while each one of the shoulders 124, the voids 125, and the inclined surfaces 126 are disclosed, the other shoulder 124, void 125, and inclined surface 126 to be disposed in point symmetry about the center axis G and in rotational symmetry with respect to the center axis G have the same configurations.

The shoulders 124 are provided at edges of the openings in such a way as to allow the latches 114a and 115a of the rear housing 110 to engage from the inside. The voids 125 each include an area on a side of the shoulder 124 in the circumferential direction and a substantially parallelogram area extending from the side toward the rear end along the center axis G. The voids 125 are partly provided with the inclined surfaces 126. The inclined surfaces 126 are inclined from the front rearward with respect to the center axis G. When rotating the rear housing 110 with respect to the inner housing 120 after the latches 114a and 115a engage the shoulders 124, the latches 114a and 115a are disengaged from the shoulders 124, slide on the inclined surfaces 126 and move rearward, and the rear housing 110 is restored to the initial position.

The arm 130 includes a pair of side walls 131 and 132, and a coupling member 133 configured to couple the pair of side walls 131 and 132, and configuration of the coupling member 133 is circular ring. The side walls 131 and 132 includes protrusions 131a and 132a at rear portions and guide projections 131b and 132b at front portions in a direction along the center axis G. The protrusions 131a and 132a are housed in the circumferential groove of the rear housing 110 and engage the arm 130 in a state of being rotatable with respect to the rear housing 110. The guide projections 131b and 132b constitute part of a rotation guiding mechanism for converting the linear movement of the arm 130 along the center axis G into a rotational movement of the outer housing 140, and are housed in the guide grooves of the outer housing 140.

The outer housing 140 includes guide grooves, a forward wall 143, opening areas 144a and 144b, and a cleaner. The guide grooves of the outer housing 140 formed on the inner periphery thereof and having the same configuration as those of the optical connector 1 are coupled to the guide projections 131b and 132b of the arm 130, and perform the same rotational movement as the first embodiment. When the outer housing 140 rotates by a predetermined angle with respect to and approaches the inner housing 120, front end surfaces 103a and 103b of a ferrule 102 are positioned in the two opening areas 144a and 144b (see FIG. 15B and FIG. 16B).

The resilient member 150 is a member disposed between the outer housing 140 and the rear housing 110 to press the outer housing 140 toward a front end 101a and press the rear housing 110 toward a rear end 101b or rearward. In the optical connector 101, the resilient member 150 is disposed on outer peripheries of the inner housing 120 and the arm 130, and is positioned between a rear end of the outer housing 140 and a front end of the rear housing 110.

The coupling relationship among the respective components in the optical connector 101 having the configuration as described above and the basic operation are the same as the optical connector 1. In other words, when the rear housing 110 moves forward with respect to the inner housing 120 along the center axis G, the arm 130 moves together with the rear housing 110 forward with respect to the inner housing 120. When the arm 130 moves linearly forward along the center axis G, the outer housing 140 rotates about the center axis G with respect to and approaches the inner housing 120 by a rotation guiding mechanism including the guide projections 131b and 132b of the arm 130 and the guide grooves provided on the inner periphery of the outer housing 140. With this operation, a layout in which the ferrule 102 or the front end surfaces 103a and 103b of the optical fibers F retained by the retaining hole 123 are aligned with the opening areas 144a and 144b of the outer housing 140 is achieved.

Figure 14:
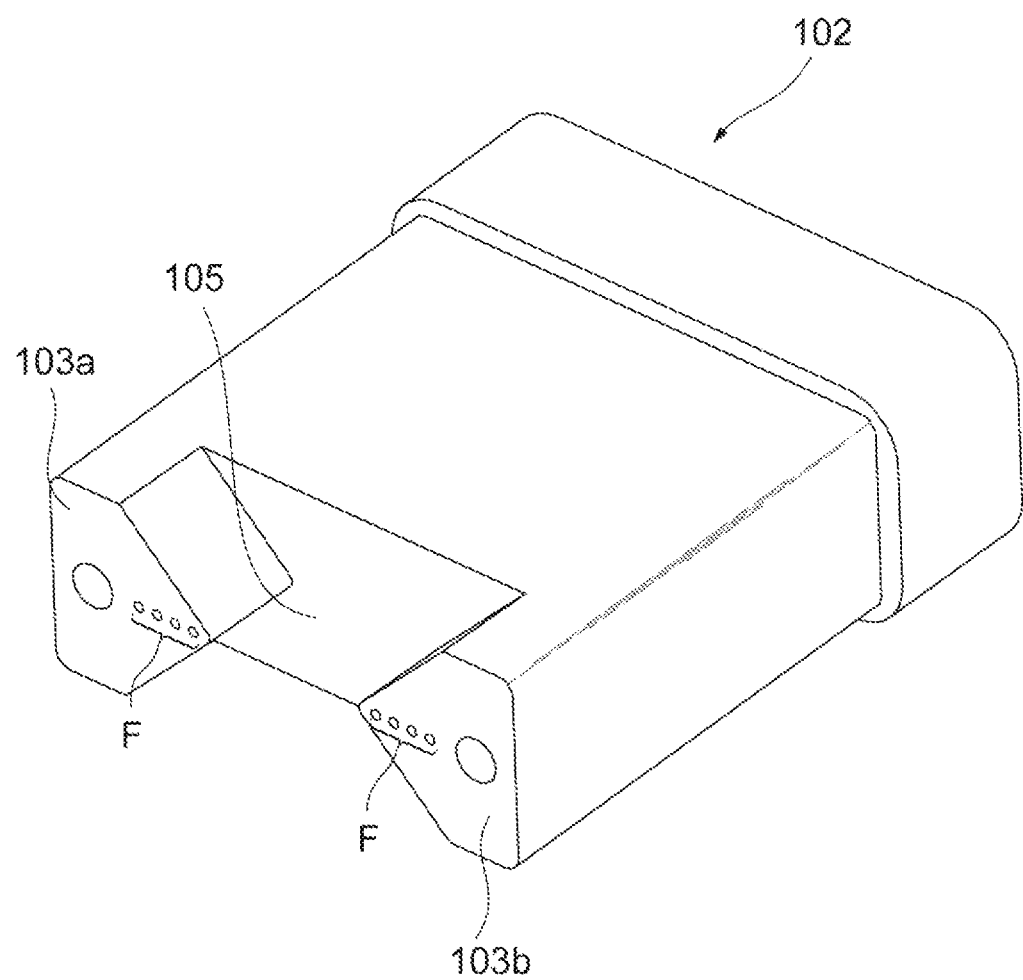
FIG. 14 is a perspective view of a ferrule used in the optical connector illustrated in FIG. 12.

An operation to cause the front end surfaces 103a and 103b of the ferrule 102 to be aligned with the opening areas 144a and 144b by the rotation of the outer housing 140 with respect to the inner housing 120 and configurations of respective members therefor will now be described. The ferrule 102 has a configuration different from the ferrule 2 in the first embodiment. The configuration of the ferrule 102 will now be described with reference to FIG. 14. FIG. 14 is a perspective view of the ferrule 102. The optical connector 101 according to the second embodiment includes a single ferrule as it is applied to a compact optical connector as a non-limiting example. Therefore, the ferrule is positioned on the center axis G of the rotational movement of the outer housing 140 and other members. Accordingly, the optical connector 101 according to the second embodiment includes a recess 105 at a front end of the ferrule 102 to allow a center strip 143a of the forward wall 143 of the outer housing 140 to be placed in the recess 105. The ferrule 102 separates a surface where the distal ends of the optical fibers F are exposed from into two front end surfaces 103a and 103b by the recess 105.

Figure 15A:
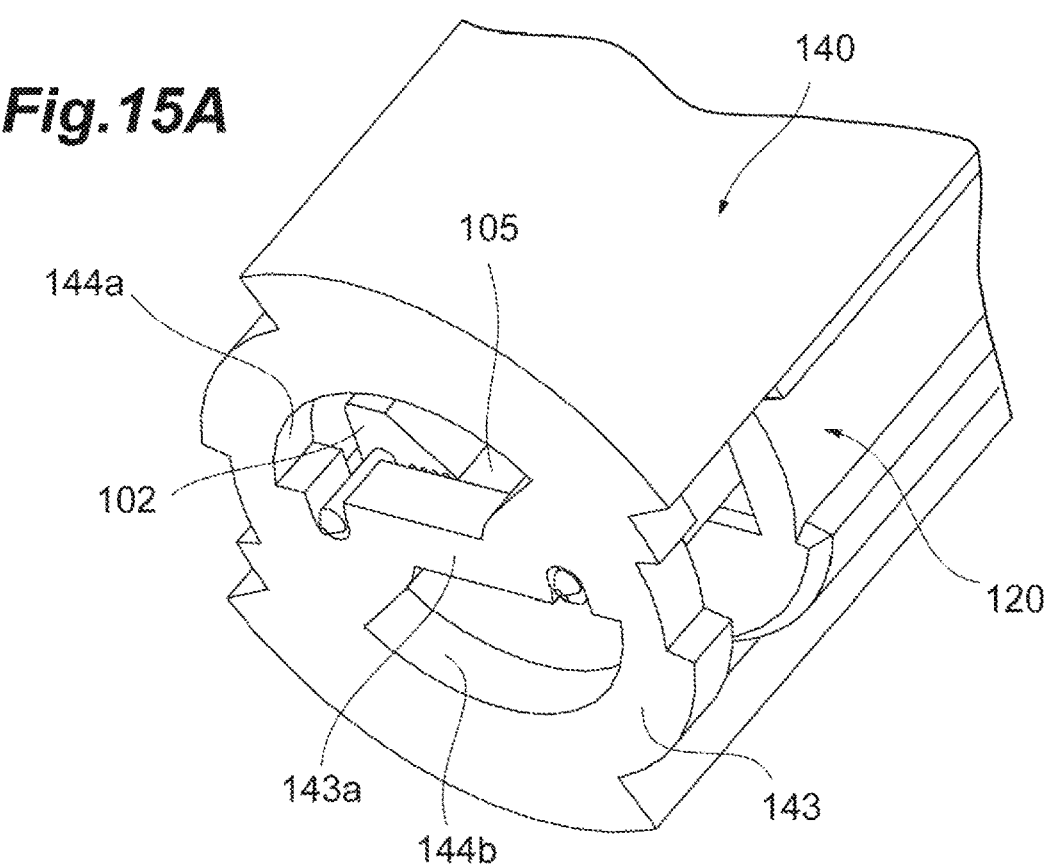
FIG. 15A is a perspective view of the optical connector in FIG. 12 illustrating a state in which an end surface of the ferrule is covered with an outer housing.
Figure 15B:
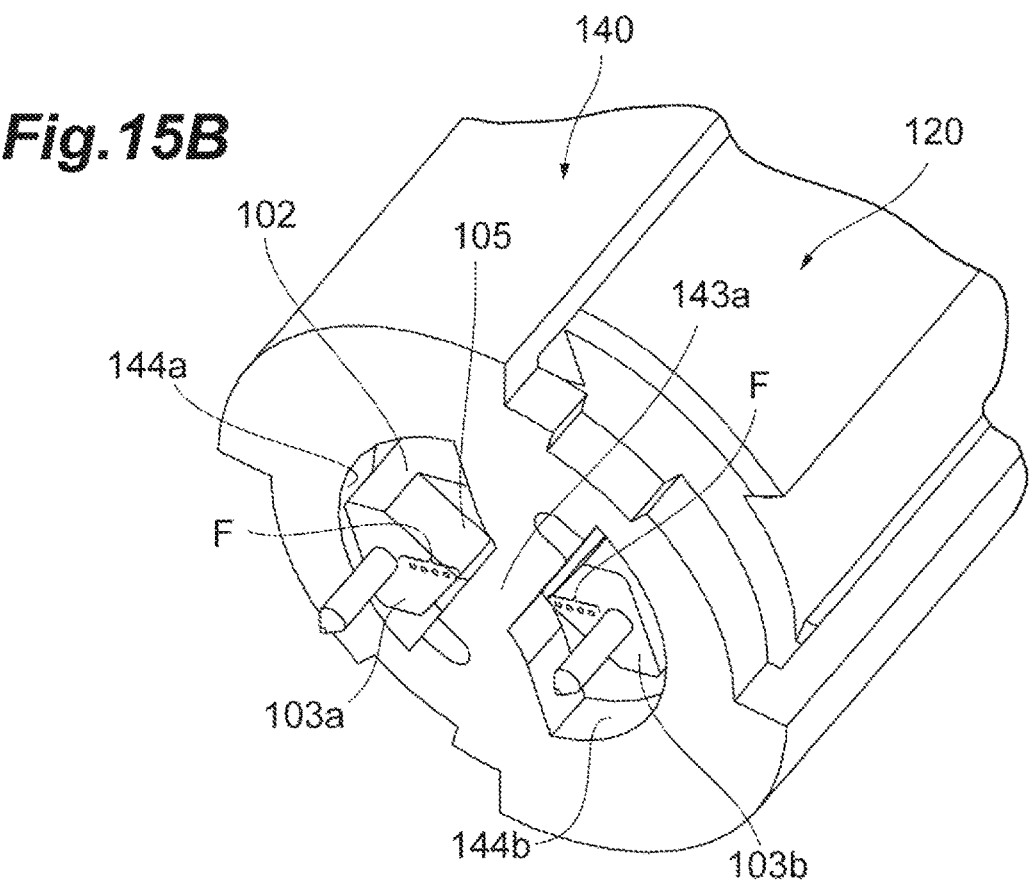
FIG. 15B is a perspective view illustrating a state in which the ferrule is aligned with and projects from the opening area of the outer housing and thus is ready to connect to another connector.

In the optical connector 101 having the ferrule 102 in this configuration, the recess 105 of the ferrule 102 aligns with the center strip 143a of the forward wall 143 of the outer housing 140 as illustrated in FIG. 15A, FIG. 15B, and FIG. 16A and FIG. 16B. When the outer housing 140 rotates with respect to and approaches the inner housing 120 from the initial position (FIG. 15A and FIG. 16A) before rotation of the outer housing 140, the center strip 143a of the forward wall 143 is housed in the recess 105 of the ferrule 102 (FIG. 15B and FIG. 16B). One front end surface 103a of the ferrule 102 is then located at the opening area 144a, and the other front end surface 103b is located at the opening are 144b. The optical connector 101 is configured such that the depth of the recess 105 is deeper than the thickness of the center strip 143 so as to fully expose the front end surfaces 103a and 103b of a ferrule 102 to the outside and forward from the forward wall 143 and to optically couple with the optical fibers held by the corresponding optical connector or the ferrule definitely.

In the optical connector 101 according to the second embodiment, when the outer housing 140 is rotated by the rotation guiding mechanism with respect to the inner housing 120 from the initial position to the connected position, the opening areas 144a and 144b of the forward wall 143 of the outer housing 140 move to positions aligned with the front end face 103a and 103b (fiber exposure faces) of the ferrule 102. Therefore, the front end surfaces 103a and 103b of the ferrule 102, that is, the distal ends of the optical fibers F retained by the ferrule 102 are exposed to the outside when rotated from the initial position to the connected position for connecting the optical connector 101 to another connector, for example, and thus contamination of the distal end surfaces of the optical fibers F with dust and debris may be restricted. In addition, the outer housing 140 includes the cleaners for cleaning the front end surfaces 103a and 103b of the ferrule 102 during the rotation from the initial position toward the connected position. Therefore, contamination of the distal end surfaces of the optical fibers F with dust and debris may be removed to put the exposure faces of the optical fibers in a cleaned state when the optical connector 101 connects. Consequently, when connecting the optical fibers with the optical connector 101, reduction of connection loss due to contamination with dust and debris is achieved. In addition, with the configuration of the ferrule 102, even when the optical connector 101 is downsized, exposure of the end surface of the ferrule 102 is achieved without problem by the rotational movement of the outer housing 140.

Figure 17A:
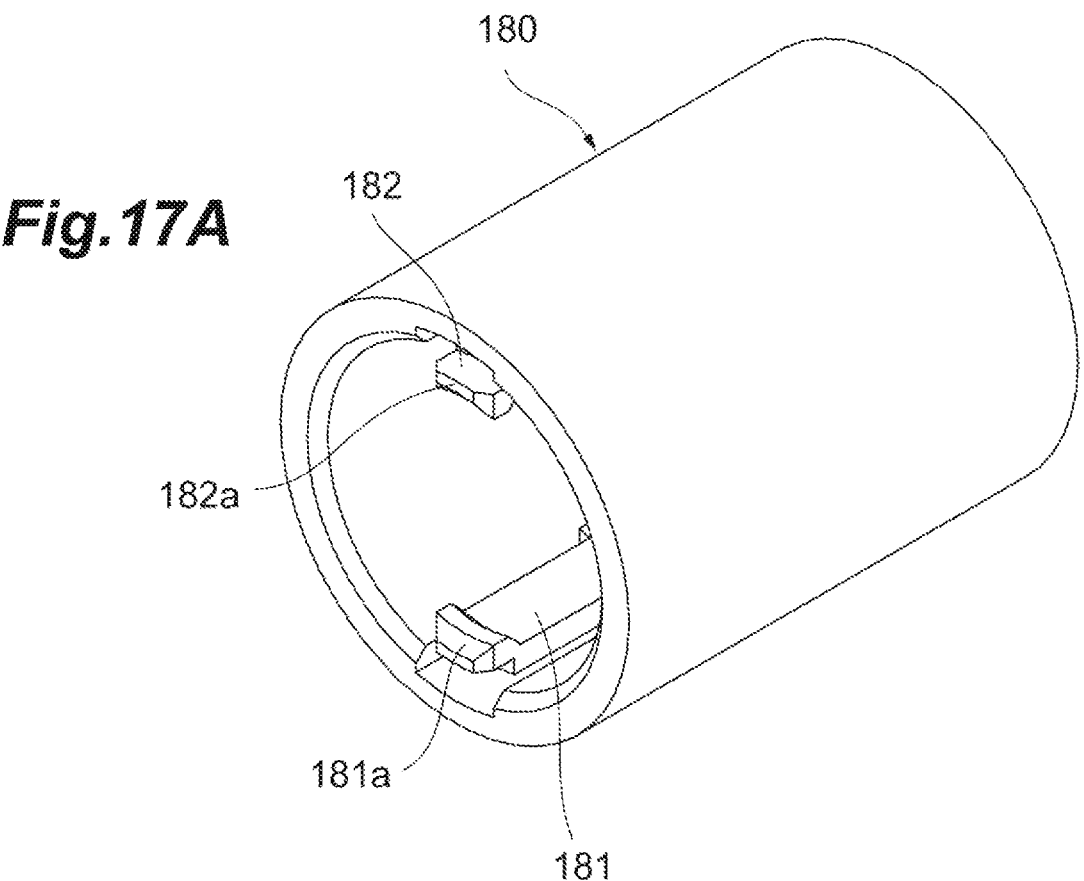
FIG. 17A is a perspective view of a coupling adapter used for the optical connector illustrated in FIG. 12 viewed from one side.
Figure 17B:
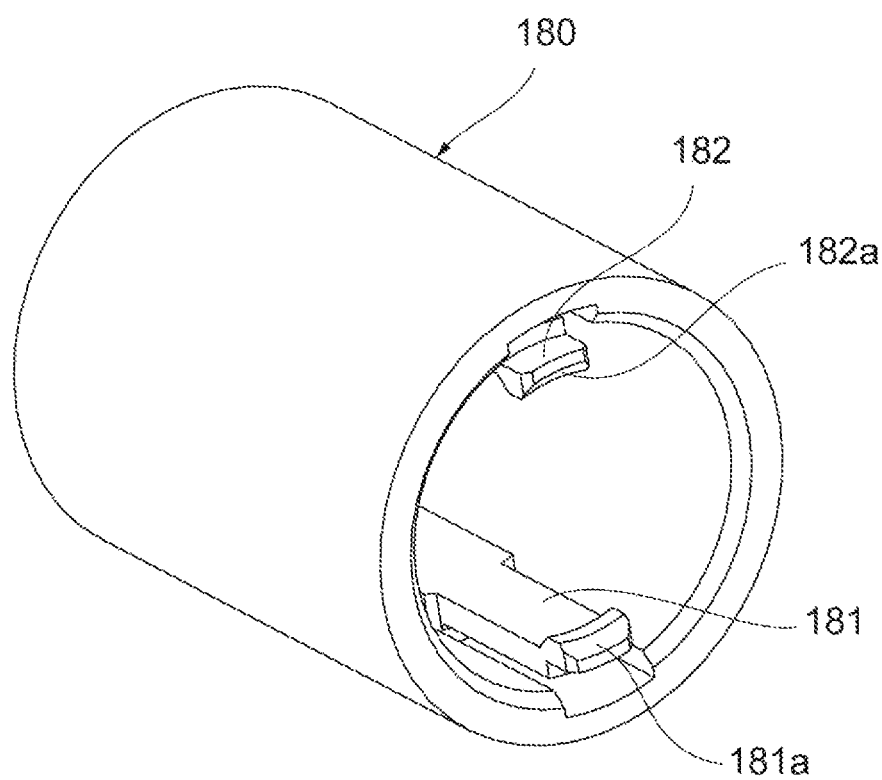
FIG. 17B is a perspective view viewed from the other side.

The optical connector 101 may be connected to another optical connector having the same shape via an adapter 180 illustrated, for example, in FIG. 17A and FIG. 17B. The adapter 180 includes latches 181a and 182a provided on two projecting strips 181 and 182 at each opening, so that the optical connector 101 inserted therein is engaged at a predetermined position by the latches 181a and 182b to allow optical connection to another optical connector. Another optical connector is engaged with another latches 181a and 182a.

Third Embodiment

Figure 18:
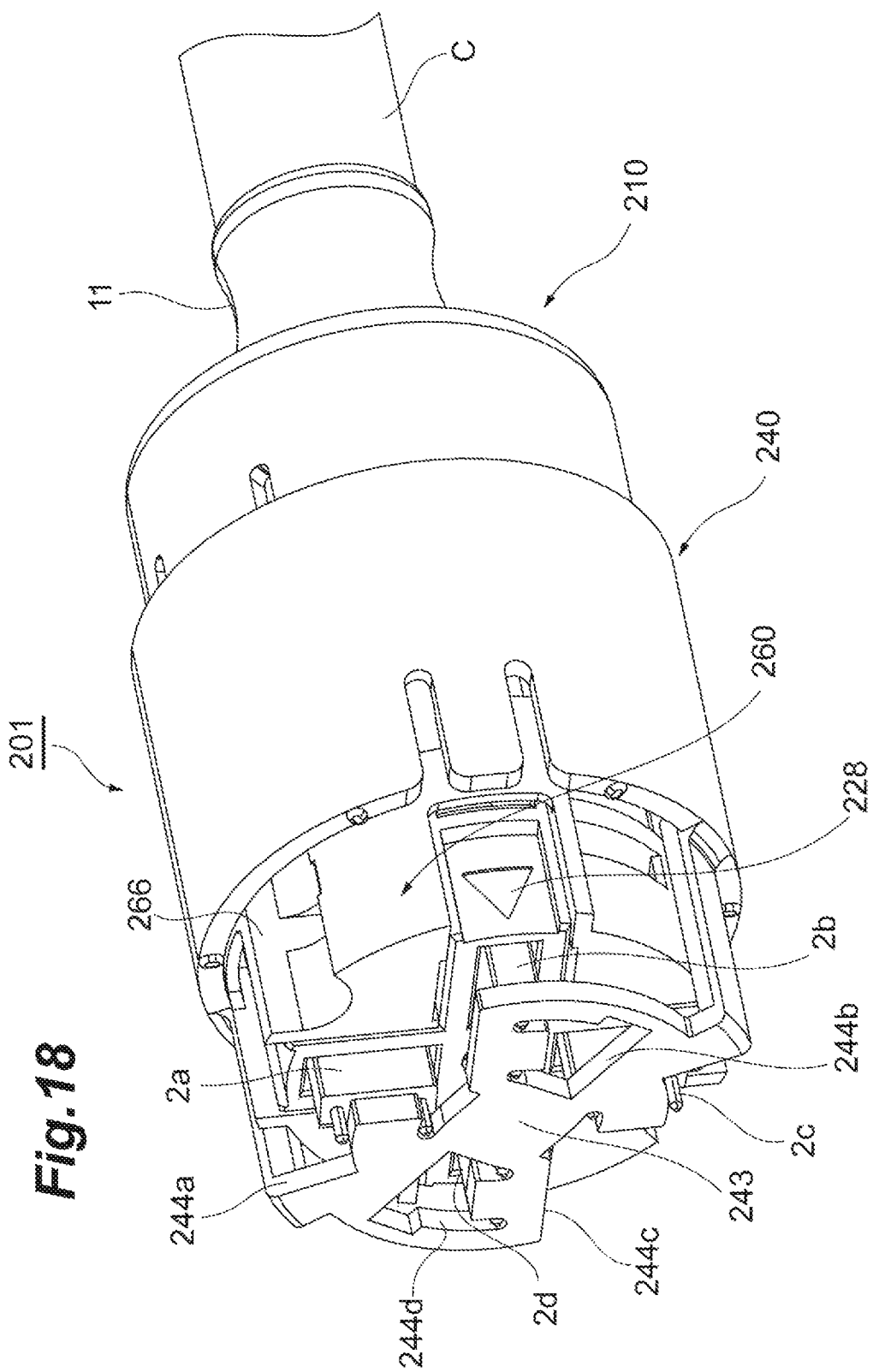
FIG. 18 is a perspective view illustrating the optical connector according to a third embodiment.
Figure 19:
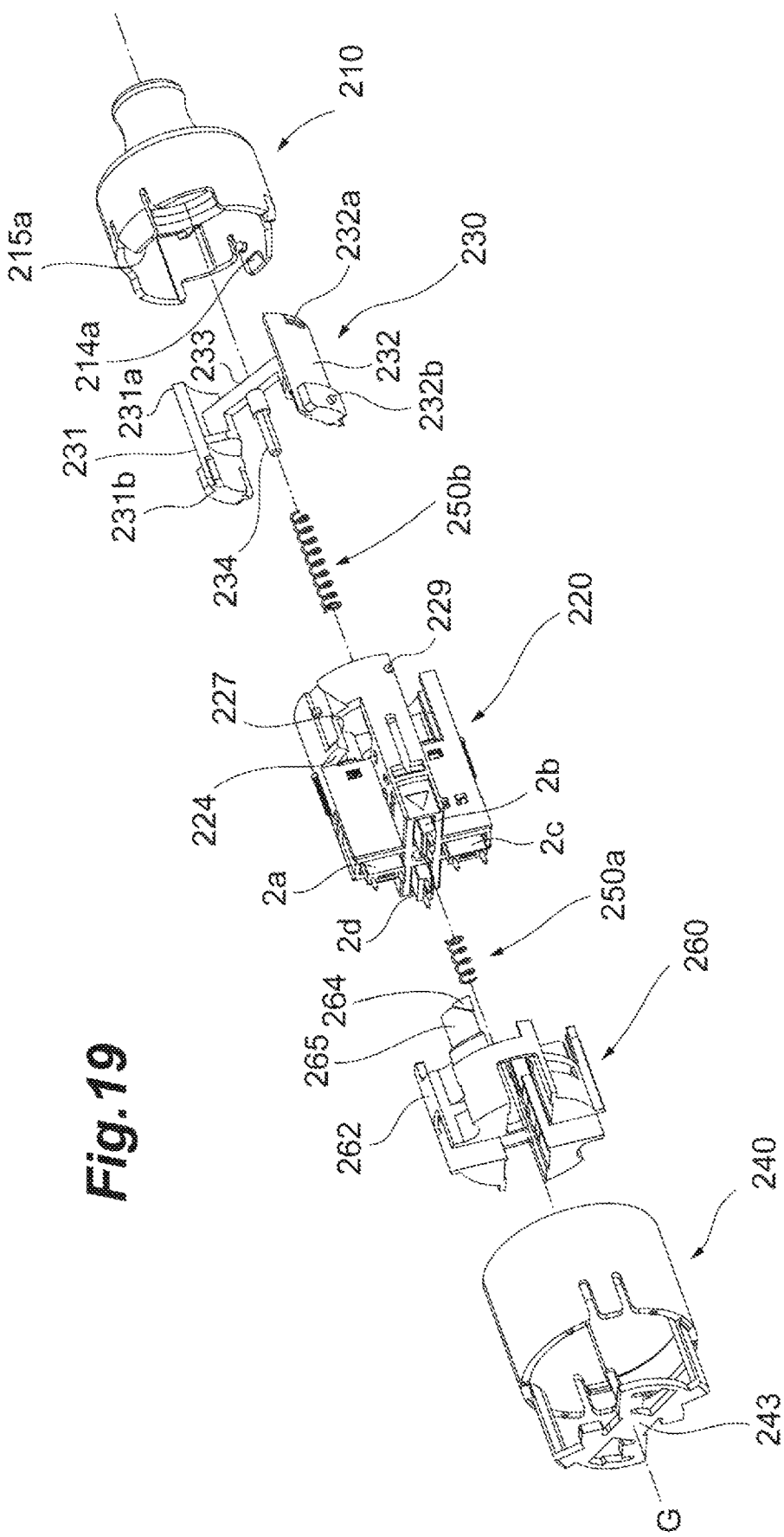
FIG. 19 is an exploded perspective view of an optical connector illustrated in FIG. 18.

Referring now to FIG. 18 and FIG. 19, an optical connector 201 according to the third embodiment will be described. FIG. 18 is a perspective view of the optical connector 201. FIG. 19 is an exploded perspective view of the optical connector 201.

As illustrated in FIG. 18 and FIG. 19, the optical connector 201 is a connector to modify part of the configuration of the optical connector 1 according to the first embodiment. The optical connector 201 includes a rear housing 210, an inner housing 220, an arm 230, an outer housing 240, and resilient members 250a, 250b in the same manner as the optical connector 1. Since the optical connector 201 is a connector for housing a number of optical fibers for connection in the same manner as the optical connector 1, basic configuration and functions of the rear housing 210, the inner housing 220, the arm 230, the outer housing 240 and the resilient members 250a, 250b are the same as the configurations and the functions of the rear housing 10, the inner housing 20, the arm 30, the outer housing 40, and the resilient member 50 of the optical connector 1. The optical connector 201 further includes the adapter lock reinforcement member 260. In the following description, different points from the optical connector 1 will be mainly described and description of the similar portions may be omitted.

Figure 20:
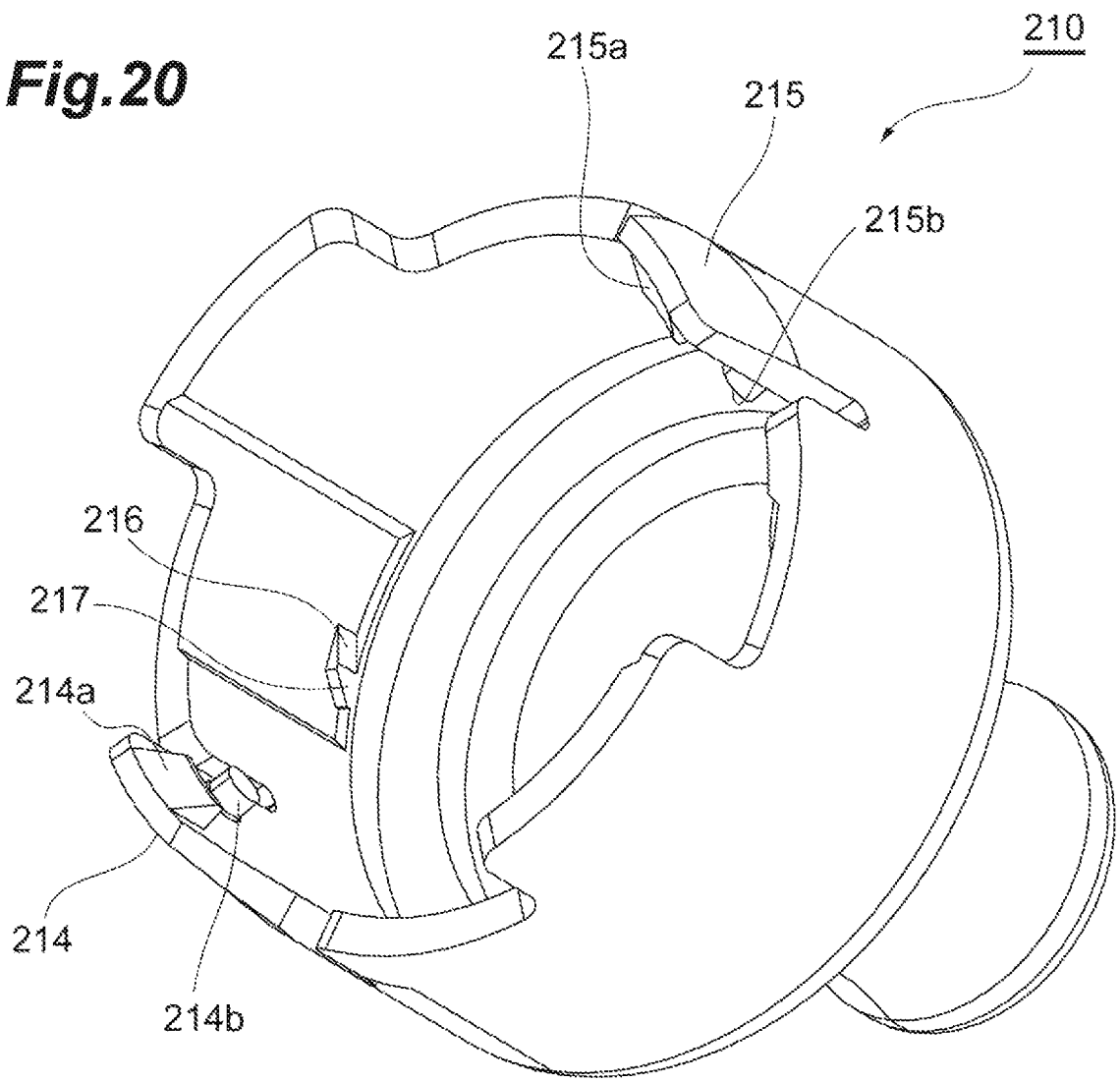
FIG. 20 is a perspective view of a rear housing of the optical connector illustrated in FIG. 18.

The rear housing 210 is a member located around the rear end of the optical connector 201, and allows the optical fiber cable C to be inserted therein. The rear housing 210, as illustrated in FIG. 19 and FIG. 20, includes projecting strips 214 and 215 for locking the rear housing 210 to the inner housing 220. The projecting strips 214 and 215 are provided with latches 214a and 215a and sliding projections 214b and 215b on the inner peripheral surfaces in such a way as to project respectively inward. When the rear housing 210 moves linearly forward with respect to the inner housing 220 along the center axis G, the latches 214a and 215a climb over shoulders 224 of the inner housing 220 and engages the shoulders 224, respectively. When the rear housing 210 is rotated with respect to the inner housing 220 after the latches 214a and 215a engages the shoulders 224, the latches 214a and 215a are released from the shoulder 224, the sliding projections 214b and 215b of the rear housing 210 slide on the inclined surface 226 and move rearward, and then return to the initial position.

The rear housing 210 includes a pair of slopes 216 and shoulders 217 on the inner periphery surface between the projecting strips 214 and 215. One of slopes 216 and shoulders 217 are illustrated in FIG. 20. The other slope and shoulder are disposed in point symmetry about the center axis G and in rotational symmetry with respect to the center axis G to the one of slopes 216 and shoulders 217. When the rear housing 210 is rotated (unlocked) with respect to the inner housing 220 after the rear housing 210 is locked to the inner housing 220 to make the optical connector 201 be a connected position, the pair of projections 229 provided on the outer periphery surface of the inner housing 220 climb the respective slopes 216, go thorough over the shoulders 217 and drop from the shoulders 217. When the pair of projections 229 drop from the shoulders 217 respectively, a click is generated. This configuration provides a user with perception of availability of unlocked, that is, what the optical connector 201 can be withdrawn from the adapter 280 discussed later.

Figure 21:
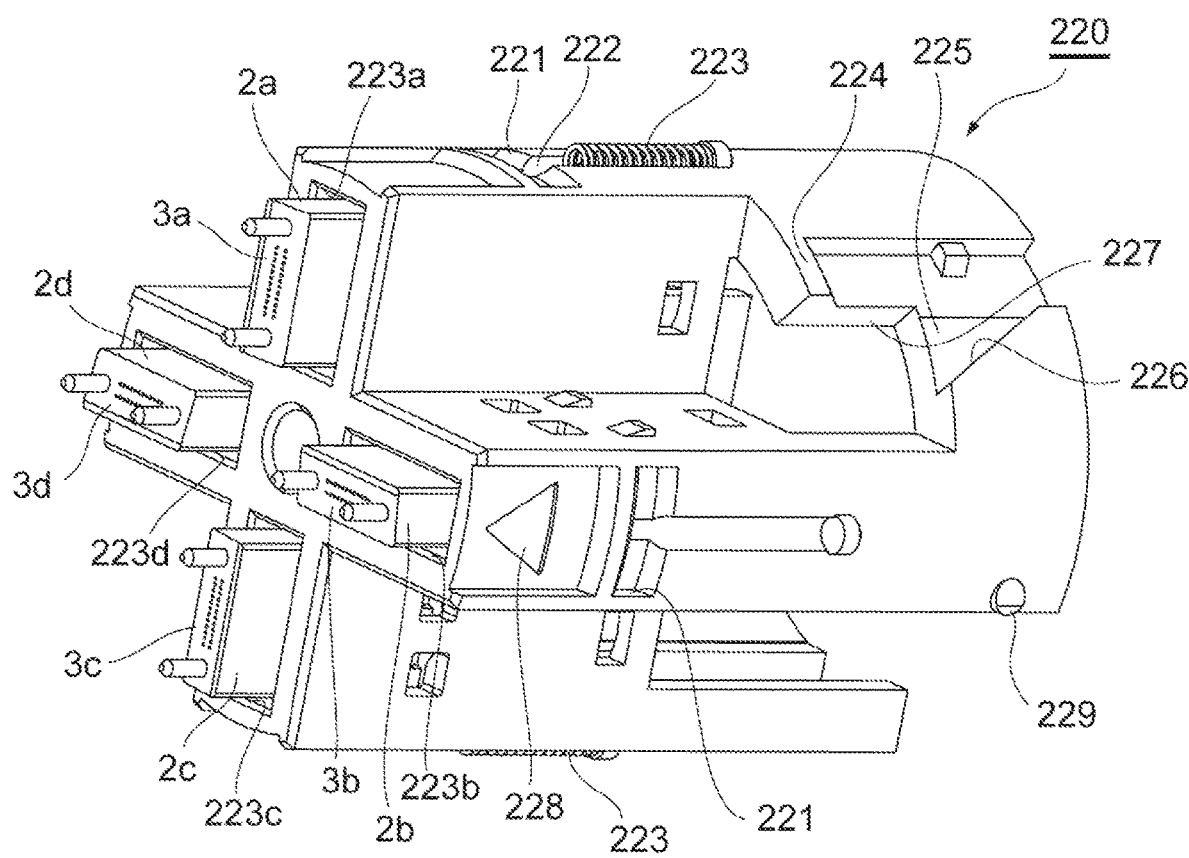
FIG. 21 is a perspective view of an inner housing of the optical connector illustrated in FIG. 18.

The inner housing 220, as illustrated in FIGS. 19 and 21, includes four retaining holes 223a to 223d for housing the ferrules 2a to 2d in front thereof. The inner housing 220 includes a pair of shoulders 224, a pair of depressed surfaces 225 and a pair of inclined surfaces 226 in rear thereof. FIG. 21 discloses one of the shoulders 224, depressed surfaces 225, and inclined surfaces 226. The other shoulder 224, depressed surface 225, and inclined surface 226, which are disposed in point symmetry about the center axis G and in rotational symmetry with respect to the center axis G, have the same configurations. The shoulders 224 engage the latches 214a and 215a of the rear housing 210, respectively. When the rear housing 210 is rotated with respect to the inner housing 220 after the latches 214a and 215a engage the shoulders 224, the latches 214a and 215a is released from the shoulders 224, and the sliding projections 214b and 215b of the rear housing 210 slide on the inclined surfaces 226 and move rearward, and then the rear housing 210 returns the initial position. The inner housing 220 includes the pair of projections 229 on the outer periphery. A portion of the outer periphery where the projections 229 are provided may be formed so as to be thinner in depth than other portion, or the projections 229 may be formed near the end portion of the outer periphery. According to this configuration, surface portions where the protrusions 229 are formed are deformable in a direction intersecting the center axis G and thereby the protrusions 229 easily climb the slopes, respectively.

Figure 25A:
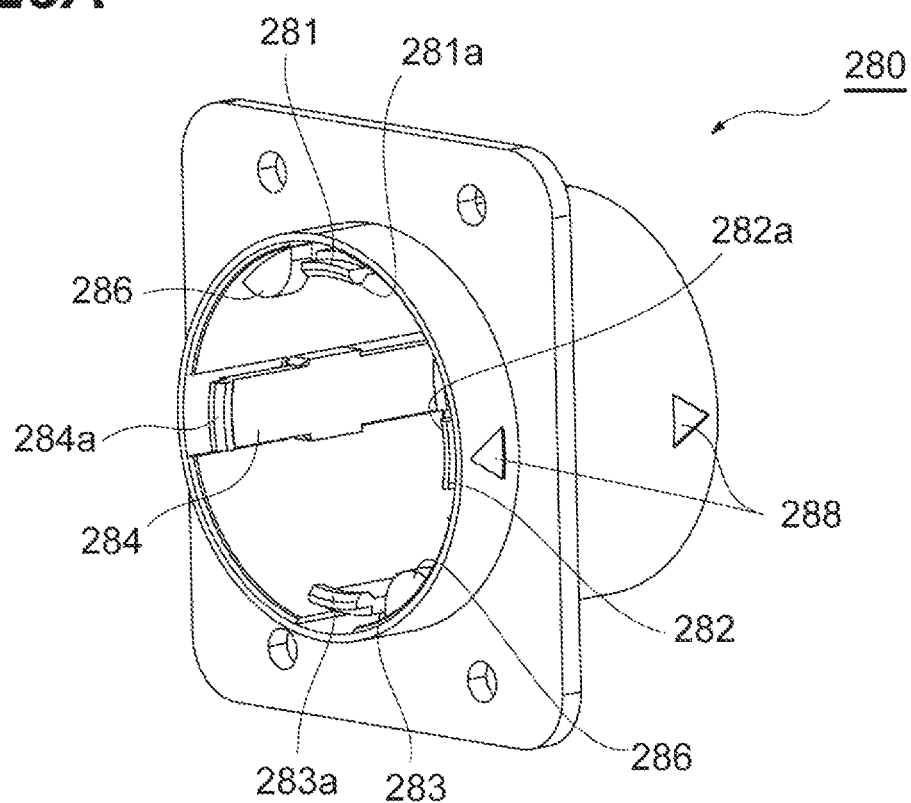
FIG. 25A is a perspective view of a coupling adapter used for the optical connector illustrated in FIG. 18 viewed from one side.
Figure 25B:
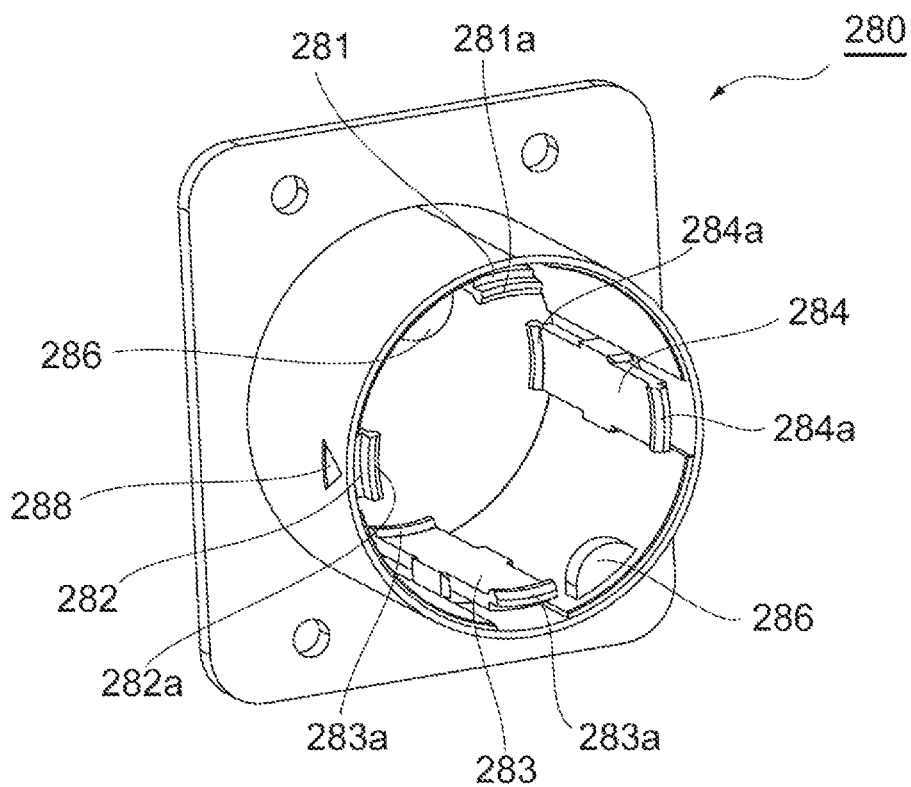
FIG. 25B is a perspective view viewed from the other side.

The inner housing 220 includes four recesses 221 on respective outer periphery portions of the retaining holes 223a to 223d. The recesses 221 are portions for engaging the latches 281a to 284a of the adapter 280 (see FIG. 25A, FIG. 25B and FIG. 26). The inner housing 220 includes two horizontally long grooves 222 at rear of two of the recesses 221 and houses the springs 223 in the grooves 222. The springs 223 work to bias the adapter lock reinforcement member 260, as discussed later, forward.

The arm 230 includes a pair of side walls 231 and 232, a coupling member 233 coupling the side walls 231 and 232, and a receiving member 234 extending from a center of the coupling member 233 toward the front end as illustrated in FIG. 19. The side walls 231 and 232 include protrusions 231a and 232a at rear portions and guide projections 231b and 232b at front portions. The protrusions 231a and 232a are housed in the circumferential groove of the rear housing 210 and engage the arm 230 in a state of rotatable with respect to the rear housing 210. The guide projections 231b and 232b constitute part of a rotation guiding mechanism for converting the linear movement of the arm 230 along the center axis G into a rotational movement of the outer housing 240, and are housed in the guide grooves 241 and 242 of the outer housing 240 (Please see FIG. 22A and FIG. 22B). The movement of the guide projections 231b and 232b in the grooves 241 and 242 is in the same manner as the optical connector 1. The receiving member 234 receives a rear end of the resilient member 250b. Accordingly, the arm 230 is presses rearward, that is, toward the rear housing 210.

Figure 22A:
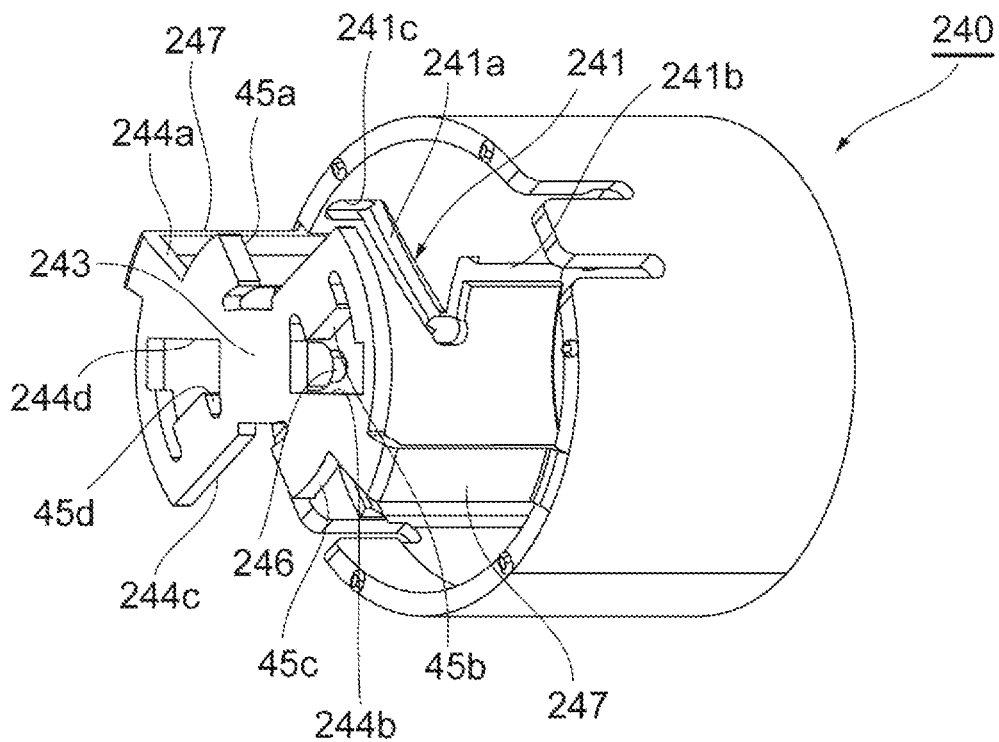
FIG. 22A is a perspective view of an outer housing of the optical connector illustrated in FIG. 18 viewed from a front side.
Figure 22B:
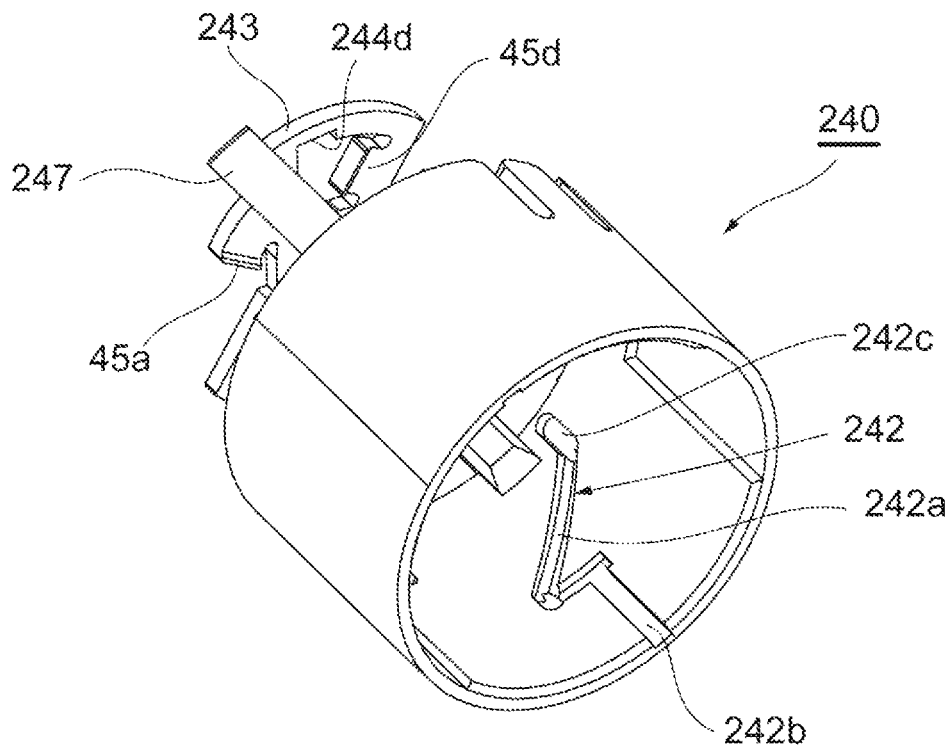
FIG. 22B is a perspective view of the outer housing from a rear side.

The outer housing 240 is provided with the four cleaners 45a to 45d on the inner surface side of a forward wall 243 in the same manner as the outer housing 40 of the first embodiment, but is different in that members for supporting the forward wall 243 are two brace members 247 as illustrated in FIG. 22A and FIG. 22B. In the outer housing 240, the structure of opening area 224a to 224d is different as two brace members 247 support the forward wall 243. In particular, the structure of the opening areas 224a and 224c where the brace members 247 are not formed is different from the opening area of the outer housing 40. In other words, the opening areas 224a and 224c of the outer housing 240 are all opening areas other than areas covering the front end surfaces 3a and 3c of the ferrules 2a and 2c in the initial position, and form very large voids compared with the opening areas 224b and 224d.

The outer housing 240 is provided with guide grooves 241 and 242 which functions a rotation guiding mechanism to rotate the outer housing 240 with respect to the inner housing 220 by a predetermined angle and to make the outer housing 240 approach the inner housing 220. The guide grooves 241 and 242 include inclined portions 241a and 242a inclined with respect to the center axis G, first straight portions 241b and 242b and second straight portions 241c and 242c extending respectively from both ends of the inclined portions 241a and 242a along the center axis G in the same manner as the optical connector 1. The guide projections 231b and 232b of the arm 230 are housed in the guide grooves 241 and 242, and this construction makes the outer housing 240 rotate with respect to the inner housing 220 and approach the inner housing 220 in association with the liner forward movement of the arm 230. The outer housing 240 includes a receiving member 246 which receives the front end of the resilient member 250a. Thereby, the outer housing 240 is pressed forward.

The resilient member 250a presses the outer housing 240 forward with respect to the inner housing 220 as illustrated in FIG. 19. The resilient member 250b presses the arm 30 rearward with respect to the inner housing 220. In an example, the resilient member 250b pressing the arm 30 rearward may be configured to have a stronger biasing force (spring force) than the resilient member 250a. In this manner, by making the biasing force of the resilient member 250b rearward stronger, a force pressing the front end surfaces of the ferrules 2a to 2d housed in the inner housing 220 to the cleaners 45a to 45d of the outer housing 240 can be large, and thereby the front end surfaces of the ferrules 2a to 2d and the distal ends of the optical fibers held by the ferrule 2a to 2d can be effectively cleaned. A force of maintaining the engagement of the latch between the inner housing 220 and the rear housing 210 and a force of restoration to the initial positions after the rear housing 210 is rotated and unlatched may be adjusted to be suitable. The rear end of the resilient member 250a and the front end of the resilient member 250b are supported by a receiving plate provided in a center hole of the inner housing 220.

Figure 23:
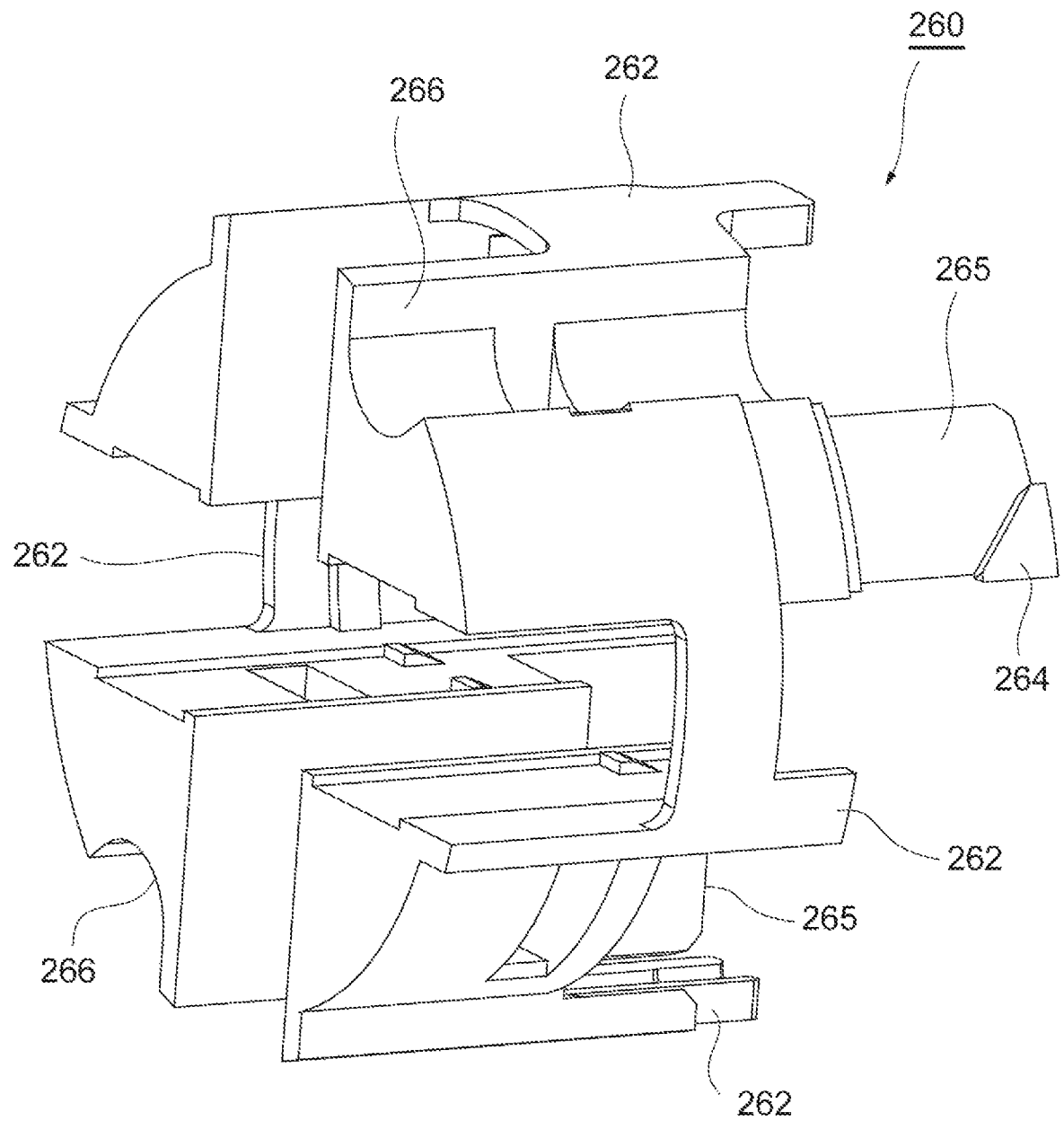
FIG. 23 is a perspective view of an adapter lock reinforcement member of the optical connector illustrated in FIG. 18.
Figure 24:
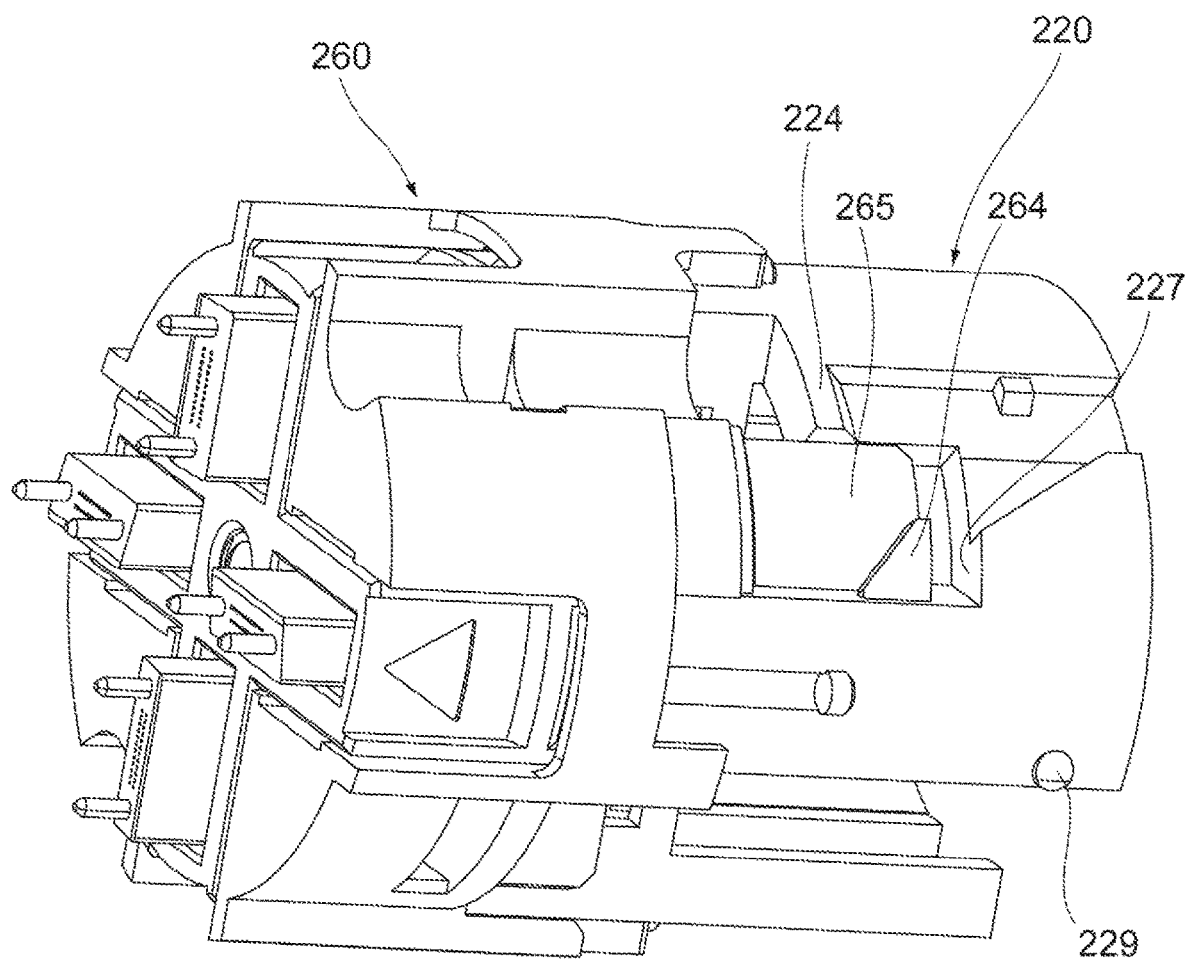
FIG. 24 is a perspective view of a state where the adapter lock reinforcement member is attached to the inner housing.

The adapter lock reinforcement member 260 has a substantially cylindrical outline as illustrated in FIG. 19 and FIG. 23, and is disposed outside the front portion of the inner housing 220 (see FIG. 24). The adapter lock reinforcement member 260 is a member for reinforcing locking to an adapter 280 when connecting the optical connector 201 to another optical connector via the adapter 280 (see FIG. 25A and FIG. 25B). The adapter 280 includes four projecting strips 281 to 284 provided on an inner periphery equidistantly in the circumferential direction. The projecting strips 281 to 284 are provided with latches 281a to 284a respectively at distal ends thereof. When connecting the optical connector 201 to the adapter 280, the latches 281a to 284a engage recesses 221 of the inner housing 220 and the optical connector 201 is locked to the adapter 280. The adapter lock reinforcement member 260 fixes the latches 281a to 284a inward by four reinforcement plates 262 to prevent the latches 281a to 284a from coming apart toward the outside and from being unintentional released when the above-described locking is done. The adapter lock reinforcement member 260 can move slightly backward against a biasing force of the spring 223 when the latches 281a to 284a move to the recesses 221 of the inner housing 220. The adapter lock reinforcement member 260 moves forward by the spring 223 after the latches 281a to 284a completely engage the recesses 221 and then covers the latches 281a to 284a from the outside thereof, and thereby the adapter lock reinforcement member 260 reinforces locking the optical connector 201 to the adapter 280.

The adapter lock reinforcement member 260 has a pair of projecting strips 265 at rear portions each including a unlocking projection 264 having a triangular or rectangular shape. The pair of projecting strips 265 are provided in rotational symmetry about the center axis G. The pair of projecting strips 265, as illustrated in FIG. 24, are placed in the voids 227 beside the shoulders 224 of the inner housing 220 when the adapter lock reinforcement member 260 is disposed outside the front portion of the inner housing 220. That is, the projecting strips 265 are placed so as to locate the unlocking projections 264 beside the shoulders 224 in a circumferential direction. By this configuration, when the optical connector is returned to the initial position from the connected position, the latches 214a and 215a of the rear housing 210 moves to the side from the shoulders 224 of the inner housing 220 and then the sliding projections 214b and 215b temporarily engage the unlocking projections 264 respectively. When the rear housing 210 is further rotated, the sliding projections 214b and 215b press the unlocking projections 264 in the rotating direction and then the adapter lock reinforcement member 260 is temporary moved rearward. Thereby, the reinforcement plates 262 come free from the recesses 221 of the inner housing 220, which are engaged with the latches 281a to 284a of the adapter 280 and the optical connector is unlocked from the adapter 280. The shape of the unlocking projections 264 is not limited, but if the shape of the unlocking projections 264 is a triangular shape, it is possible to move the adapter lock reinforcement member 260 backward by the rotation of the rear housing 210, and to smoothly move the sliding projections 214b and 215b of the rear housing 210 backward after temporary moving the adapter lock reinforcement member 260 backward.

Figure 26:
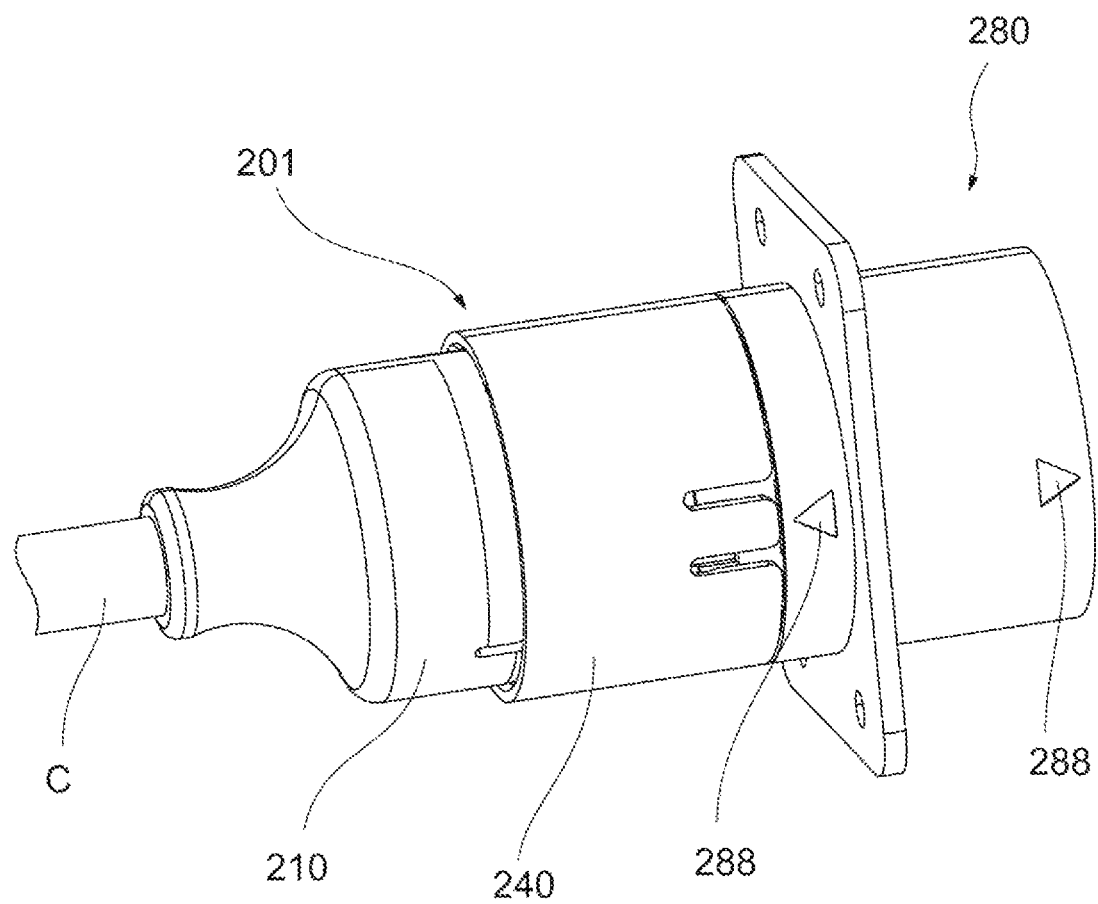
FIG. 26 is a perspective view of a state where the optical connector is attached to the coupling adapter.

The adapter lock reinforcement member 260 is further provided with a pair of recesses 266. The pair of recesses 266 correspond to a pair of protrusions 286 provided on an inner periphery of the adapter 280, respectively. When the protrusions 286 each have a curved convex shape, the recesses 266 each may have a curved concave shape. By this configuration, the optical connector 201 certainly positions in the rotating direction by connecting the optical connector 201 to the adapter 280 so as to locate the protrusions 286 in the recesses 266. In addition, the optical connector 201 (the inner housing 220) may be provided with a pair of arrows 228 and the adapter 280 may be provided with a pair of arrows 288 corresponding to arrows 228, thereby a positioning of the optical connector 201 can be achieved by appearance. This positioning provides a secure positioning in the rotating direction of the optical connector 201 with respect to the adapter 280 or other optical connector to be connected. FIG. 26 shows one example where the optical connector 201 is attached to the adapter 280 for connecting the optical connector 201 to the other optical connector.

The coupling relationship among the respective components in the optical connector 201 having the configuration as described above and the basic operation are the same as the optical connector 1. In other words, when the rear housing 210 moves forward with respect to the inner housing 220 along the center axis G, the arm 230 moves together with the rear housing 210 forward with respect to the inner housing 220. When the arm 230 moves linearly forward along the center axis G, the outer housing 240 rotates about the center axis G with respect to and approaches the inner housing 220 by a rotation guiding mechanism including the guide projections 231b and 232b of the arm 230 and the guide grooves 241 and 242 provided on the inner periphery of the outer housing 240. With this operation, a layout in which the ferrules 2a to 2d or the front end surfaces 3a to 3d of the optical fibers F retained by the retaining holes 223a to 223d are aligned with the opening areas 244a to 244d of the outer housing 240 is achieved.

In the optical connector 201 according to the third embodiment, in the same manner as the optical connector 1, when the outer housing 240 is rotated by the rotation guiding mechanism with respect to the inner housing 220 from the initial position to the connected position, the opening areas 244a to 244d of the forward wall 243 of the outer housing 240 move to positions aligned with the ferrules 2a to 2d or the retaining holes 223a to 223d. Therefore, the front end surfaces of the ferrules 2a to 2d, that is, the distal ends of the optical fibers F retained by the ferrules 2a to 2d are exposed to the outside when rotated from the initial position to the connected position for inserting the optical connector 201 to another connector, for example, and thus contamination of the distal end surfaces of the optical fibers F with dust and debris may be restricted. In addition, the outer housing 240 includes the cleaners 45a to 45d for cleaning the front end surfaces of the ferrules 2a to 2d during the rotation from the initial position toward the connected position. Therefore, contamination of the distal end surfaces of the optical fibers F with dust and debris may be removed to put the exposure faces of the optical fibers in a cleaned state when the optical connector 201 connects. Consequently, when connecting the optical fibers with the optical connector 201, reduction of connection loss due to contamination with dust and debris is achieved.

In addition, as the optical connector 201 is configured to, but not limited to, connect a number of the optical fibers (for example, ninety-six optical fibers) at once to other optical fibers, time consumed for connection may be reduced compared with the related art. In addition, as the restoration from the connected position to the initial position is enabled by the resilient members 250a and 250b, disconnecting operation is also easy.

The optical connector 201 includes the adapter rock reinforcement member 260 and a spring construction of the inner housing 220 which corresponds to the member 260. Therefore, the optical connector 201 can be certainly and firmly connected to the adapter 280 when connecting the optical connector 201 to other optical connector via the adapter 280.

Fourth Embodiment

Figure 27:
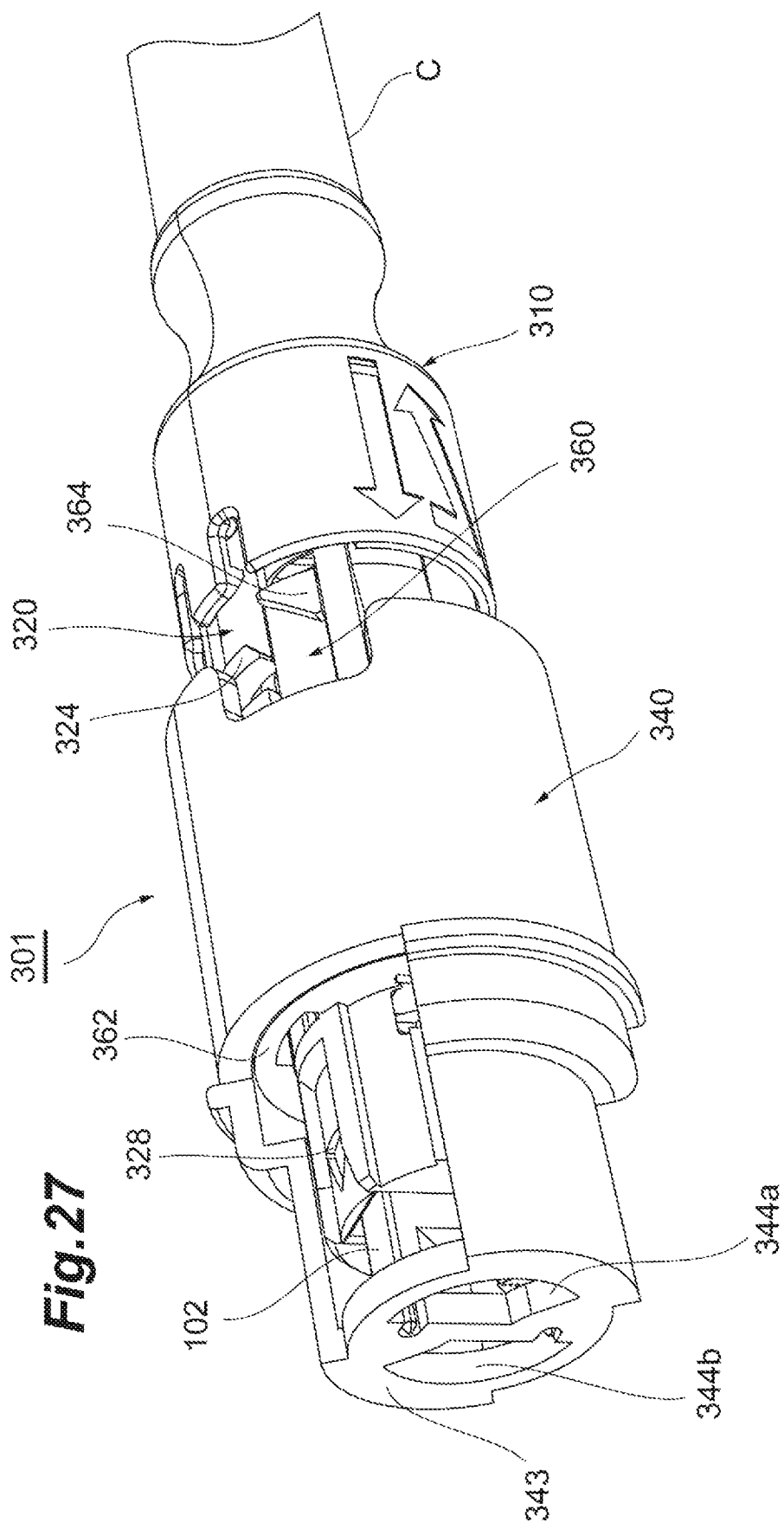
FIG. 27 is a perspective view illustrating an optical connector according to a fourth embodiment.
Figure 28:
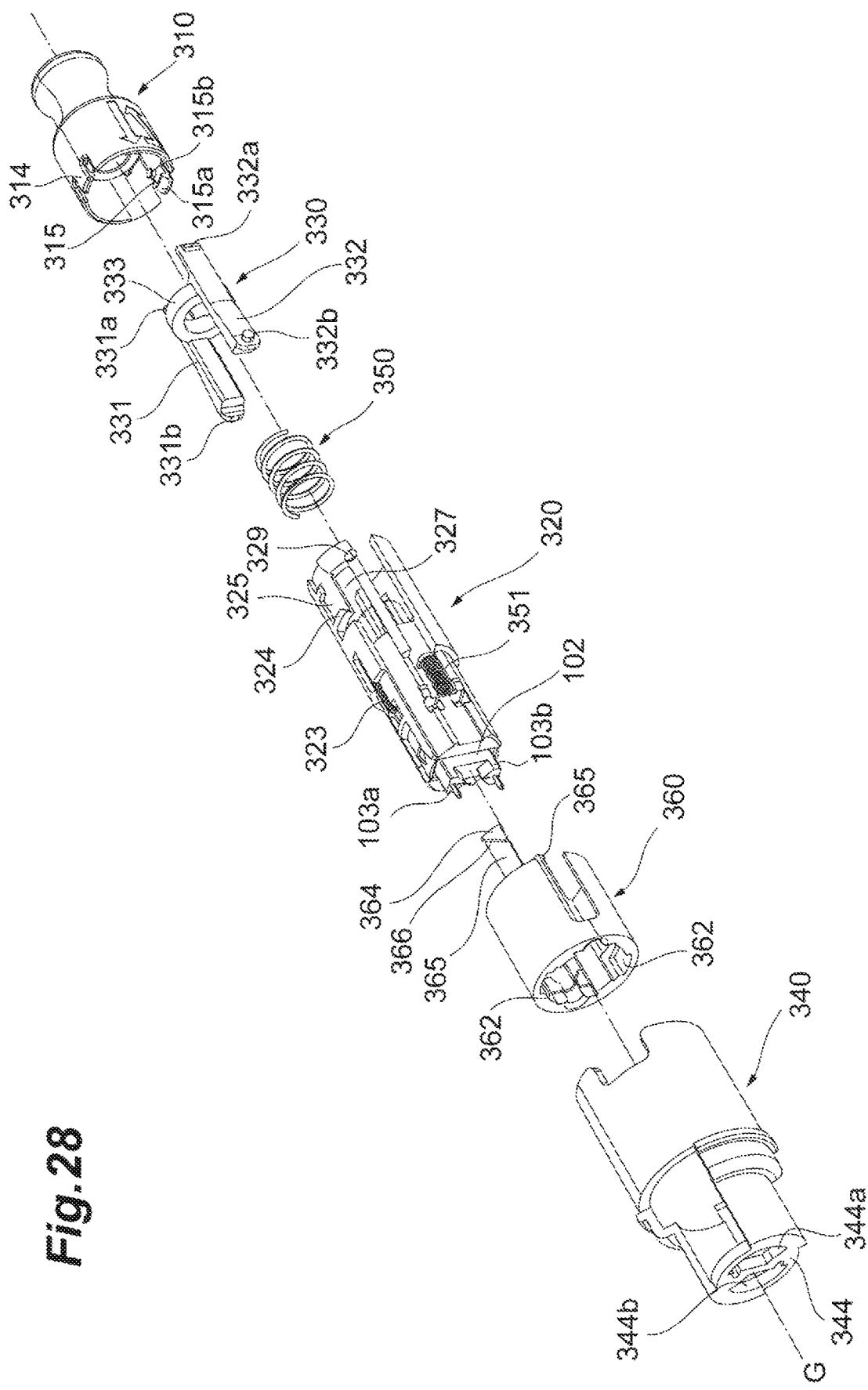
FIG. 28 is an exploded perspective view of the optical connector illustrated in FIG. 27.

Referring now to FIG. 27 and FIG. 28, an optical connector 301 according to a fourth embodiment will be described. FIG. 27 is a perspective view of the optical connector 301. FIG. 28 is an exploded perspective view of the optical connector 301.

As illustrated in FIG. 27 and FIG. 28, the optical connector 301 is a connector to modify part of the configuration of the optical connector 101 according to the second embodiment. The optical connector 301 includes a rear housing 310, an inner housing 320, an arm 330, an outer housing 340, and a resilient member 350 in the same manner as the optical connector 101. In the optical connector 301, the basic configurations and functions of the rear housing 310, the inner housing 320, the arm 330, the outer housing 340, and the resilient member 350 are the same as the configurations and the functions of the rear housing 110, the inner housing 120, the arm 130, the outer housing 140, and the resilient member 150 of the optical connector 101 according to the first embodiment. The optical connector 301 further includes the adapter lock reinforcement member 360. The basic configurations and functions of the adapter lock reinforcement member 360 are the same as the configurations and the functions of the adapter lock reinforcement member 260 of the optical connector 201 according to the third embodiment. In the following description, different points from the optical connector 101 or 201 will be mainly described and description of the similar portions may be omitted.

The rear housing 310 is a member located around the rear end of the optical connector 301 and allows the optical fiber cable C to be inserted therethrough. In the rear housing 310, unlike the configuration of the optical connector 101, projecting strips 314 and 315 are provided in the tubular portion. The projecting strips 314 and 315 respectively include latches 315a and sliding protrusions 315b each projecting inward on the inner periphery surface thereof. When the rear housing 310 moves linearly forward with respect to the inner housing 320 along the center axis G, the latches 315a climb over shoulders 324 of the inner housing 320 and engages the shoulders 324, respectively. When rotating the rear housing 310 with respect to the inner housing 320 after the latches 315a engage the shoulders 324, the latches 315a are disengaged from the shoulders 324, then the sliding projections 315b of the rear housing 310 slide on the inclined surfaces 366 and move rearward, and then the rear housing 310 is restored to the initial position. These configurations are the same as the optical connector 1 or 201. Note that the inclined surfaces 366 are provided with the adapter lock reinforcement member 360 in this embodiment.

The inner housing 320 includes a single retaining hole for housing a single ferrule 102 in front thereof. The inner housing 320, at rear portion, includes a pair of shoulders 324, a pair of depressed surfaces 325 and voids 327 for each housing a projecting strip 365 including an inclined surface 366. FIG. 28 discloses one of the shoulders 324, depressed surfaces 325, and voids 327. The other shoulder, depressed surface, and voids, which are disposed in point symmetry about the center axis G and in rotational symmetry with respect to the center axis G, have the same configurations. When the rear housing 310 is rotated with respect to the inner housing 320 after the latches 315a engage the shoulders 224, the latches 315a is released from the shoulders 324, and the sliding projections 315b of the rear housing 310 slide on the inclined surfaces 326 of the projecting strips 365 housed in the voids 327 and move rearward, and then the rear housing 310 returns the initial position. The inner housing 320 includes a pair of springs 323 in the outer periphery. The springs 323 bias the adapter lock reinforcement member 360 forward, in the same manner as the springs 223 of the third embodiment. The inner housing 320 further includes a pair of protrusions 329. The projections 329 generate a click by cooperating with slopes and shoulders provided inside the rear housing 310 when the lock is released, in the same manners as the projections 229 of the third embodiment.

The arm 330 includes a pair of side walls 331 and 332, a coupling member 333 coupling the side walls 331 and 332. The side walls 331 and 332 include protrusions 331a and 332a at rear portions and guide projections 331b and 332b at front portions. The protrusions 331a and 332a are housed in the circumferential groove of the rear housing 310 and engage the arm 330 in a state of rotatable with respect to the rear housing 310. The guide projections 331b and 332b constitute part of a rotation guiding mechanism for converting the linear movement of the arm 330 along the center axis G into a rotational movement of the outer housing 340, and are housed in the guide grooves of the outer housing 340.

The outer housing 340 includes guide grooves, a forward wall 343, opening areas 344a and 344b, and cleaners. The guide grooves of the outer housing 340 formed on the inner periphery thereof and having the same configuration as guide grooves 41 and 42 of the optical connector 1 are coupled to the guide projections 331b and 332b of the arm 330, and perform the same rotational movement as the first embodiment. When the outer housing 340 rotates by a predetermined angle with respect to and approaches the inner housing 320, front end surfaces 103a and 103b of a ferrule 102 are positioned in the two opening areas 344a and 344b.

The resilient member 350 is disposed between the inner housing 320 and the arm 330 (connecting portion 333) to press the rear housing 310 and the arm 330 with respect to the inner housing 320 rearward. In the optical connector 301, the resilient member 350 is disposed inside the inner housing 320 and the arm 330. The optical connector 301 includes a pair of resilient members 351 located on the outer periphery of the inner housing 320, thereby the outer housing 340 is pressed forward.

Figure 29A:
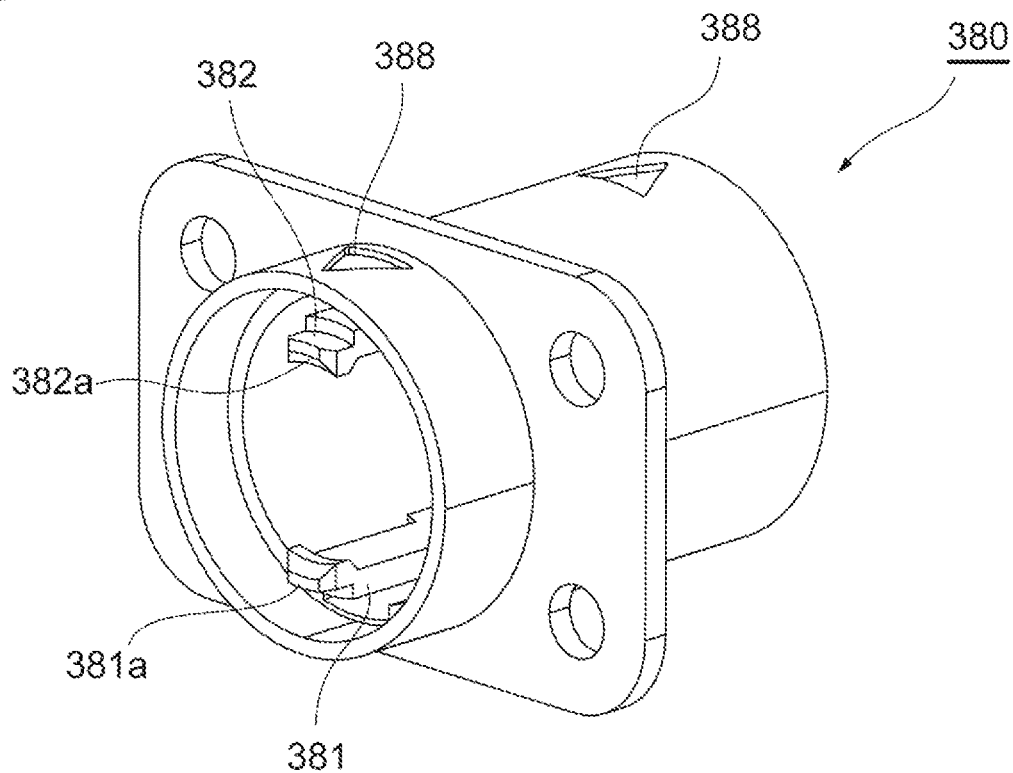
FIG. 29A is a perspective view of a coupling adapter used for the optical connector illustrated in FIG. 27 viewed from one side.
Figure 29B:
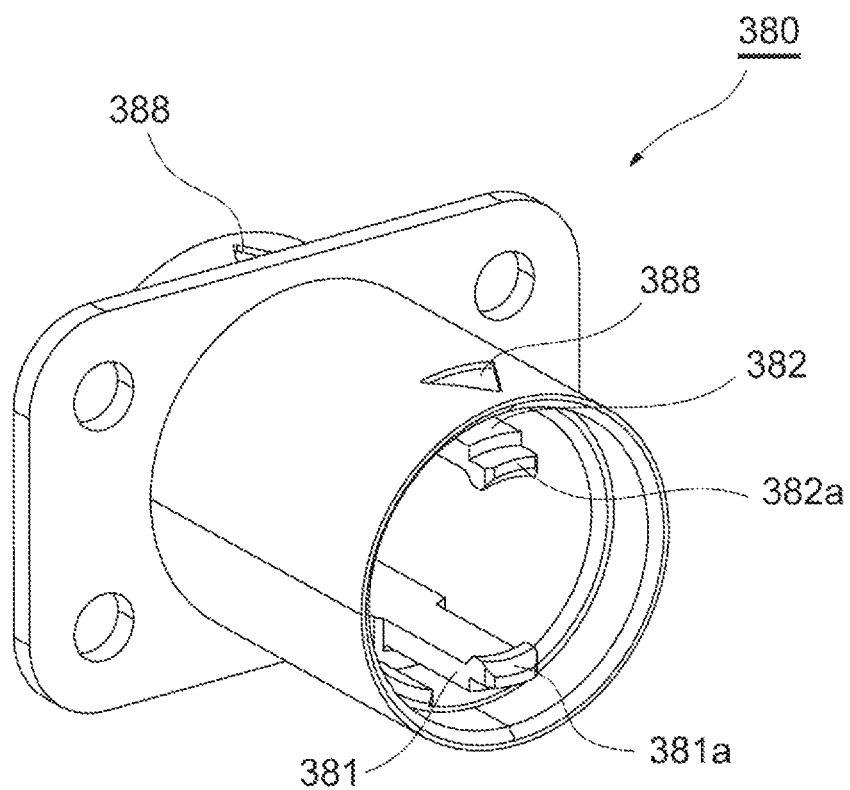
FIG. 29B is a perspective view viewed from the other side.

The adapter lock reinforcement member 360 has a substantially cylindrical outline and is disposed outside the front portion of the inner housing 320. The adapter lock reinforcement member 360 is a member for reinforcing locking to an adapter 380 when connecting the optical connector 301 to another optical connector via the adapter 380 (see FIG. 29A and FIG. 29B). The adapter 380 includes two projecting strips 381 and 382 provided on an inner periphery equidistantly in the circumferential direction. The projecting strips 381 and 382 are provided with latches 381a and 382a respectively at distal ends thereof. When connecting the optical connector 301 to the adapter 380, the latches 381a and 382a engage a pair of recesses of the inner housing 320 and the optical connector 301 is locked to the adapter 380. The adapter lock reinforcement member 360 fixes the latches 381a and 382a inward by two reinforcement plates 362 to prevent the latches 381a and 382a from coming apart toward the outside and from being unintentional released when the above-described locking is done.

The adapter lock reinforcement member 360 includes a pair of projecting strips 365 each including a unlocking projection 364 having a triangular or rectangular shape at the rear end. The unlocking projections 364 are provided with the inclined surfaces 366. The pair of protruding strips 365 are provided in rotational symmetry about the center axis G. Each of the projecting strips 365 is arranged in a void 327 on the side of the shoulder 324 of the inner housing 320 when the adapter lock reinforcement member 360 is disposed outside and in the front portion of the inner housing 320. By this configuration, when the optical connector is returned from the rotated position to the initial position, the adapter lock reinforcement member 360 is slightly moved backward and the optical connector 301 is easily unlocked from the adapter 380, in the same manner as the third embodiment.

Figure 30:
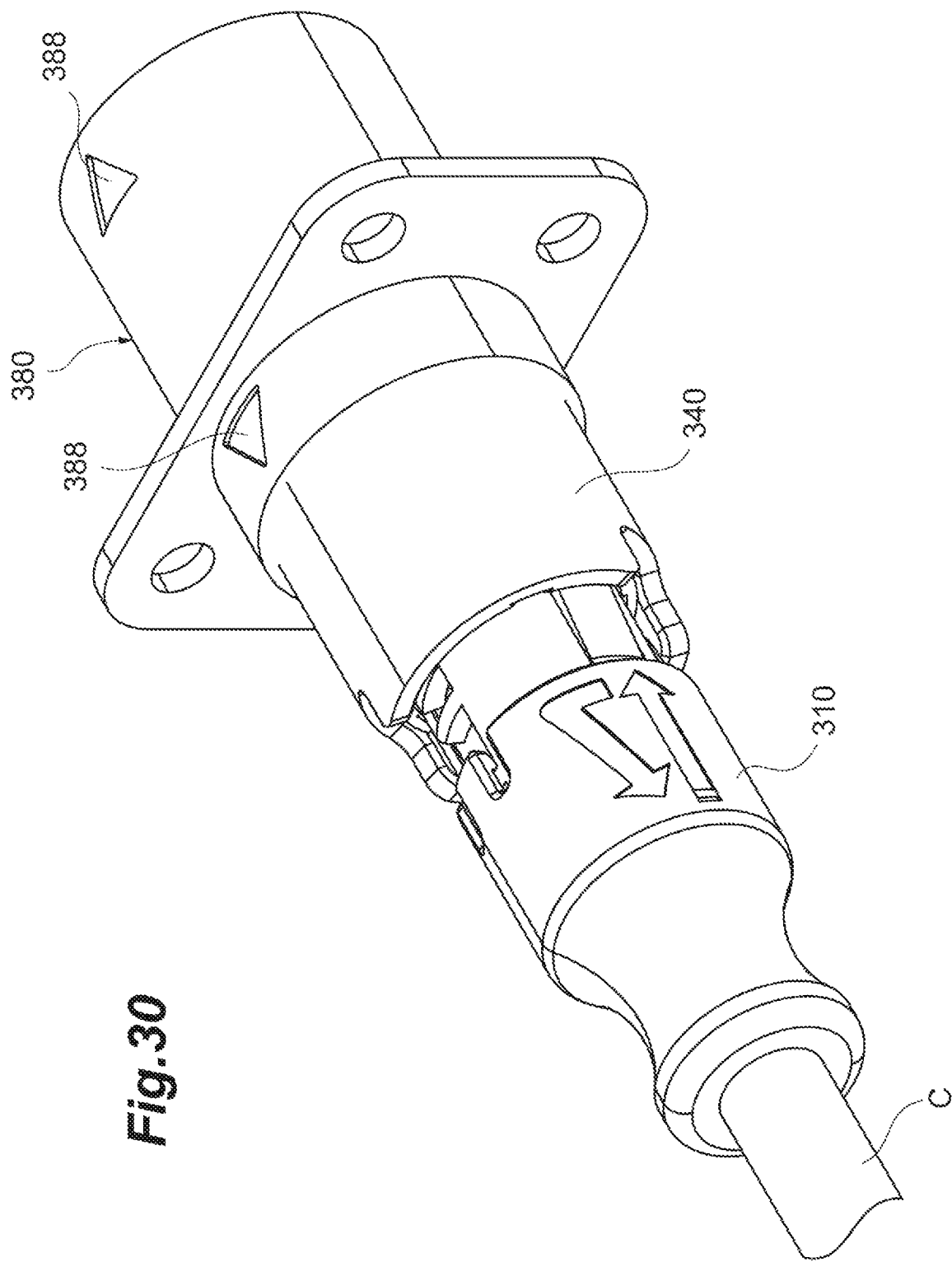
FIG. 30 is a perspective view of a state where the optical connector is attached to the coupling adapter.

The optical connector 301 (the inner housing 320) may be provided with a pair of arrows 328 and the adapter 380 may be provided with a pair of arrows 388 corresponding to arrows 328, thereby a positioning of the optical connector 201 can be achieved by appearance. This positioning provides a secure positioning in the rotating direction of the optical connector 301 with respect to the adapter 380 or other optical connector to be connected. FIG. 30 shows one example where the optical connector 301 is attached to the adapter 380 for connecting the optical connector 301 to the other optical connector.

The coupling relationship among the respective components in the optical connector 301 having the configuration as described above and the basic operation are the same as the optical connector 101. In other words, when the rear housing 310 moves forward with respect to the inner housing 320 along the center axis G, the arm 330 moves together with the rear housing 310 forward with respect to the inner housing 320. When the arm 330 moves linearly forward along the center axis G, the outer housing 340 rotates about the center axis G with respect to and approaches the inner housing 320 by a rotation guiding mechanism including the guide projections 331b and 332b of the arm 330 and the guide grooves provided on the inner periphery of the outer housing 340. With this operation, a layout in which the ferrule 102 or the front end surfaces 103a and 103b of the optical fibers F retained by the retaining hole are aligned with the opening areas 344a and 344b of the outer housing 340 is achieved.

In the optical connector 301 according to the fourth embodiment, when the outer housing 340 is rotated by the rotation guiding mechanism with respect to the inner housing 320 from the initial position to the connected position, the opening areas 344a and 344b of the forward wall 343 of the outer housing 340 move to positions aligned with the front end face (fiber exposure faces) of the ferrule 102. Therefore, the front end surfaces of the ferrule 102, that is, the distal ends of the optical fibers F retained by the ferrule 102 are exposed to the outside when rotated from the initial position to the connected position for inserting the optical connector 301 to another connector, for example, and thus contamination of the distal end surfaces of the optical fibers F with dust and debris may be restricted. In addition, the outer housing 340 includes the cleaners for cleaning the front end surfaces of the ferrule 102 during the rotation from the initial position toward the connected position. Therefore, contamination of the distal end surfaces of the optical fibers F with dust and debris may be removed to put the exposure faces of the optical fibers in a cleaned state when the optical connector 301 connects. Consequently, when connecting the optical fibers with the optical connector 301, reduction of connection loss due to contamination with dust and debris is achieved. In addition, with the configuration of the ferrule 102, even when the optical connector 301 is downsized, exposure of the end surface of the ferrule 102 is achieved without problem by the rotational movement of the outer housing 340.

Fifth Embodiment

Figure 31:
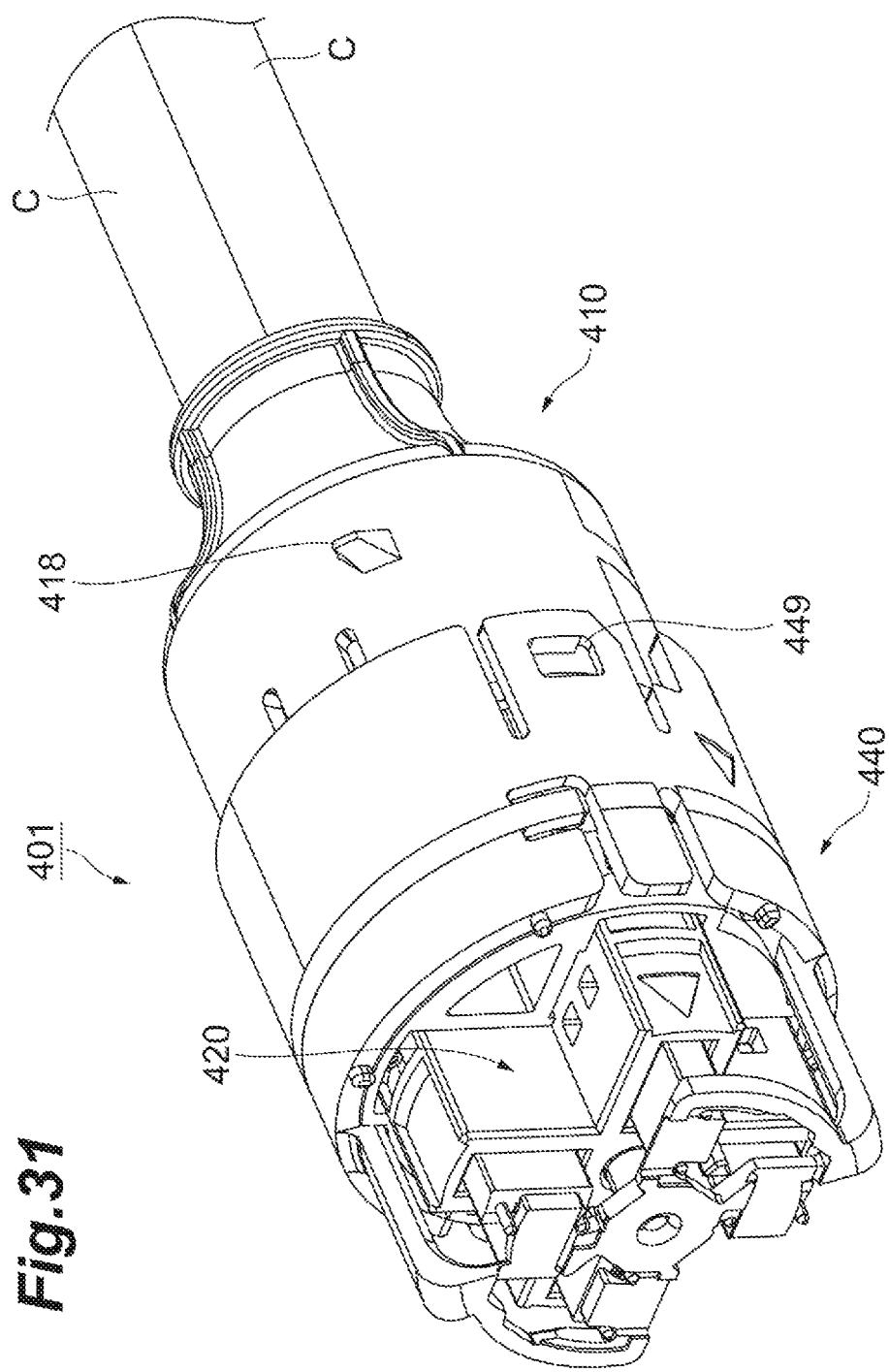
FIG. 31 is a perspective view illustrating an optical connector according to a fifth embodiment.
Figure 32:
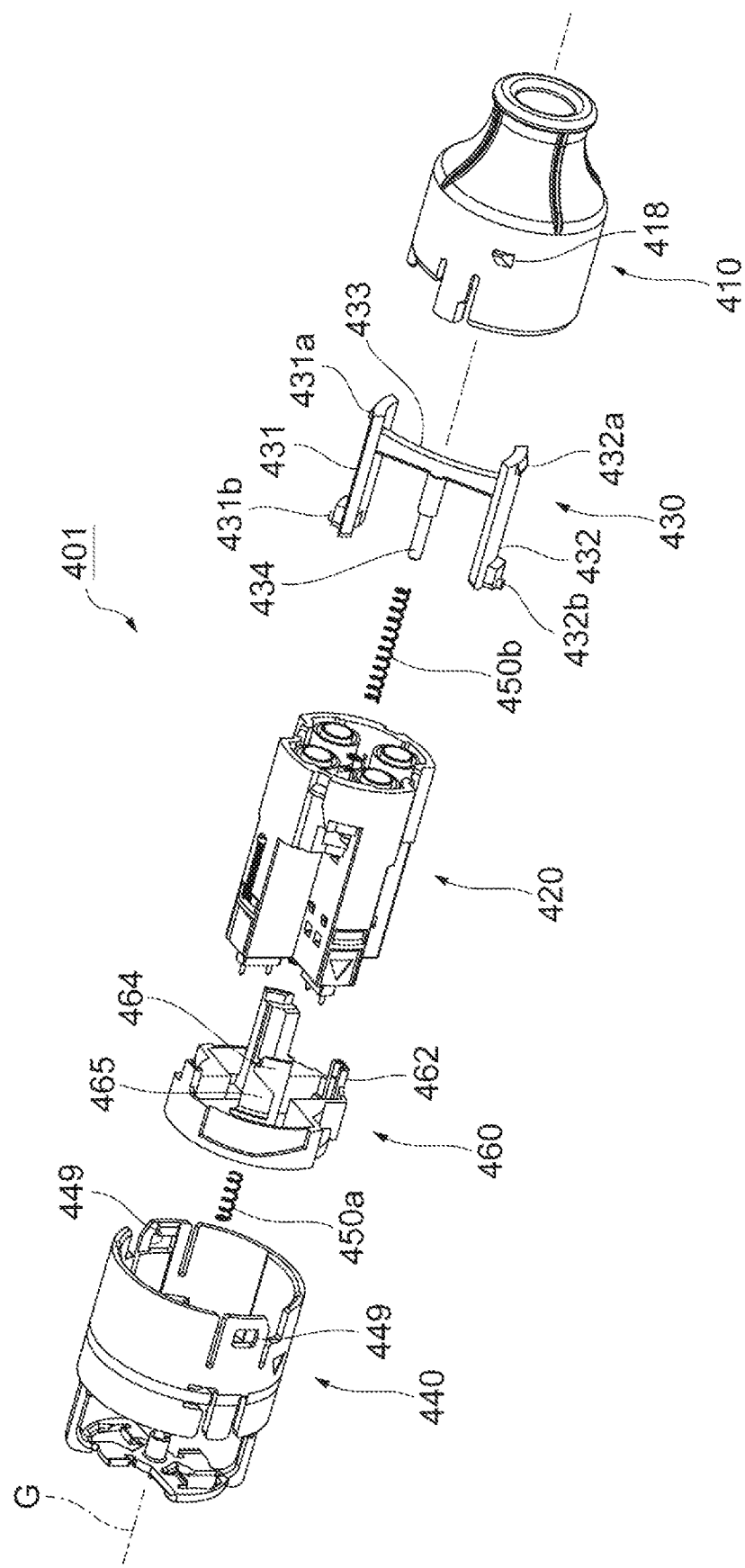
FIG. 32 is an exploded perspective view of the optical connector illustrated in FIG. 31.

Referring now to FIG. 31 and FIG. 32, an optical connector 401 according to the fifth embodiment will be described. FIG. 31 is a perspective view of the optical connector 401. FIG. 32 is an exploded perspective view of the optical connector 401.

As illustrated in FIG. 31 and FIG. 32, the optical connector 401 is a connector to further modify the optical connector 201 according to the third embodiment. The optical connector 401 includes a rear housing 410, an inner housing 420, an arm 430, an outer housing 440, resilient members 450a, 450b, and an adapter lock reinforce member 460 in the same manner as the optical connector 201. Since the optical connector 401 is a connector for housing a number of optical fibers for connection in the same manner as the optical connector 201, basic configuration and functions of the rear housing 410, the inner housing 420, the arm 430, the outer housing 440, the resilient members 450a, 450b and the adapter lock reinforce member 460 are the same as the configurations and the functions of the rear housing 210, the inner housing 220, the arm 230, the outer housing 240, the resilient members 250a, and 250b, and the adapter lock reinforce member 260 of the optical connector 201. In the following description, different points from the optical connector 201 will be mainly described and description of the similar portions may be omitted.

Figure 33:
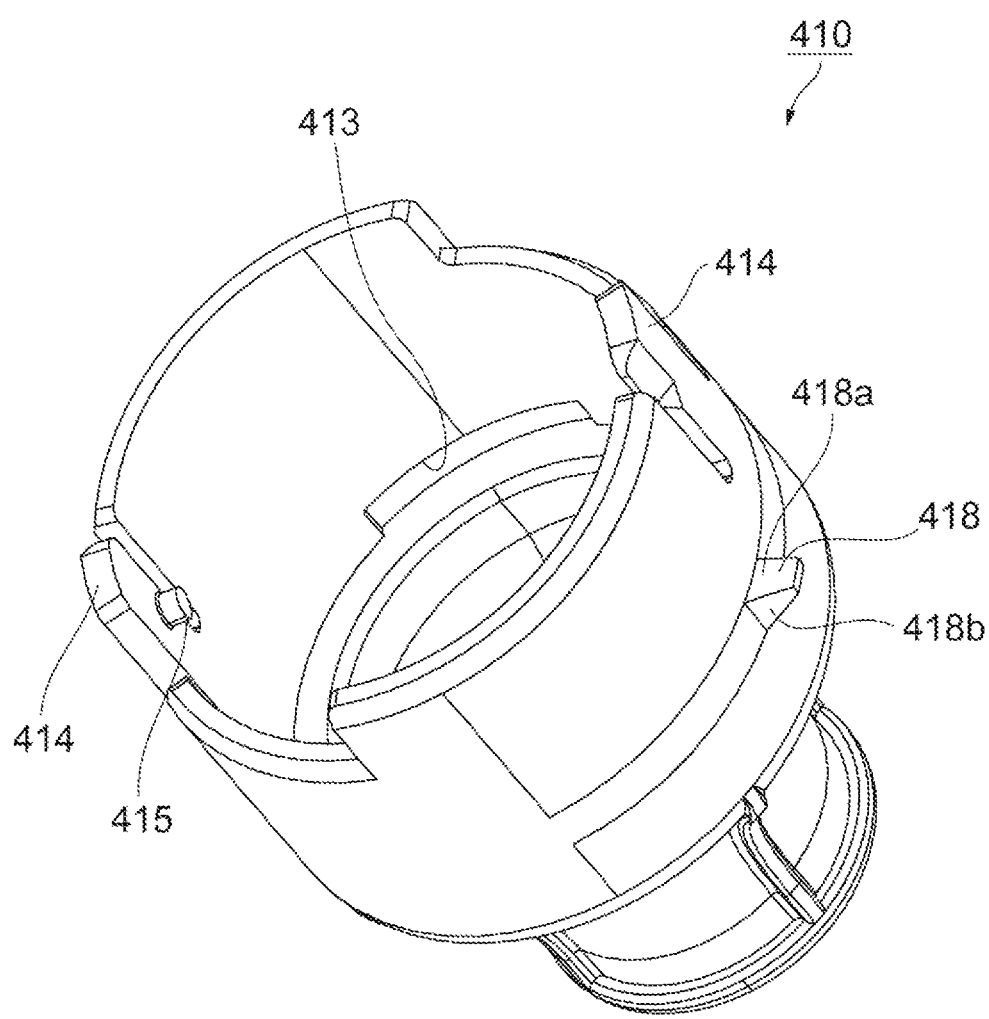
FIG. 33 is a perspective view of a rear housing of the optical connector illustrated in FIG. 31.

The rear housing 410 is a member located around the rear end of the optical connector 401, and allows the optical fiber cables C to be inserted therein. As illustrated in FIG. 32 and FIG. 33, the rear housing 410 includes a pair of circumferential grooves 413, a pair of projecting strips 414, a pair of sliding projections 415, and a pair of locking protrusions 418. The pair of circumferential grooves 413, the pair of sliding projections 415, and the pair locking protrusions 418 are disposed in point symmetry about the center axis G. FIG. 33 illustrates one of the pair circumferential grooves 413, one of the pair of sliding projections 415, and one of the pair locking protrusions 418. The other circumferential grooves 413, sliding projections 415, and locking protrusions 418 are located in rotational symmetry with respect to the center axis G to one of the pair circumferential grooves 413, one of the pair of sliding projections 415, and one of the pair locking protrusions 418.

The pair of circumferential grooves 413 of the rear housing 410 receive protrusions 431a and 432a of the arm 430 (See FIG. 35), respectively, and rotate the arm 430 with respect to the rear housing 410 at a predetermined angular range. Each of the projecting strips 414 is provided with the sliding projection 415 on the inner peripheral surface in such a way as to project inward. The pair of sliding projections 415 guide rotating movement of the rear housing 410 when the optical connector 401 returns from the connected position to the initial position. In this embodiment, the projecting strips 414 do not include latches, such as latches 214a and 215a of the third embodiment, for locking the rear housing 410 to the inner housing 420. Instead, the rear housing 410 include the pair of locking protrusions 418 on an outer periphery surface of the rear housing 410.

The pair of locking protrusions 418 are used for locking the outer housing 440 to the rear housing 410 when the optical connector 401 moves from the initial position to the connected position. The pair of locking protrusions 418 are disposed in point symmetry about the center axis G. Each of the locking protrusions 418 includes a first sloped surface 418a and a second sloped surface 418b. The first sloped surface 418a extends along the center axis G. The second sloped surface 418b extends along a circumferential direction of the rear housing 410. When the optical connector 401 moves from the initial position to the connected position, each outer edge of a pair of openings 449 provided with the outer housing 440 (See FIG. 36A and FIG. 36B) climbs the first sloped surface 418a so that the locking protrusions 418 are smoothly locked inside the openings 449, respectively. When the optical connector 401 moves from the connected position to the initial position, each inner edge of a pair of openings 449 of the outer housing 440 climbs the second sloped surface 418b so that the locking protrusions 418 are smoothly unlocked from the openings 449, respectively.

Figure 34:
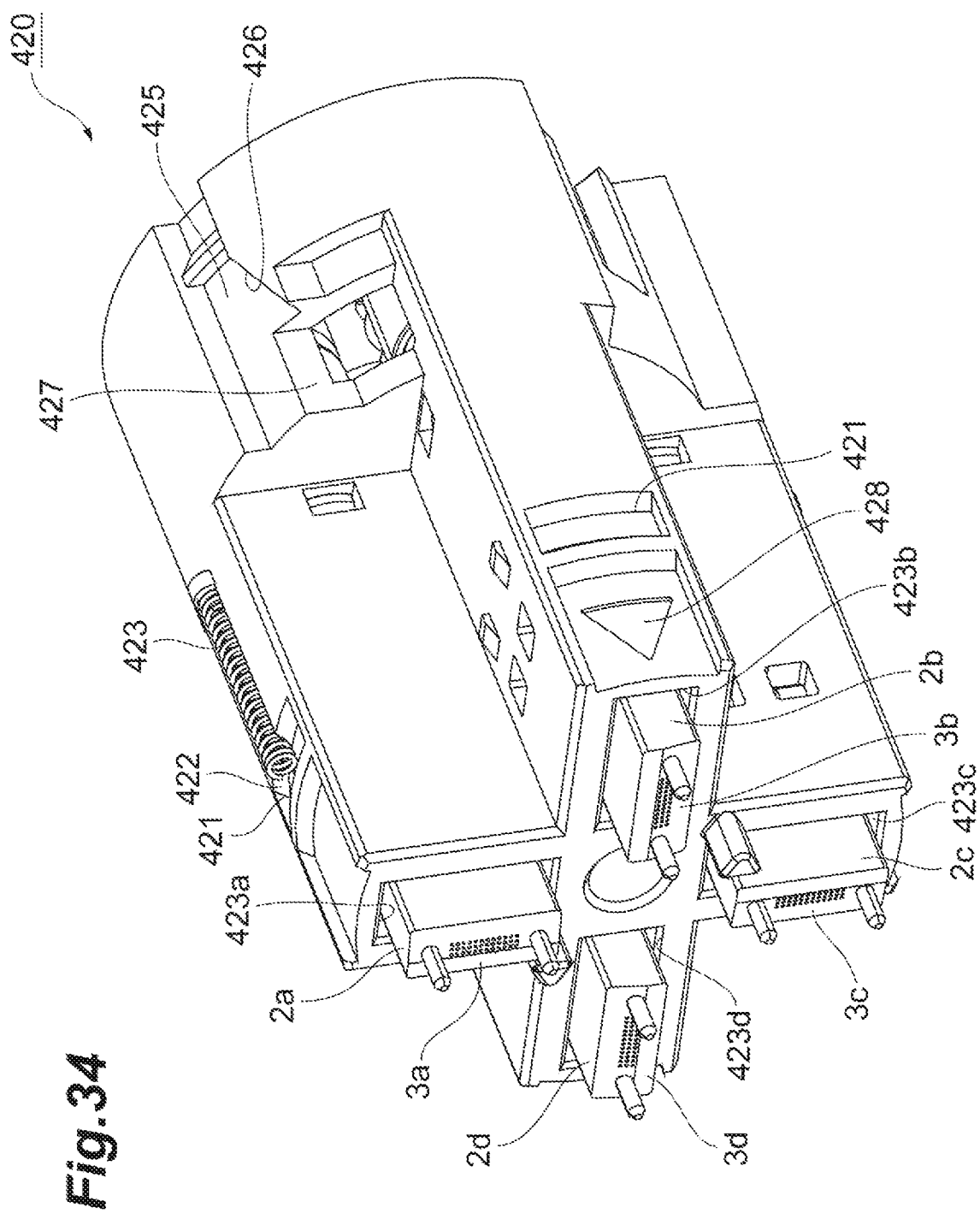
FIG. 34 is a perspective view of an inner housing of the optical connector illustrated in FIG. 31.

The inner housing 420, as illustrated in FIG. 32 and FIG. 34, includes four retaining holes 423a to 423d for housing the ferrules 2a to 2d in front thereof. The inner housing 420 includes a pair of depressed surfaces 425 and a pair of inclined surfaces 426 in rear thereof. The pair of depressed surfaces 425 and the pair of inclined surfaces 426 are disposed in point symmetry about the center axis G. FIG. 34 illustrates one of the depressed surfaces 425 and one of the inclined surfaces 426. The other depressed surface 425 and inclined surface 426 are located in rotational symmetry with respect to the center axis G to one of the depressed surfaces 426 and one of the inclined surfaces 426. The inner housing does not include shoulders, such as the shoulders 224 of the third embodiment, for engaging the latches of the rear housing 410.

Figure 40A:
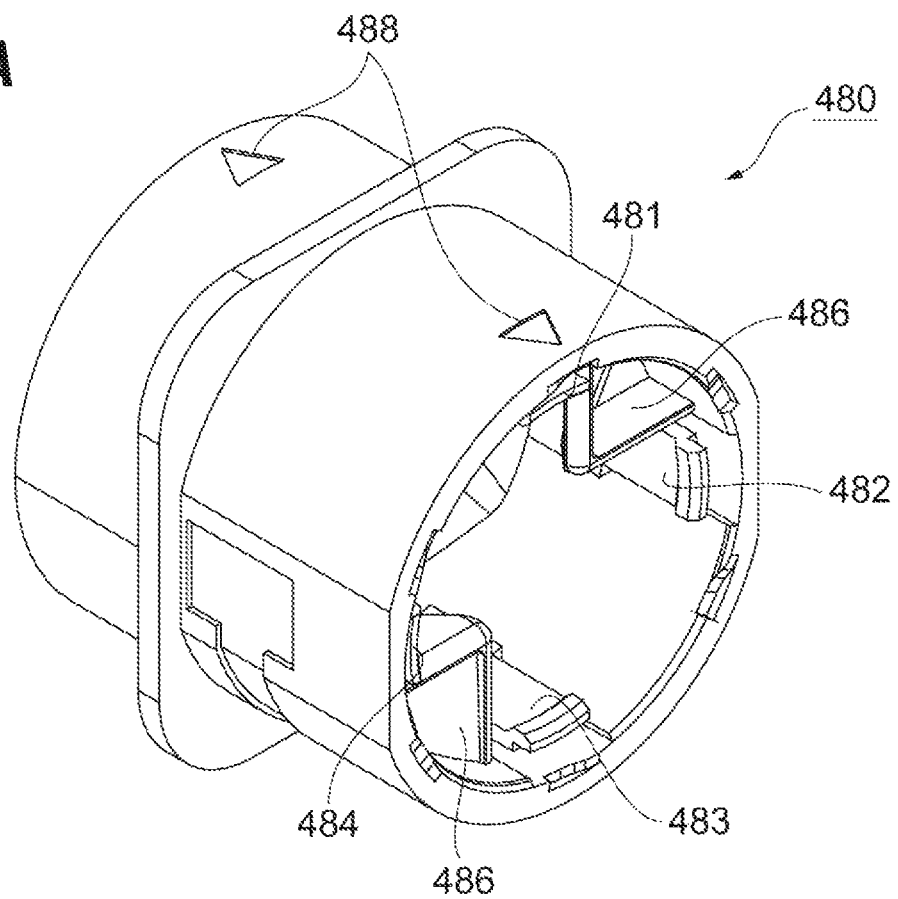
FIG. 40A is a perspective view of a coupling adapter used for the optical connector illustrated in FIG. 31 viewed from one side.
Figure 40B:
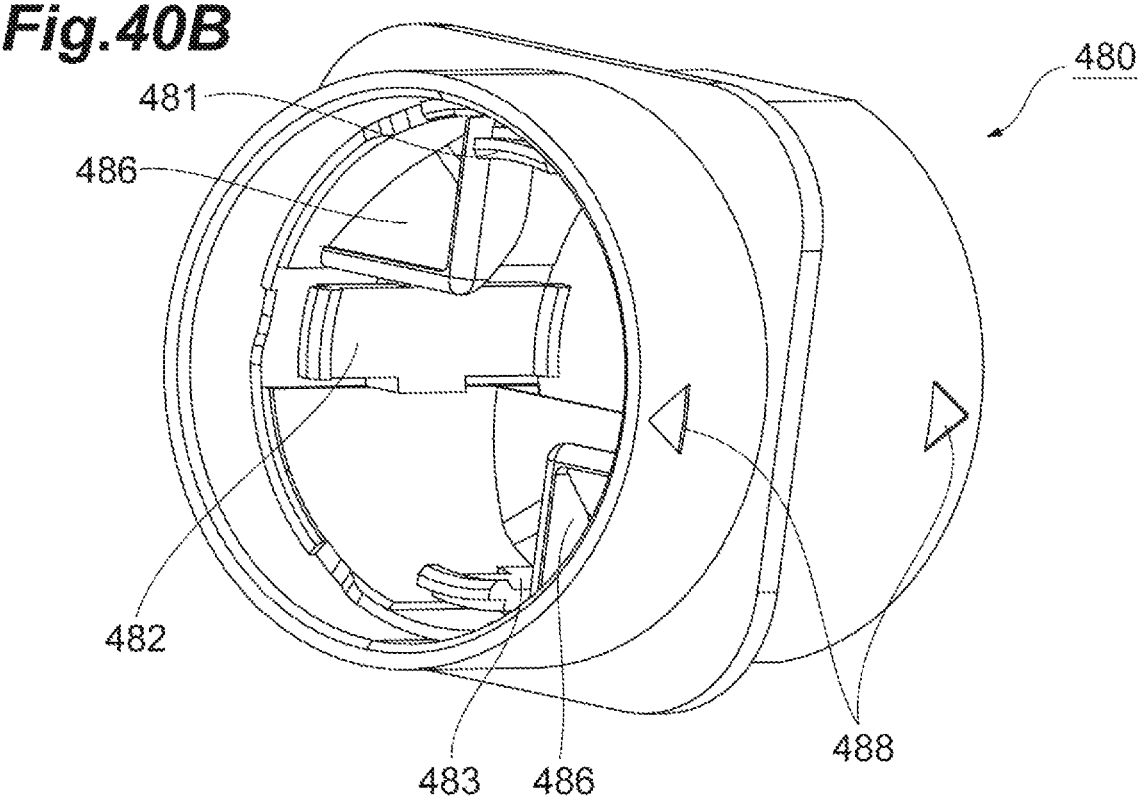
FIG. 40B is a perspective view of the coupling adapter viewed from the other side.

The inner housing 420 further includes four recesses 421 on respective outer periphery portions of the retaining holes 423a to 423d. The recesses 421 are portions for engaging the latches 481 to 484 of the adapter 480 (See FIG. 40A and FIG. 40B). The inner housing 420 includes two horizontally long grooves 422 at rear of two of the recesses 421 and houses the springs 423 in the grooves 422, respectively. The springs 423 work to bias the adapter lock reinforcement member 460, as discussed later, forward.

Figure 35:
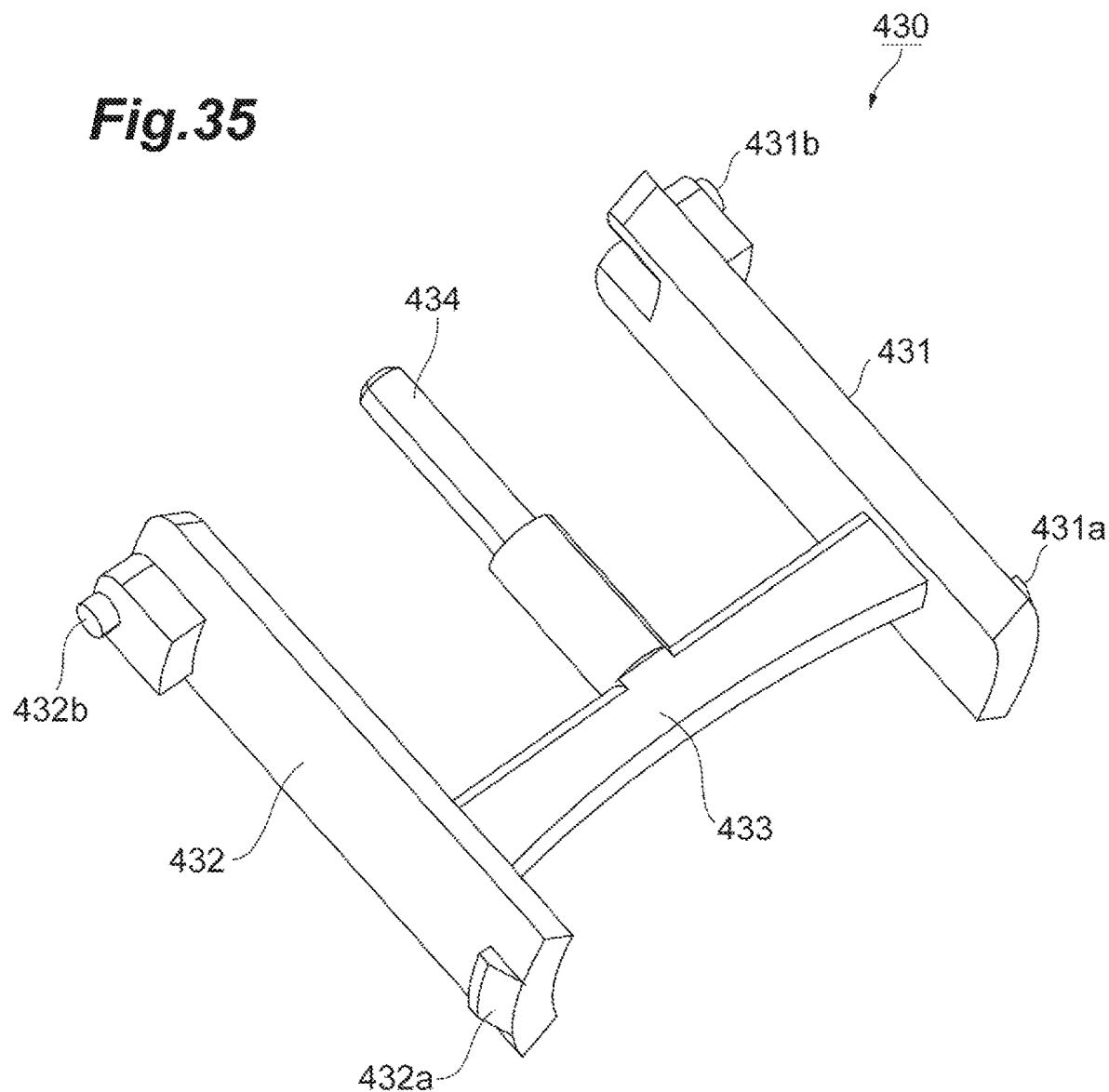
FIG. 35 is a perspective view of an arm of the optical connector illustrated in FIG. 31.

The arm 230, as illustrated in FIG. 32 and FIG. 35, includes a pair of side walls 431 and 432, a coupling member 433 coupling the side walls 431 and 432, and a receiving member 434 extending from a center of the coupling member 433 toward the front end. The side walls 431 and 432 include protrusions 431a and 432a at rear portions and guide projections 431b and 432b at front portions. The protrusions 431a and 432a are housed in the circumferential grooves 413 of the rear housing 410 and engage the arm 430 in a state of rotatable with respect to the rear housing 410 at a certain rotating angle. The guide projections 431b and 432b constitute part of rotation guiding mechanism for converting the linear movement of the arm 430 along the center axis G into rotational movement of the outer housing 440, and are housed in a pair of guide grooves 441 of the outer housing 440 (See FIG. 36A and FIG. 36B). The movement of the guide projections 431b and 432b in the grooves 441 is in the same manner as the optical connector 201. The receiving member 434 receives a rear end of the resilient member 450b. Accordingly, the arm 430 is presses rearward, that is, toward the rear housing 410.

Figure 36A:
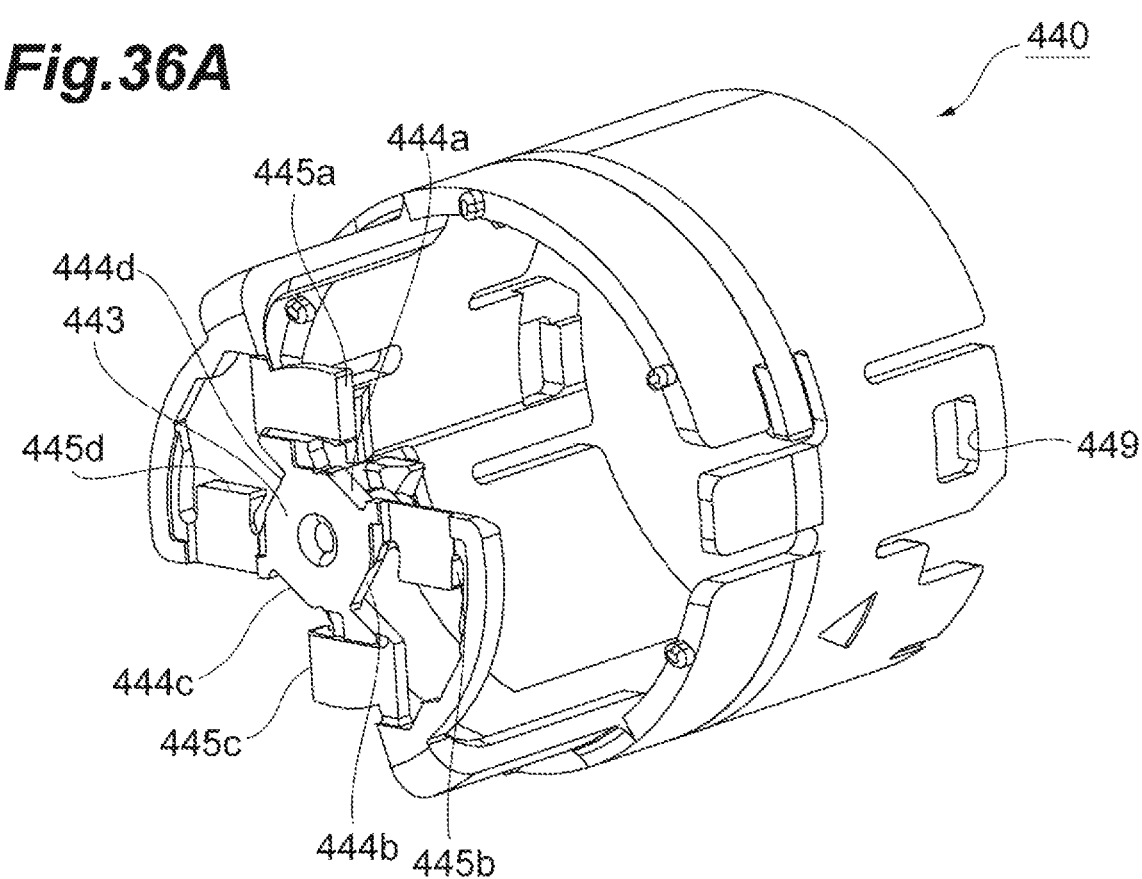
FIG. 36A is a perspective view of an outer housing of the optical connector illustrated in FIG. 31 viewed from a front side.
Figure 36B:
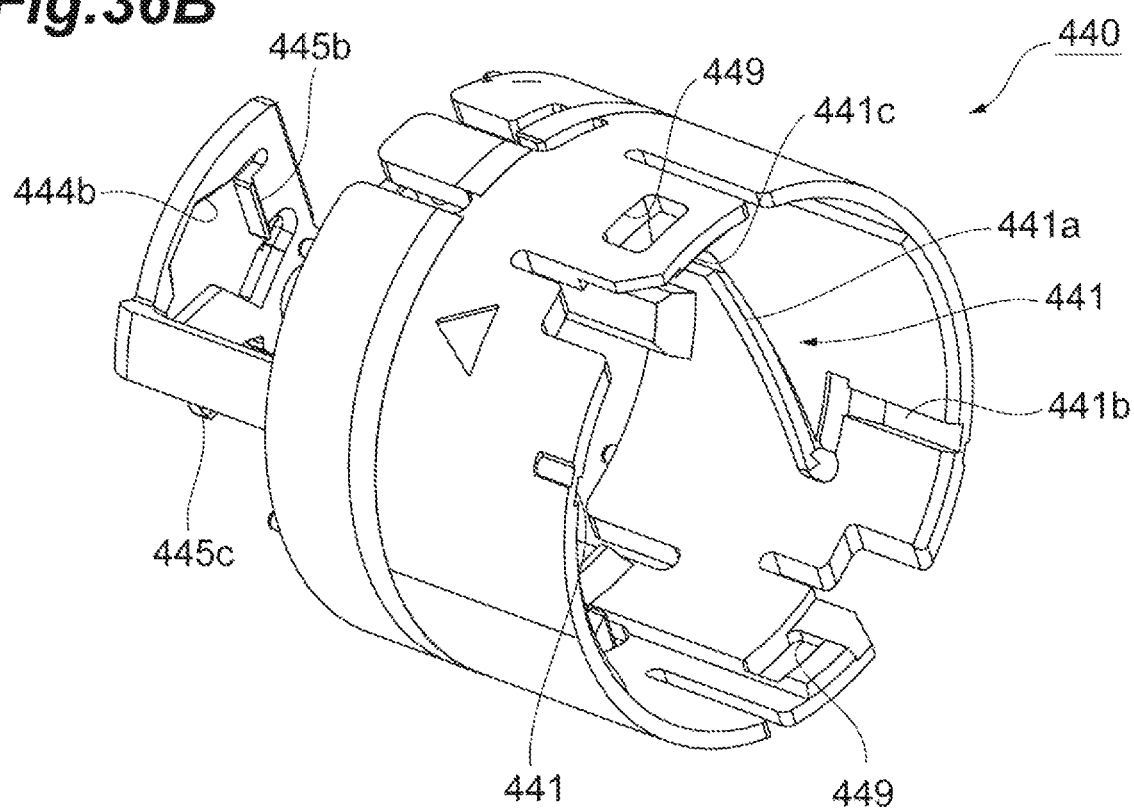
FIG. 36B is a perspective view of the outer housing from a rear side.

The outer housing 440 has a substantially cylindrical outline as illustrated in FIG. 32, FIG. 36A and FIG. 36B and includes the pair of guide grooves 441, a forward wall 443, four openings 444a to 444d, and four cleaners 445a to 445d, and the pair of locking openings 449.

The outer housing 440 is provided with the pair of guide grooves 441 which functions rotation guiding mechanism to rotate the outer housing 440 with respect to the inner housing 420 and the rear housing 410 by a predetermined angle and to make the outer housing 440 approach the inner housing 420. Each of the guide grooves 441 includes an inclined portion 441a inclined with respect to the center axis G, a first straight portion 441b and a second straight portion 441c extending respectively from both ends of the inclined portion 441a along the center axis G in the same manner as the optical connector 201. The guide projections 431b and 432b of the arm 430 are housed in the guide grooves 441, respectively, and this construction makes the outer housing 440 rotate with respect to the inner housing 420 and approach the inner housing 420 in association with the liner forward movement of the arm 430. The outer housing 440 includes a receiving member 446 which receives the front end of the resilient member 450a. Thereby, the outer housing 440 is pressed forward.

The forward wall 443 of the outer housing 440 is provided with the four openings 444a to 444d, and the front end surfaces 3a to 3d of the ferrules 2a to 2d protrude from the respective openings 444a to 444d when the optical connector 401 moves from the initial position to the connected position (See FIG. 41C). The cleaners 445a to 445d are located inside the forward wall 443 and clean the front end surfaces 3a to 3d of the ferrules 2a to 2d and distal ends of the optical fibers retained by the respective ferrules 2a to 2d when the optical connector 401 moves from the initial position to the connected position and the outer housing 440 rotates with respect to the inner housing 420 retaining the ferrules 2a to 2d.

Figure 37A:
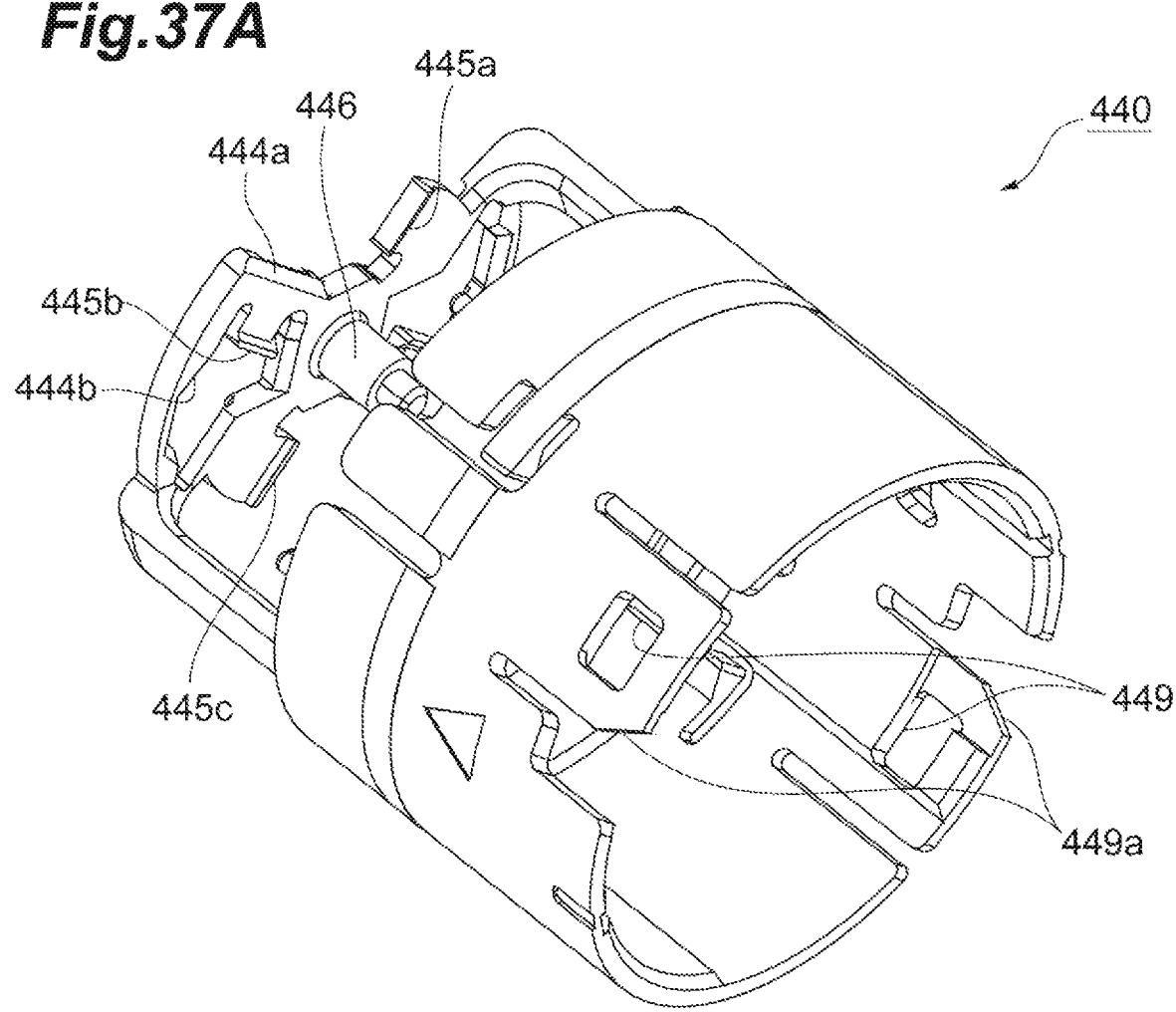
FIG. 37A is a perspective view of the outer housing viewed from the rear side.
Figure 37B:
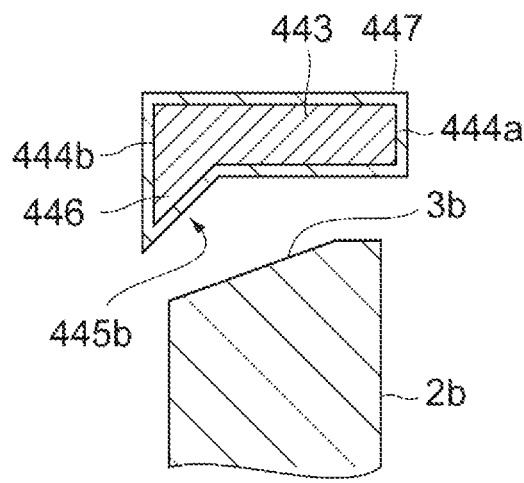
FIG. 37B is a cross sectional view of a cleaner and a ferrule of the optical connector illustrated in FIG. 31.
Figure 37C:
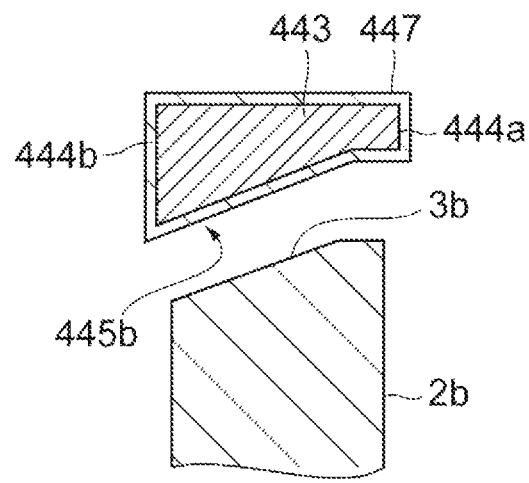
FIG. 37C is a cross sectional view of a modified example of the cleaner and the ferrule.

As illustrated in FIGS. 37A and 37B, the cleaner 445a to 445d are located on an inner surface of the forward wall 443. FIG. 37B is a cross sectional view of the cleaner 445b and corresponding ferrule 2b. The cleaners 445a, 445c and 445d have same configuration of the cleaners 445b illustrated in FIG. 37B. In this embodiment, each of the cleaners 445a to 445d includes an acute portion 446 whose surface is not parallel to the front surfaces 3a to 3d of the ferrules 2a to 2d and is more acute than the front surface 3a to 3d of the ferrule 2a to 2d. That is, the acute portion 446 is projecting toward the ferrule 2b with an acute shape. An angle of the acute portion 446 with respect to the center axis G is, for example, from 30 degrees to 83 degrees. Each of the cleaners 445a to 445d further includes a cleaning cloth 447 made of a resin material, such as polyetherimide (PEI) resin. The cleaning cloth 447 is used for cleaning the front surface 3a to 3d of the ferrule 2a to 2d when rotating the outer housing 440, and may be wound around part of the forward wall 443 including the acute portion 446 through the opening areas 444a to 444d. The cleaner 445a to 445d may include parallel surface to the front surface 3a to 3d of the ferrule 2a to 2d, as illustrated in FIG. 37C, or may be bonded to the inner surface of the forward wall 443.

The resilient member 450a presses the outer housing 440 forward with respect to the inner housing 420, as illustrated in FIG. 32. The resilient member 450b presses the arm 430 rearward with respect to the inner housing 420. In an example, the resilient member 450b pressing the arm 430 rearward may be configured to have a stronger biasing force (spring force) than the resilient member 450a. In this manner, by making the biasing force of the resilient member 450b rearward stronger, a force pressing the front end surfaces of the ferrules 2a to 2d housed in the inner housing 420 to the cleaners 445a to 445d of the outer housing 440 can be large, and thereby the front end surfaces of the ferrules 2a to 2d and the distal ends of the optical fibers held by the ferrule 2a to 2d can be effectively cleaned. A force of maintaining the engagement of the lock between the rear housing 410 and the outer housing 440 and a force of restoration to the initial positions after the rear housing 410 is rotated and unlocked may be adjusted to be suitable. The rear end of the resilient member 450a and the front end of the resilient member 450b are supported by a receiving plate provided in a center hole of the inner housing 420.

Figure 38:
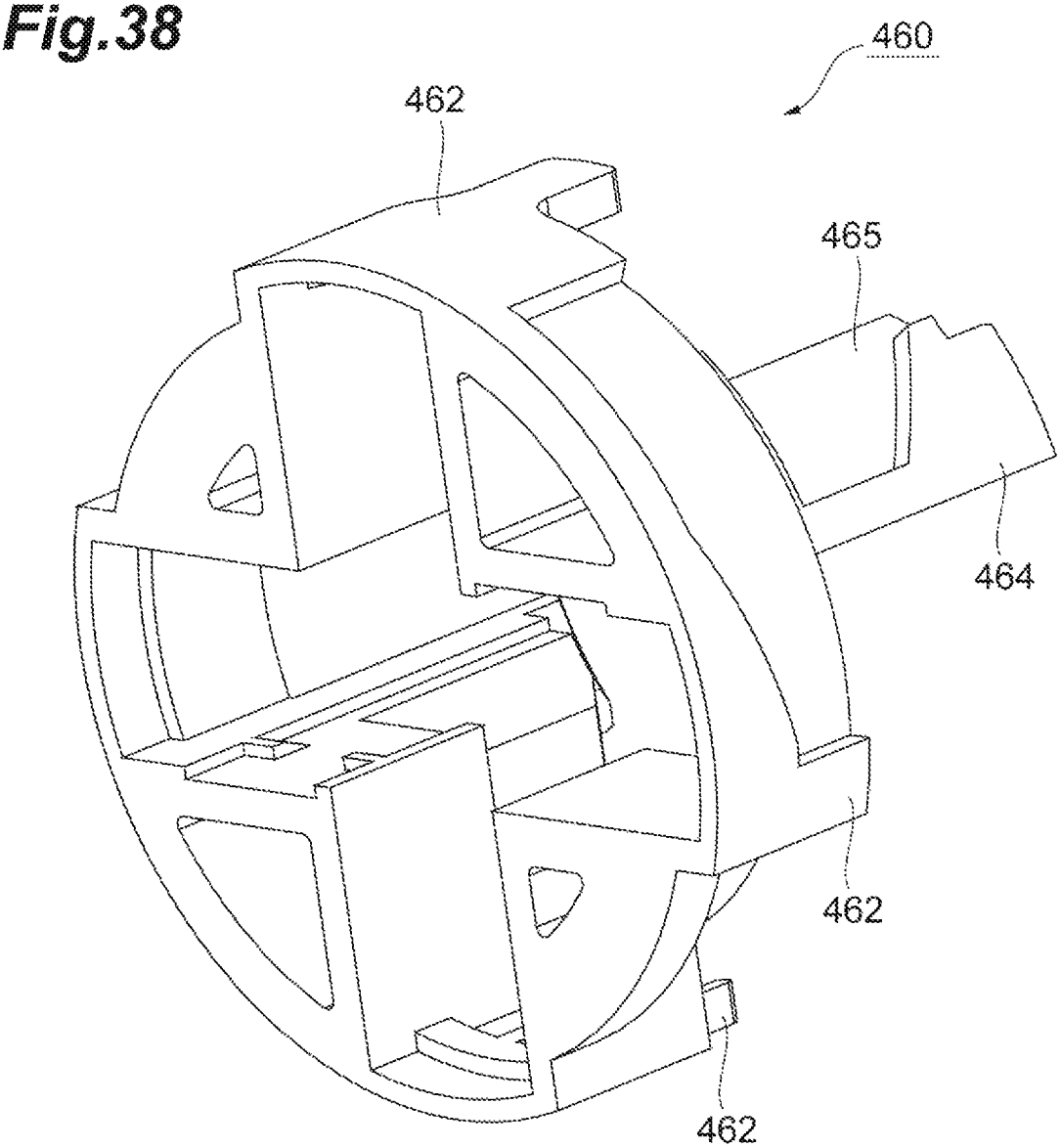
FIG. 38 is a perspective view of the adapter lock reinforcement member of the optical connector illustrated in FIG. 31.
Figure 39:
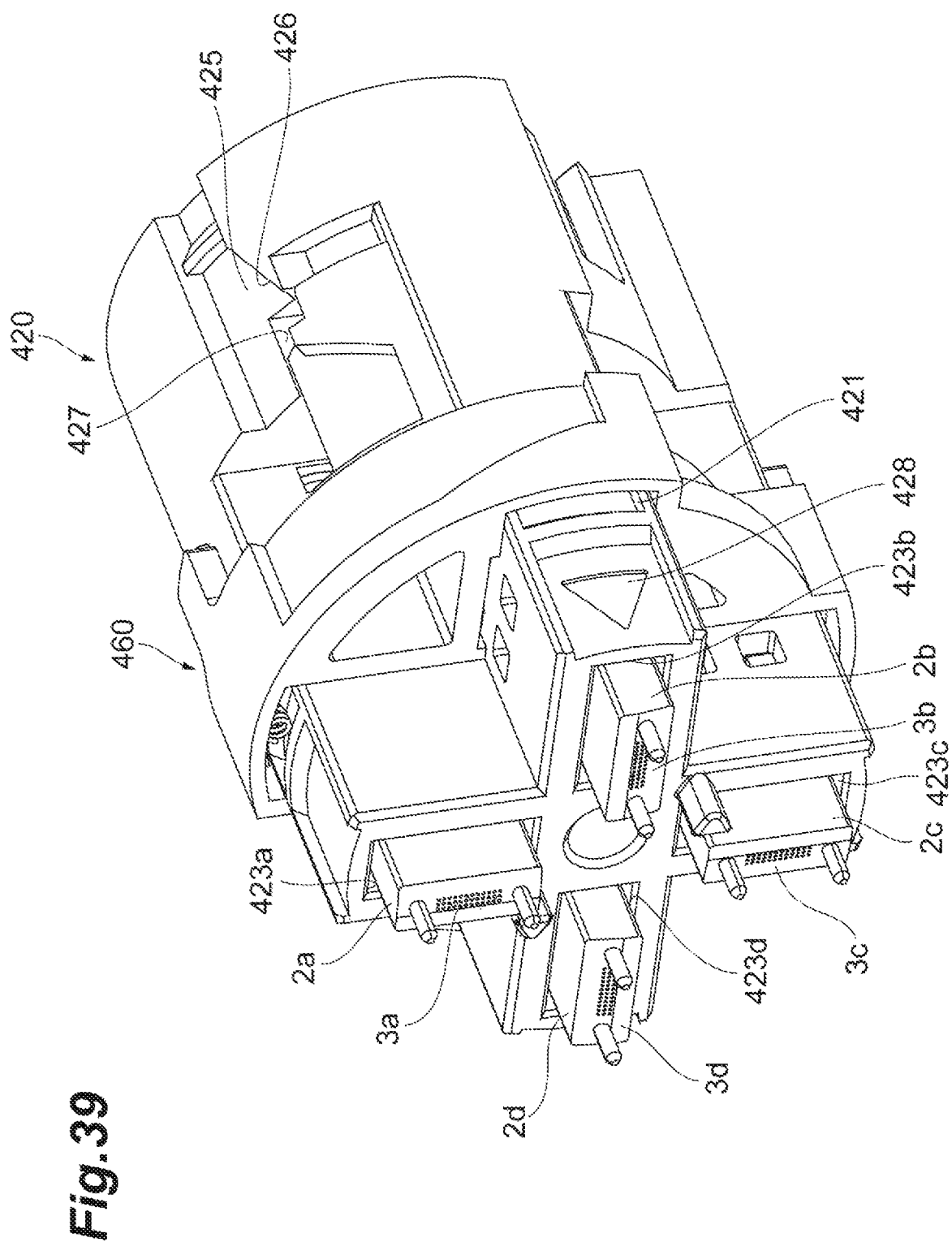
FIG. 39 is a perspective view of the inner housing and the adapter lock reinforcement member attached to the inner housing.

The adapter lock reinforcement member 460 has a substantially cylindrical outline, as illustrated in FIG. 32 and FIG. 38, and is disposed outside the front portion of the inner housing 420 (see FIG. 39). The adapter lock reinforcement member 460 is a member for reinforcing locking to an adapter 480 when connecting the optical connector 401 to another optical connector via the adapter 480 (see FIG. 43A and FIG. 43B). The adapter 480 includes four projecting strips 481 to 484 provided on an inner periphery equidistantly in the circumferential direction, and a pair of positioning members 486 (see FIG. 40A and FIG. 40B). The pair of positioning member 486 adjust rotating position of the optical connector 401. The projecting strips 481 to 484 are provided with latches respectively at distal ends thereof. When connecting the optical connector 401 to the adapter 480, the latches engage recesses 421 of the inner housing 420 and the optical connector 401 is locked to the adapter 480. The adapter lock reinforcement member 460 fixes the latches of the projecting strips 481 to 484 inward by four reinforcement plates 462 to prevent the latches from coming apart toward the outside and from being unintentional released when the above-described locking is done. The adapter lock reinforcement member 460 can move slightly backward against a biasing force of the springs 423 when the latches move to the recesses 421 of the inner housing 420. The adapter lock reinforcement member 460 moves forward by the springs 423 after the latches completely engage the recesses 421 and then covers the latches from the outside thereof, and thereby the adapter lock reinforcement member 460 reinforces locking the optical connector 401 to the adapter 480.

The adapter lock reinforcement member 460 further includes a pair of projecting strips 465 at rear portions each including a unlocking projection 464 having a triangular or rectangular shape. The pair of projecting strips 465 are provided in rotational symmetry about the center axis G. The pair of projecting strips 465, as illustrated in FIG. 38 and FIG. 39, are placed in the voids 427 of the inner housing 420 when the adapter lock reinforcement member 460 is disposed outside the front portion of the inner housing 420. By this configuration, when the optical connector returns to the initial position from the connected position, the sliding projections 415 temporarily engage the unlocking projections 464, respectively. When the rear housing 410 is further rotated, the sliding projections 415 press the unlocking projections 464 in the rotating direction and then the adapter lock reinforcement member 460 is temporary moved rearward. Thereby, the reinforcement plates 462 come free from the recesses 421 of the inner housing 420, which are engaged with the latches of the adapter 480 and the optical connector 401 is unlocked from the adapter 480. The shape of the unlocking projections 464 is not limited, but if the shape of the unlocking projections 464 is a triangular shape, it is possible to move the adapter lock reinforcement member 460 backward by the rotation of the rear housing 410, and to smoothly move the sliding projections 415 of the rear housing 410 backward after temporary moving the adapter lock reinforcement member 460 backward.

Figure 43A:
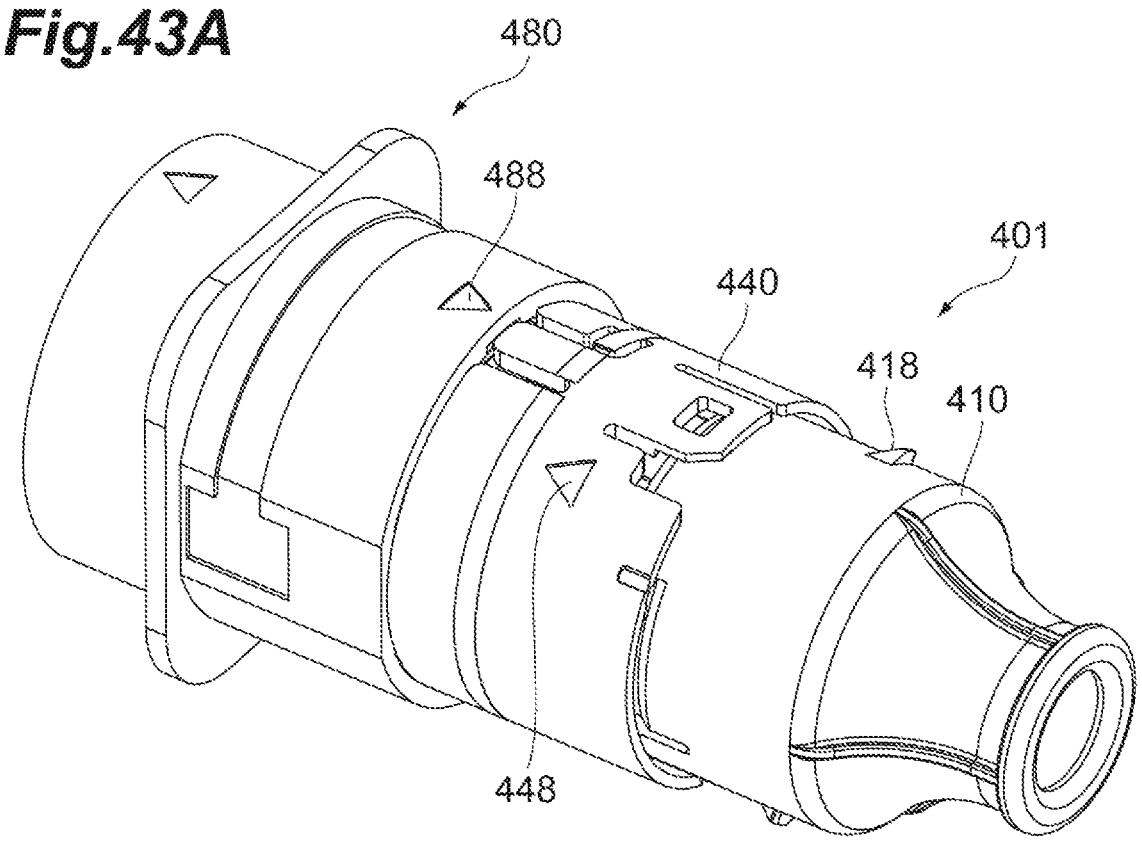
FIG. 43A is a perspective view of a state where the optical connector is just inserted into the coupling adapter.
Figure 43B:
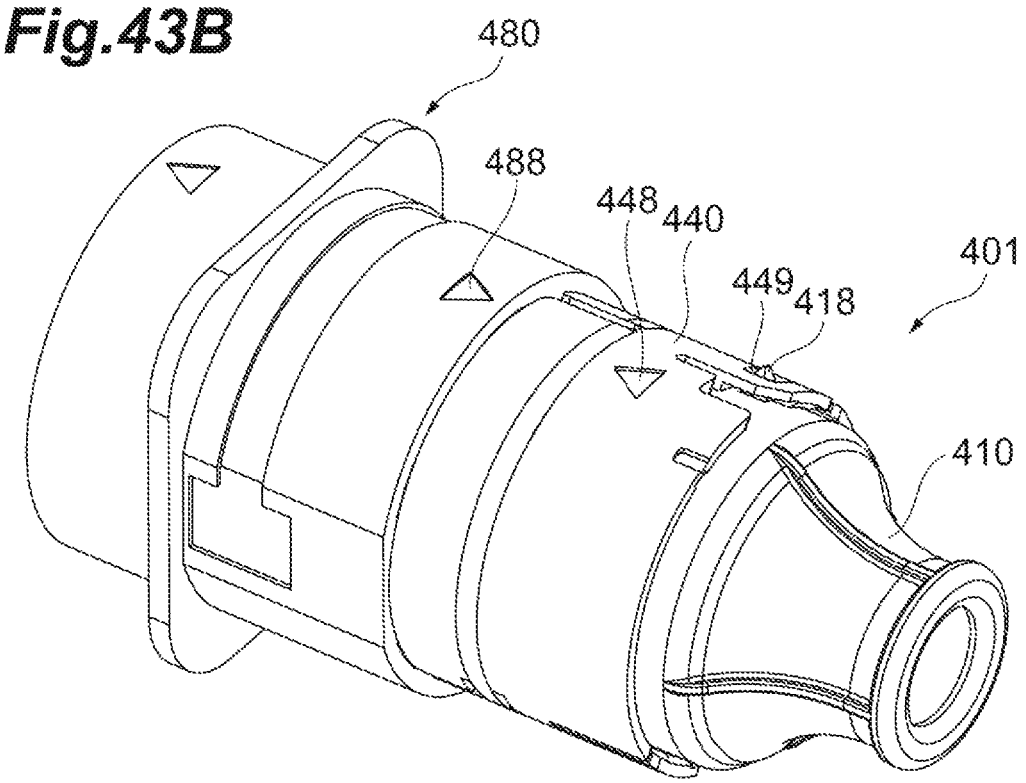
FIG. 43B is a perspective view of a state where the optical connecter is locked to the coupling adapter.

The optical connector 401 (the inner housing 420 and the outer housing 440) may be provided with a pair of arrows 428 and a pair of arrows 448, and the adapter 480 may be provided with two pairs of arrows 488. A first pair of the two pair of arrows 488 corresponds to the arrows 428 and the arrows 448. Thereby, a positioning of the optical connector 401 can be achieved by appearance. The pair of arrows 428 are provided on an outer surface of the inner housing 420 at positions of point symmetry with respect to the center axis G or rotational symmetry about the center axis G. The pair of arrows 448 are provided on an outer surface of the outer housing 440 at positions of point symmetry with respect to the center axis G or rotational symmetry about the center axis G. The first and second pairs of arrows 488 are provided on an outer surface of the adapter 480 at positions of point symmetry with respect to the center axis G or rotational symmetry about the center axis G. This positioning provides a secure positioning in the rotating direction of the optical connector 401 with respect to the adapter 480 or other optical connector to be connected. The second pair of arrows 488 are used for positioning the other optical connector with respect to the adapter 480. FIG. 43A shows one example where the optical connector 401 is attached to the adapter 480 for connecting the optical connector 401 to the other optical connector. The pair of arrows 428, the pair of arrows 448 and the first pair of arrows 488 may be colored-coded each other. For example, one of the pair of arrows 428, one of the pair of arrows 448, and one of the first pair of arrows 488 may be orange color, and the other of the pair of arrows 428, the other of the pair of arrows 448, and the other of the first pair of arrows 488 may be blue color. Thereby, an user can confirm a connecting direction of the optical connector 401 with respect to the adapter 480, which is a rotational angle of zero (0) degree or 180 degrees, after connecting the optical connector 401 to the adapter 480. The second pair of arrows 488 may be colored-coded.

The coupling relationship among the respective components in the optical connector 401 having the configuration as described above and the basic operation are the same as the optical connector 201. In other words, when the rear housing 410 moves forward with respect to the inner housing 420 along the center axis G, the arm 430 moves together with the rear housing 410 forward with respect to the inner housing 420. When the arm 430 moves linearly forward along the center axis G, the outer housing 440 rotates about the center axis G with respect to and approaches the inner housing 420 by a rotation guiding mechanism including the guide projections 431b and 432b of the arm 430 and the guide grooves 441 provided on the inner periphery of the outer housing 440. With this operation, a layout in which the ferrules 2a to 2d or the front end surfaces 3a to 3d of the optical fibers F retained by the retaining holes 423a to 423d are aligned with the opening areas 444a to 444d of the outer housing 440 is achieved. In this connected position, each of the locking protrusions 418 moves to the corresponding locking opening 449 to lock the rotated outer housing 440 to rear housing 410.

Figure 42A:
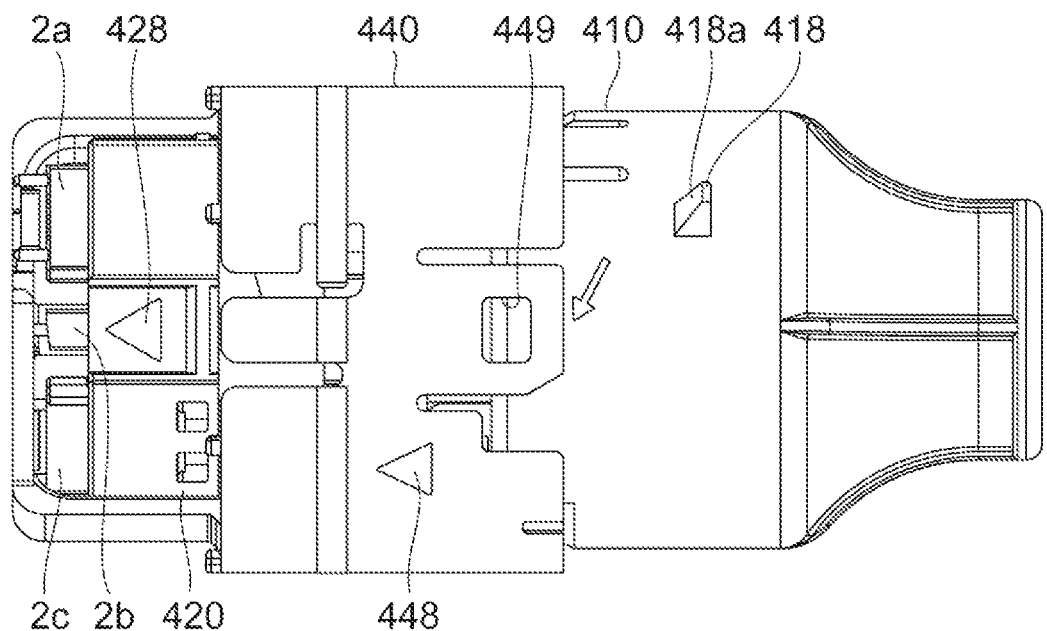
FIG. 42A is an lateral view of the optical connector in a state of the initial position.
Figure 42B:
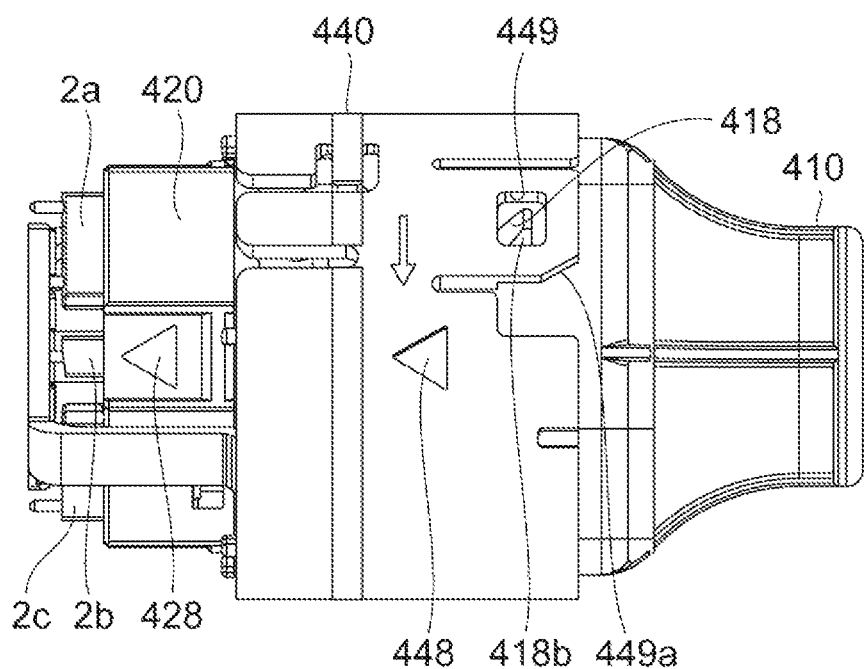
FIG. 42B is an lateral view of the optical connector in a state of the connected position.

The optical connector 401 does not include latch mechanism for connecting the rear housing 410 to the inner housing 420 in this embodiment. The optical connector 401, however, includes locking mechanism for locking the outer housing 440 to the rear housing 410. As illustrated in FIGS. 41A and 41B and FIG. 42A, when the optical connector 401 transits from the initial position to the connected position, the rear housing 410 moves lineally toward the outer housing 440 and then moves obliquely with respect to the center axis G by rotating the outer housing 440 with respect to the rear housing 410 while maintaining the linear movement of the rear housing 410. Then, the rear housing 410 locks the outer housing 440 by inserting the locking protrusions 418 into the locking openings 449, as illustrated in FIG. 41B and FIG. 42B. This locking prevents the outer housing 440 from moving linearly and/or rotating with respect to the rear housing 410 and the inner housing 420, and maintains the connected position. This locking with the locking protrusions 418 and the locking openings 449 may be done after the optical connector 401 is latched by the adapter 480. This can make a user of the optical connector 401 realize that the outer housing is firmly locked to the rear housing, that is, the optical connector certainly transits the initial position to the connected position.

After the rear housing 410 locks the outer housing 440 thereto, the locking protrusions 418 are disengaged from the locking openings 449 to unlock the outer housing 440 from the rear housing 410 by rotating the rear housing 410 in a circumferential direction, as illustrated in FIG. 41B and FIG. 41C. After that, the resilient members 450a and 450b push the rear housing 410 toward the rear side and return to the initial position, as illustrated in FIG. 41A and FIG. 42A. Please be noted that the outer housing 440 may be provided with a pair of inclined surface 449a configured to guide the locking protrusions 418 toward the initial position. The respective inclined surfaces 449a are located adjacent to the locking opening 449 and are inclined with respect to the center axis G. The inclined surfaces 449a provide smooth movement of the optical connector 401 (the locking protrusions 418) returning from the connected position to the initial position.

In the optical connector 401 according to the fifth embodiment, in the same manner as the optical connector 201, when the outer housing 440 is rotated by the rotation guiding mechanism with respect to the inner housing 420 from the initial position to the connected position, the opening areas 444a to 444d of the forward wall 443 of the outer housing 440 move to positions aligned with the ferrules 2a to 2d or the retaining holes 423a to 423d. Therefore, the front end surfaces of the ferrules 2a to 2d, that is, the distal ends of the optical fibers F retained by the ferrules 2a to 2d are exposed to the outside when rotated from the initial position to the connected position for inserting the optical connector 401 to another connector, for example, and thus contamination of the distal end surfaces of the optical fibers F with dust and debris may be restricted. In addition, the outer housing 440 includes the cleaners 445a to 445d for cleaning the front end surfaces of the ferrules 2a to 2d during the rotation from the initial position toward the connected position. Therefore, contamination of the distal end surfaces of the optical fibers F with dust and debris may be removed to put the exposure faces of the optical fibers in a cleaned state when the optical connector 401 connects. Consequently, when connecting the optical fibers with the optical connector 401, reduction of connection loss due to contamination with dust and debris is achieved.

In addition, as the optical connector 401 is configured to, but not limited to, connect a number of the optical fibers (for example, ninety-six optical fibers) at once to other optical fibers, time consumed for connection may be reduced compared with the related art. In addition, as the restoration from the connected position to the initial position is enabled by the resilient members 450a and 450b, disconnecting operation is also easy.

The optical connector 401 includes the adapter rock reinforcement member 460 and a spring construction of the inner housing 420 which corresponds to the member 460. Therefore, the optical connector 401 can be certainly and firmly connected to the adapter 480 when connecting the optical connector 401 to other optical connector via the adapter 480.

In the optical connector 401, each of the locking protrusions 418 includes a first sloped surface 418a extending along the center axis G. This sloped surface facilitates locking movement of the locking protrusions 418 to the locking openings 491. In addition, each of the locking protrusion 418 includes the second sloped surface 418b extending along a circumferential direction of the rear housing 410. This sloped surface facilitates unlocking movement of the locking protrusions 418 from the locking openings 491.

In the optical connector 401, the outer housing 440 comprises the cleaners 445a to 445d located inside the forward wall and the cleaners 445a to 445d clean each distal ends of the optical fibers. These cleaners 445a to 445d may be wound around the forward wall 443 through the opening areas 444a to 444d. This configuration can remove use of an adhesive for bonding the clears to the forward wall so as to avoid contaminating the distal end of the optical fiber with the adhesive. In addition, the forward wall 433 may include an acute portion 446 that is not parallel to front surfaces of the ferrule 2a to 2b. The cleaning cloth 447 may be attached to the acute portion 446. This configuration can enhance the cleaning of the distal ends of the optical fibers by the cleaners.

Although the optical connector, the adapter and other components according to the embodiments have been described thus far, the invention is not limited thereto, and various modifications may be applied. For example, in the optical connector 1, the guide projections, which constitute one part of the rotation guiding mechanism S, are provided on the outer periphery of the arm, and the guide grooves and, which constitute the other part of the rotation guiding mechanism S, are provided on the inner periphery of the outer housing. In contrast, a configuration including the guide projections, which constitute one part of the rotation guiding mechanism S, on the inner periphery of the outer housing, and the guide grooves, which constitute the other part of the rotation guiding mechanism S, on the outer periphery of the arm is also applicable. To have the quality to last long and simplify the explanation, an example where one latch or one protrusion have one function is shown, and to downsize, an example where one latch or one protrusion have a plurality of functions is shown. However, it can be adequately modified how many functions one latch or one protrusion has. The embodiments disclosed here are to be considered as examples only in all respects and are not intended to limit the invention. The invention is not defined by the above described description, but is defined by claims, and is intended to include any modification within the meaning and scope equivalent to the claims.

What is claimed is:

1. An optical connector having a center axis extending between a front end and a rear end, comprising:
    a rear housing located at the rear end of the optical connector, the rear housing allowing an optical fiber cable to be inserted therethrough;
    an inner housing comprising at a distal end thereof at least one retaining hole configured to house a ferrule, the inner housing being housed at a rear portion thereof in the rear housing, the inner housing configured to allow the rear housing to move linearly with respect to the inner housing along the center axis and to allow the rear housing to rotate with respect to the inner housing about the center axis;
    an arm configured to move linearly together with the rear housing with respect to the inner housing along the center axis; and
    an outer housing disposed on an outer periphery of the inner housing so as to cover a front portion of the inner housing, the outer housing configured to rotate with respect to the inner housing about the center axis by a rotation guiding mechanism cooperating with the arm;
    wherein the outer housing comprises a forward wall covering the distal end of the inner housing, the forward wall comprises at least one opening area, and the opening area is configured to be aligned with the retaining hole or a fiber exposure face of the ferrule when the outer housing is rotated with respect to the inner housing from an initial position to a connected position by the rotation guiding mechanism, and
    wherein one of the rear housing or the outer housing comprises at least one locking protrusion, and the other of the rear housing or the outer housing comprises at least one locking opening configured to receive the locking protrusion, and the locking protrusion engages with the locking opening to make the outer housing be locked to the rear housing when the rear housing moves linearly toward the front end along the center axis.

2. The optical connector according to claim 1, wherein the locking protrusion is disengaged from the locking opening to unlock the outer housing from the rear housing when the rear housing rotates in a circumferential direction after the outer housing is locked to the rear housing.

3. The optical connector according to claim 1, wherein the locking protrusion is provided on an outer periphery surface of the rear housing, and the locking opening is provided with the outer housing.

4. The optical connector according to claim 3, wherein the outer housing comprises an inclined surface configured to guide the locking protrusion toward the initial position, the inclined surface being located adjacent to the locking opening and being inclined with respect to the center axis.

5. The optical connector according to claim 1, wherein the locking protrusion includes a first sloped surface extending along the center axis.

6. The optical connector according to claim 1, wherein the locking protrusion includes a second sloped surface extending along a circumferential direction of the outer housing.

7. The optical connector according to claim 1, wherein the rear housing comprises a pair of locking protrusions including the locking protrusion, and the outer housing comprises a pair of locking openings including the opening, and
    wherein the pair of the locking protrusions respectively engage with the pair of the locking openings to make the outer housing be locked to the rear housing when the rear housing moves linearly toward the front end along the center axis.

8. The optical connector according to claim 1, wherein the rotation guiding mechanism comprises:
    a guide groove provided on one of an inner peripheral surface of the outer housing or an outer peripheral surface of a side wall of the arm, the guide groove comprising an inclined portion inclining with respect to the center axis; and
    a guide projection provided on the other of the inner peripheral surface of the outer housing or the outer peripheral surface of the side wall of the arm, the guide projection projecting toward the guide groove,
    wherein the outer housing rotates with respect to the inner housing between the initial position and the connected position in accordance with a movement of the guide projection in the guide groove.

9. The optical connector according to claim 1, wherein the rotation guiding mechanism comprises:
    a pair of guide grooves provided on one of an inner peripheral surface of the outer housing or outer peripheral surfaces of side walls of the arm, the pair of guide grooves each comprising an inclined portion inclining with respect to the center axis; and
    a pair of guide projections provided on the other of the inner peripheral surface of the outer housing or the outer peripheral surfaces of the side walls of the arm, the pair of guide projections projecting respectively toward the guide grooves,
    wherein the outer housing rotates with respect to the inner housing between the initial position and the connected position in accordance with movements of the guide projections in the corresponding guide grooves.

10. The optical connector according to claim 9, wherein the pair of guide grooves are configured such that directions of inclination of the respective inclined portions with respect to the center axis intersect with each other.

11. The optical connector according to claim 9, wherein the pair of guide grooves each include a first straight portion and a second straight portion extending respectively from both ends of the inclined portion along the center axis.

12. The optical connector according to claim 9, wherein the pair of guide grooves are provided on the inner peripheral surface of the outer housing, and the pair of guide projections are provided respectively on the outer peripheral surfaces of the side walls of the aim.

13. The optical connector according to claim 1, further comprising:
    a resilient member pressing the outer housing toward the front end and pressing the arm or the rear housing toward the rear end.

14. The optical connector according to claim 1, further comprising:
    a first resilient member pressing the outer housing toward the front end with respect to the inner housing; and
    a second resilient member pressing the arm or the rear housing toward the rear end with respect to the inner housing.

15. The optical connector according to claim 1,
    wherein the inner housing has a substantially cylindrical shape, and comprises a pair of notches formed partly therein along the center axis,
    wherein the arm comprises at least a pair of side walls each having an arcuate shape in cross section, and
    wherein the pair of side walls of the arm are housed respectively in the pair of notches and are linearly movable with respect to the inner housing in the notches.

16. The optical connector according to claim 1, further comprising:
    an adapter lock reinforcement member that surrounds the inner housing, wherein the inner housing comprises a recess configured to engage a latch provided with an adapter, and the adapter lock reinforcement member comprises a reinforcement plate that covers the recess of the inner housing.

17. The optical connector according to claim 1,
    wherein the outer housing comprises a cleaner located at least inside the forward wall, the cleaner cleaning a distal end of an optical fiber.

18. The optical connector according to claim 17,
    wherein the cleaner is wound around the forward wall through the opening area.

19. The optical connector according to claim 17,
    wherein the forward wall includes an acute portion that is not parallel to a front surface of the ferrule, and the cleaner is placed on a surface of the acute portion.

\* \* \* \* \*